(12) United States Patent
Fenichel et al.

(10) Patent No.: US 8,682,780 B2
(45) Date of Patent: Mar. 25, 2014

(54) SYSTEMS AND METHODS FOR ELECTRONICALLY INITIATING AND EXECUTING SECURITIES LENDING TRANSACTIONS

(75) Inventors: Peter Ira Fenichel, London (GB); Henry Donald Mlynarski, Wilmette, IL (US); Nazaar Molokhia, London (GB)

(73) Assignee: SL-x Technology UK Ltd., London (GB)

( * ) Notice: Subject to any disclaimer, the term of this patent is extended or adjusted under 35 U.S.C. 154(b) by 0 days.

(21) Appl. No.: 13/587,426

(22) Filed: Aug. 16, 2012

(65) Prior Publication Data

US 2013/0046674 A1 Feb. 21, 2013

Related U.S. Application Data

(60) Provisional application No. 61/523,937, filed on Aug. 16, 2011, provisional application No. 61/657,503, filed on Jun. 8, 2012.

(51) Int. Cl.
*G06Q 10/00* (2012.01)

(52) U.S. Cl.
USPC ............................................. 705/37; 705/1.1

(58) Field of Classification Search
USPC ......................................................... 705/1.1
See application file for complete search history.

(56) References Cited

U.S. PATENT DOCUMENTS

| | | | |
|---|---|---|---|
| 5,884,272 A * | 3/1999 | Walker et al. ................. | 705/319 |
| 5,924,082 A | 7/1999 | Silverman et al. | |
| 7,660,762 B1 | 2/2010 | Mellina | |
| 7,761,368 B2 * | 7/2010 | May ................................ | 705/37 |
| 7,797,223 B1 | 9/2010 | Mellina | |
| 7,949,597 B2 | 5/2011 | Zadoorian et al. | |
| 8,036,976 B2 | 10/2011 | Riseman et al. | |
| 8,050,999 B2 | 11/2011 | Peckholdt et al. | |
| 8,112,340 B2 | 2/2012 | Watson et al. | |
| 8,112,350 B2 | 2/2012 | Holmes et al. | |
| 8,185,466 B2 | 5/2012 | Martinez et al. | |

(Continued)

FOREIGN PATENT DOCUMENTS

| | | |
|---|---|---|
| DE | 693 09 905 T2 | 10/1997 |
| DE | 100 60 362 C2 | 6/2002 |

(Continued)

OTHER PUBLICATIONS

"Quadriserv, Inc. Marks One-Year Anniversary of AQS Securities Lending Market; Announces Expanded Set of Initiatives for Second Half of 2010; AQS Success Yields Product Evolution and Enhancements," GlobeNewswire, Jul. 21, 2010 (3 pages).

(Continued)

*Primary Examiner* — William Rankins
(74) *Attorney, Agent, or Firm* — Finnegan, Henderson, Farabow, Garrett & Dunner, LLP

(57) ABSTRACT

Systems and methods are provided for conducting securities lending transactions using an electronic trading platform. In accordance with an implementation, the electronic trading platform receives, from a trader, information identifying initial terms of a transaction to lend or borrow shares of a security. The electronic trading platform may generate an instruction to broadcast the initial terms to one or more counterparties, and may subsequently facilitate negotiations between the trader and the one or more counterparties for terms of the transaction. The electronic trading platform may execute the transaction in accordance with the negotiated terms.

25 Claims, 27 Drawing Sheets

(56) References Cited

U.S. PATENT DOCUMENTS

| | | | |
|---|---|---|---|
| 8,234,209 | B2 | 7/2012 | Zadoorian et al. |
| 2001/0037284 | A1* | 11/2001 | Finkelstein et al. ............ 705/37 |
| 2003/0033239 | A1* | 2/2003 | Gilbert et al. ................. 705/37 |
| 2006/0224494 | A1 | 10/2006 | Pinkava |
| 2008/0275808 | A1 | 11/2008 | Mackay |
| 2009/0012878 | A1* | 1/2009 | Tedesco et al. ................ 705/27 |
| 2009/0150299 | A1* | 6/2009 | Moscal et al. ................. 705/80 |
| 2009/0182680 | A1* | 7/2009 | Heitner et al. ................. 705/80 |
| 2010/0004999 | A1 | 1/2010 | DePetris et al. |
| 2010/0005022 | A1 | 1/2010 | DePetris et al. |
| 2010/0005030 | A1 | 1/2010 | DePetris et al. |
| 2010/0174654 | A1 | 7/2010 | Foley et al. |
| 2010/0205086 | A1 | 8/2010 | Mackay |
| 2010/0293085 | A1 | 11/2010 | Mackay |
| 2011/0119176 | A1* | 5/2011 | Hanson et al. ................. 705/37 |
| 2011/0137785 | A1 | 6/2011 | Lutnick et al. |
| 2011/0184847 | A1 | 7/2011 | Axilrod et al. |
| 2011/0313906 | A1 | 12/2011 | Jin et al. |
| 2012/0054081 | A1* | 3/2012 | DePetris et al. ............... 705/37 |
| 2012/0158571 | A1 | 6/2012 | Huntley et al. |
| 2012/0221453 | A1 | 8/2012 | Howes et al. |
| 2012/0290466 | A1* | 11/2012 | Blauvelt et al. ................ 705/37 |

FOREIGN PATENT DOCUMENTS

| | | |
|---|---|---|
| DE | 697 17 503 T2 | 9/2003 |
| DE | 602 00 081 T2 | 4/2004 |
| DE | 602 00 093 T2 | 4/2004 |
| DE | 696 30 456 T2 | 7/2004 |
| DE | 102 97 348 T5 | 11/2004 |
| DE | 601 10 097 T2 | 9/2005 |
| DE | 60 2004 002 450 T2 | 9/2007 |
| DE | 602 25 272 T2 | 6/2008 |
| DE | 60 2005 005 134 T2 | 3/2009 |
| EP | 0 573 991 B1 | 12/1993 |
| EP | 0 625 275 B1 | 11/1994 |
| EP | 0 847 561 B1 | 6/1998 |
| EP | 0 972 279 B1 | 1/2000 |
| EP | 0 976 033 B1 | 2/2000 |
| EP | 1 213 671 A1 | 6/2002 |
| EP | 1 319 211 B1 | 6/2003 |
| EP | 1 349 031 B1 | 10/2003 |
| EP | 1 349 032 B1 | 10/2003 |
| EP | 1 394 706 B1 | 3/2004 |
| EP | 1 447 756 B1 | 8/2004 |
| EP | 1 560 136 B1 | 8/2005 |
| EP | 1 605 368 B1 | 12/2005 |
| EP | 1 653 711 B1 | 5/2006 |
| EP | 1 704 490 B1 | 9/2006 |
| EP | 1 731 999 B1 | 12/2006 |
| EP | 1 777 907 B1 | 4/2007 |
| EP | 1 931 114 B1 | 6/2008 |
| EP | 1 952 253 B1 | 8/2008 |
| EP | 2 057 551 B1 | 5/2009 |
| EP | 2141648 | 1/2010 |
| EP | 2 153 382 B1 | 2/2010 |
| GB | 2 108 787 A | 5/1983 |
| GB | 2 135 484 A | 8/1984 |
| GB | 2 161 003 A | 1/1986 |
| GB | 2 165 675 A | 4/1986 |
| GB | 2 180 380 A | 3/1987 |
| GB | 2 210 714 A | 6/1989 |
| GB | 2 281 648 A | 3/1995 |
| GB | 2 364 588 A | 1/2002 |
| GB | 2 364 589 A | 1/2002 |
| GB | 2 370 392 A | 6/2002 |
| GB | 2 375 203 A | 11/2002 |
| GB | 2 375 638 A | 11/2002 |
| GB | 2 377 295 A | 1/2003 |
| GB | 2 377 302 A | 1/2003 |
| GB | 2 377 303 A | 1/2003 |
| GB | 2 378 024 A | 1/2003 |
| GB | 2 381 924 A | 5/2003 |
| GB | 2 382 684 A | 6/2003 |
| GB | 2 382 902 A | 6/2003 |
| GB | 2 383 162 A | 6/2003 |
| GB | 2 359 162 B | 9/2003 |
| GB | 2 386 299 A | 9/2003 |
| GB | 2 389 687 A | 12/2003 |
| GB | 2 390 926 A | 1/2004 |
| GB | 2 392 283 A | 2/2004 |
| GB | 2 364 585 B | 3/2004 |
| GB | 2 392 522 A | 3/2004 |
| GB | 2 392 523 A | 3/2004 |
| GB | 2 392 533 A | 3/2004 |
| GB | 2 392 756 A | 3/2004 |
| GB | 2 393 299 A | 3/2004 |
| GB | 2 393 820 A | 4/2004 |
| GB | 2 394 093 A | 4/2004 |
| GB | 2 394 094 A | 4/2004 |
| GB | 2 394 095 A | 4/2004 |
| GB | 2 363 875 B | 5/2004 |
| GB | 2 395 036 A | 5/2004 |
| GB | 2 395 318 A | 5/2004 |
| GB | 2 395 319 A | 5/2004 |
| GB | 2 364 586 B | 6/2004 |
| GB | 2 395 819 A | 6/2004 |
| GB | 2 396 459 A | 6/2004 |
| GB | 2 396 721 A | 6/2004 |
| GB | 2 396 936 A | 7/2004 |
| GB | 2 366 022 B | 8/2004 |
| GB | 2 366 023 B | 8/2004 |
| GB | 2 397 919 A | 8/2004 |
| GB | 2 398 147 A | 8/2004 |
| GB | 2 364 587 B | 9/2004 |
| GB | 2 379 063 B | 9/2004 |
| GB | 2 398 904 A | 9/2004 |
| GB | 2 399 299 A | 9/2004 |
| GB | 2 399 430 A | 9/2004 |
| GB | 2 399 911 A | 9/2004 |
| GB | 2 377 527 B | 10/2004 |
| GB | 2 390 451 B | 10/2004 |
| GB | 2 400 202 A | 10/2004 |
| GB | 2 400 209 A | 10/2004 |
| GB | 2 400 220 A | 10/2004 |
| GB | 2 400 467 A | 10/2004 |
| GB | 2 400 474 A | 10/2004 |
| GB | 2 400 702 A | 10/2004 |
| GB | 2 400 703 A | 10/2004 |
| GB | 2 400 950 A | 10/2004 |
| GB | 2 363 876 B | 12/2004 |
| GB | 2 366 021 B | 12/2004 |
| GB | 2 367 407 B | 12/2004 |
| GB | 2 390 726 B | 12/2004 |
| GB | 2 402 522 A | 12/2004 |
| GB | 2403311 | 12/2004 |
| GB | 2403311 A * | 12/2004 |
| GB | 2 403 564 A | 1/2005 |
| GB | 2 404 750 A | 2/2005 |
| GB | 2 366 020 B | 3/2005 |
| GB | 2 392 525 B | 3/2005 |
| GB | 2 396 727 B | 6/2005 |
| GB | 2 409 079 A | 6/2005 |
| GB | 2409079 | 6/2005 |
| GB | 2 410 103 A | 7/2005 |
| GB | 2 410 109 A | 7/2005 |
| GB | 2 410 575 A | 8/2005 |
| GB | 2 410 583 A | 8/2005 |
| GB | 2 413 199 A | 10/2005 |
| GB | 2 403 571 B | 11/2005 |
| GB | 2 413 873 A | 11/2005 |
| GB | 2 414 313 A | 11/2005 |
| GB | 2 414 835 A | 12/2005 |
| GB | 2 415 070 A | 12/2005 |
| GB | 2 408 413 B | 1/2006 |
| GB | 2 416 229 A | 1/2006 |
| GB | 2 417 344 A | 2/2006 |
| GB | 2 417 345 A | 2/2006 |
| GB | 2 422 120 A | 7/2006 |
| GB | 2 423 610 A | 8/2006 |
| GB | 2 424 162 A | 9/2006 |
| GB | 2 425 626 A | 11/2006 |
| GB | 2 430 126 A | 3/2007 |

(56) References Cited

FOREIGN PATENT DOCUMENTS

| | | |
|---|---|---|
| GB | 2 436 982 A | 10/2007 |
| GB | 2 425 197 B | 12/2007 |
| GB | 2 438 732 A | 12/2007 |
| GB | 2 440 967 A | 2/2008 |
| GB | 2 443 584 A | 5/2008 |
| GB | 2459529 A | 11/2009 |
| GB | 2463996 A | 4/2010 |
| GB | 2469360 A | 10/2010 |
| GB | 2483608 B | 3/2012 |
| WO | WO 03/034174 A2 | 4/2003 |
| WO | WO 2006/103474 | 10/2006 |
| WO | WO 2007/133685 | 11/2007 |
| WO | WO 2009/015334 | 1/2009 |
| WO | WO 2011/163235 | 12/2011 |

OTHER PUBLICATIONS

"SecFinex and EuroCCP to Launch CCP for Stock Borrowing & Lending in The UK," Exchange News Direct, Jan. 13, 2009 (1 page).

Howieson et al. "Good, Bad or Inevitable? The Introduction of CCPs in Securities Lending," White Paper, Zimmerhansl Consulting Services and Howieson Consulting Ltd., 2010 (36 pages).

"Quadriserv AQS: What We Do," obtained from www.tradeaqs.com/aboutus/whatwedo.html on Jul. 12, 2012 (1 page).

Holley, "Chi-X founder to launch 'Facebourse' by year-end," Apr. 11, 2012 (2 pages).

An International Search Report and Written Opinion mailed on Mar. 25, 2013, in corresponding International Application No. PCT/US12/51210 (9 pages).

* cited by examiner

SYSTEMS AND METHODS FOR ELECTRONICALLY INITIATING AND EXECUTING SECURITIES LENDING TRANSACTIONS

CROSS-REFERENCE TO RELATED APPLICATIONS

This application claims the benefit of priority to U.S. Provisional Patent Application No. 61/523,937, filed Aug. 16, 2011, and to U.S. Provisional Patent Application No. 61/657,503, filed on Jun. 8, 2012, the disclosures of which are both incorporated herein by reference to their entireties.

BACKGROUND

1. Technical Field

The present disclosure generally relates to systems and methods for electronically trading securities. More particularly, and without limitation, the present disclosure relates to systems and methods that facilitate electronic negotiation of terms for securities lending transactions between a trader and one or more counterparties, that execute the securities lending transactions in accordance with the negotiation terms, and that submit the executed transactions to central clearing counterparties.

2. Background Information

Today, securities lending and borrowing are common practices among financial institutions, hedge funds, and investment banks due to increasing demand from the securities industry to cover settlement failures and support investment strategies involving short selling. Despite advances in high-speed algorithmic trading processes, transactions involving securities lending and borrowing are generally initiated and negotiated based on personal relationships between professionals working at financial institutions.

The reliance on bilateral agreements leveraging interpersonal relationships between contracting parties results in a lack of transparency in the securities lending market that affects all participants. In particular, the lack of market transparency may result in inefficient pricing strategies that reflect not only the value of the underlying securities, but also relatively high intermediate costs associated with the maintenance of bilateral counterparty credit agreements.

Further, the lack of a central clearing facility in the securities lending market increases capital costs for both prime brokers and agent lenders. Such capital costs, and the resulting balance sheet management issues, may become more onerous for market participants as regulators continue to strengthen the capital reserve requirements for major market participants.

In view of the foregoing, there is a need for improved systems and methods that negotiate terms for securities lending transactions between a trader and one or more counterparties and that execute the securities lending transactions in accordance with the negotiation terms. Moreover, there is a need for improved systems and methods to submit the executed securities lending transactions to central clearing counterparties. There is also a need for such systems and methods that can be implemented in a computer-based environment.

SUMMARY

Consistent with an embodiment of the present disclosure, a computer-implemented method receives, from a trader, information identifying initial terms of a transaction to lend or borrow shares of a security. The method generates an electronic instruction to provide the initial terms to a counterparty, and facilitates, using at least one processor, negotiations between the trader and the counterparty for final terms of the transaction. The step of facilitating may include, during the negotiations, at least one of (i) revealing information identifying the trader to the counterparty and (ii) revealing information identifying the counterparty to the trader. The method executes, using the at least one processor, the transaction in accordance with the negotiated final terms.

Consistent with a further embodiment of the present disclosure, a computer-implemented method receives, from a trader, information identifying initial terms of a transaction to lend or borrow shares of a security. The initial terms may include an identifier of the security and a quantity of the shares. The method generates an electronic instruction to provide the initial terms to a trading partner having a relationship with the trader through mutual agreement, and facilitates, using at least one processor, negotiations between the trader and the trading partner for final terms of the transaction. The method executes, using the at least one processor, the transaction in accordance with the final terms.

Consistent with another embodiment of the present disclosure, a computer implemented method receives, from a trader, information identifying an order to borrow or lend a security. The order may be posted to an electronic trading platform by a counterparty. The method modifies a status of the identified order, the modified status preventing additional traders from negotiating with the counterparty based on the posted order for a predetermined time period. The method generates an electronic instruction to broadcast, to the counterparty, initial terms of a transaction to lend or borrow shares of the security, and facilitates, using at least one processor, negotiations between the trader and the counterparty for one or more final terms of the transaction. The method executes, using the at least one processor, the transaction in accordance with the final terms.

Consistent with an additional embodiment of the present disclosure, a computer-implemented method receives, from a trader, information identifying initial terms of a transaction to lend or borrow shares of a security, and generates an electronic instruction to provide the initial terms to one or more counterparties. The method facilitates, using at least one processor, negotiations between the trader and the one or more counterparties for final terms of the transaction, and executes, using the at least one processor, the transaction in accordance with the final terms.

It is to be understood that both the foregoing general description and the following detailed description are exemplary and explanatory only, and are not restrictive of the invention as claimed. Further, the accompanying drawings, which are incorporated in and constitute a part of this specification, illustrate embodiments of the present disclosure and together with the description, serve to explain principles of the invention as set forth in the accompanying claims.

BRIEF DESCRIPTION OF THE DRAWINGS

FIGS. 6A-6H are diagrams of exemplary portions of a graphical user interface for an electronic trading platform, according to disclosed embodiments.

FIGS. 8A-8E are diagrams of exemplary portions of a graphical user interface for an electronic trading platform, according to disclosed embodiments.

FIGS. 10A-10D are diagrams of exemplary portions of a graphical user interface for an electronic trading platform, according to disclosed embodiments.

FIGS. 13A-13C are diagrams of exemplary portions of a graphical user interface for an electronic trading platform, according to disclosed embodiments.

DESCRIPTION OF THE EMBODIMENTS

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
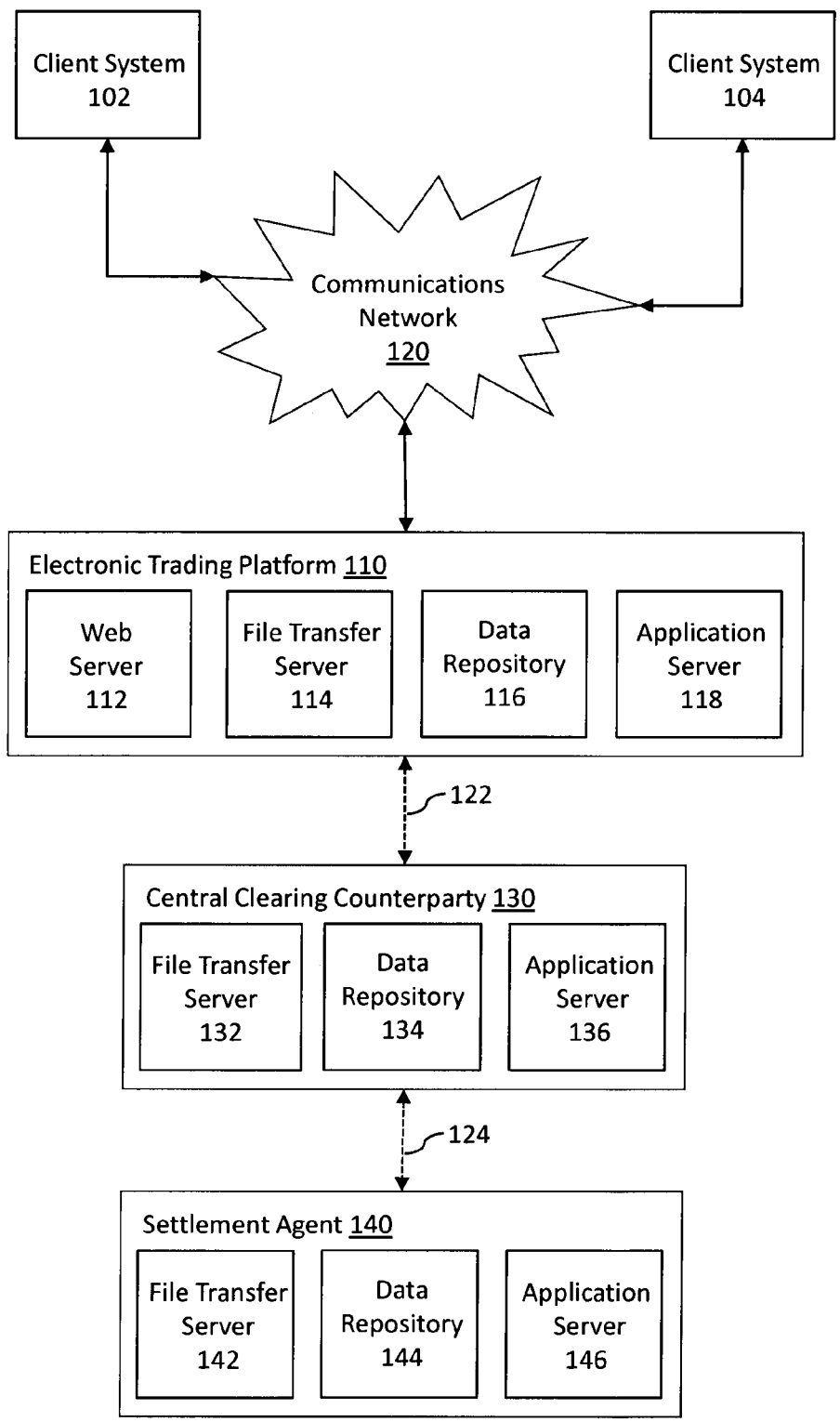
FIG. 1 is a diagram of an exemplary computing environment within which embodiments of the present disclosure may be practiced.

FIG. 1 illustrates an exemplary computing environment 100 within which embodiments consistent with the present disclosure may be practiced. In FIG. 1, client systems 102 and 104 may be connected with an electronic trading platform 110 via a communications network 120. Further, in FIG. 1, electronic trading platform 110 may be connected with a central clearing counterparty 130 via a communications link 122, and central clearing counterparty (CCP) 130 may be connected with a settlement agent 140 via a communication link 124. As further disclosed herein, electronic trading platform 110 may facilitate direct negotiations between traders at client systems 102 and 104 to negotiate terms of transactions to lend or borrow shares of securities, which may be submitted to CCP 130 and settlement agent 140 for subsequent clearing, settlement, and novation.

In an embodiment, client systems 102 and 104 may include corresponding devices that facilitate interaction with trading platform 110 over network 120, and additionally or alternatively, CCP 130 and settlement agent 140. For example, devices associated with client systems 102 and 104 may include, but are not limited to, personal computers, laptop computers, notebook computers, hand-held computers, personal digital assistants, mobile phones, smart phones, and any additional or alternate computing device operable to interact and communicate with trading platform 110 over network 120.

Communications network 120 may represent any form or medium of digital data communication. Examples of communication network 120 include a local area network ("LAN"), a wireless LAN, e.g., a "WiFi" network, a wireless Metropolitan Area Network (MAN) that connects multiple wireless LANs, and a wide area network ("WAN"), e.g., the Internet. Consistent with embodiments of the present disclosure, network 120 may comprise the Internet and include any publicly-accessible network or networks connected via one or more communication protocols, including, but not limited to, file transfer protocol (FTP), hypertext transfer protocol (HTTP) and transmission control protocol/internet protocol (TCP/IP). Moreover, communications network 120 may also include one or more mobile device networks, such as a GSM network or a PCS network, that allow user devices associated with system users, such as client system 102, to send and receive data via applicable communications protocols, including those described above.

Trading platform 110 includes a web server 112, a file transfer server 114, and a data repository 116, which may each be disposed in communication with an application server 118. In an embodiment, application server 118, in conjunction with data repository 116, may be configured to facilitate negotiation and subsequent execution of transactions between traders at client systems 102 and 104 to lend or borrow shares of securities or other financial instruments.

In such an embodiment, traders at client systems 102 and 104 may access trading platform 110 by initiating communications sessions with web server 112, which may be configured to perform communications protocol processing with client systems 102 and 104, and any additional or alternate device, across network 120 using the communications protocols described above. Further, in such embodiments, file transfer server 116 may be configured to perform web-based and network-based file transfers with system users 102 and 104 and trading platform 110, and between trading platform 110 and CCP 130, and settlement agent 140, as described below.

In an embodiment, data repository 116 may include one or more application programs that, upon execution by application server 118, enable application server 118 to provide electronic negotiation and execution functions to traders disposed at client systems 102 and 104. Data repository 116 may also store information leveraged by application server 118 to provide traders with access to trading platform 110, to facilitate the negotiation of transactions terms, and to subsequently execute and submit for settlement these transactions in accordance with the negotiated terms. For example, and as described below, data repository 116 may include data identifying the traders (e.g., one or more authentication credentials), license information identifying client systems 102 and 104, information identifying one or more trading partners and trading groups associated with the traders, information identifying a status of one or more negotiations involving the traders, information identifying prior executed transactions that involve, and order book data describing orders to lend or borrow securities posted to trading platform 110.

In an additional embodiment, data repository 116 may store information identifying clearing instruments associated with CCP 130 (e.g., a universe of financial instruments that may be cleared by CCP 130). For example, file transfer server 114 may receive the clearing instrument information from CCP 130 prior to the commencement of trading on a daily basis, at multiple times throughout the trading day, or at any additional or alternate interval apparent to one of skill in the art and consistent with the clearing processes of CCP 130.

In FIG. 1, CCP 130 may include a file transfer server 132 and a data repository 134, which are each in communication with an application server 136. For example, and as described above, file transfer server 132 may be configured to perform web-based and network-based file transfers with electronic trading platform 110 and CCP 130, and as such, may be configured to receive details of the executed transactions (e.g., transactions terms and corresponding counterparties) provided by trading platform 110 over communications link 122.

Application server 136, in conjunction with data repository 134, may process the received transaction details to implement a clearing function, and further, implement one or more business functionalities that support transaction creation and lifecycle management. Application server 136 may also be configured to transmit information associated with the SBL transaction (e.g., terms of the executed transaction, and information identifying the negotiating parties) through file transfer server 132 across communications link 124 to settlement agent 140.

In such embodiments, data repository 134 may include one or more application programs that, upon execution by application server 136, cause application server 136 to perform the clearing process and one or more business functions. Furthermore, data repository 134 may also include information identifying one or more executed transactions at various stages of the clearing and settlement process, information identifying the traders associated with the transactions, and any additional or alternate clearing data apparent to one of skill in the art and necessary for the clearing process.

Referring back to FIG. 1, settlement agent 140 includes a file transfer server 142 and a data repository 144, which are each in communication with an application server 146. Similar to file transfer server 132 described above, file transfer server 142 may be configured to perform web-based and network-based file transfers with CCP 130 and additionally or alternatively, with one or more of client systems 102 and 104. File transfer server 142 may receive information associated with cleared transactions from CCP 130, and may also exchange settlement data directly with traders at client systems 102 and 104. Such settlement data may include but is not limited to, information identifying the traders or various transactions details that facilitate booking and settlement of the executed transactions.

Application server 146, in conjunction with data repository 144, may process the cleared transaction to provide a settlement function. In such embodiments, data repository 144 may include one or more application programs that, upon execution may cause application server 146 to perform settlement functions for cleared transactions. Data repository 144 may also include information identifying the transactions in various stages of settlement, settlement data received from the traders at client systems 102 and 104, settlement confirmations associated with previously-settled transactions, and any additional or alternate clearing data apparent to one of skill in the art and necessary for the settlement process.

In the embodiments described above, communication links 122 and 124 may represent any form or medium of digital data communication that facilitates real-time messaging and file transfer among trading platform 110, CCP 130, and settlement agent 140. For example, communication links 122 and/or communications link 124 may represent one of the forms or mediums of digital data communication outlined above in reference to network 120, e.g., a local area network ("LAN"), a wireless LAN, e.g., a "WiFi" network, a wireless Metropolitan Area Network (MAN) that connects multiple wireless LANs, and a wide area network ("WAN"), e.g., the Internet. In such an embodiment, file transfer servers 114, 132, and 142 may exchange information using any of the communications protocols outlined above, including but not limited file transfer protocol (FTP), hypertext transfer protocol (HTTP) and transmission control protocol/internet protocol (TCP/IP).

Communications links 122 and 124 may also represent a dedicated communications network associated with the financial services industry that facilitates both real-time messaging and secure file transfer. For example, such dedicated networks may include, but are not limited to, those networks provided by the Society for Worldwide Interbank Financial Telecommunication (i.e., "SWIFT"). In such embodiments, file transfer servers 114, 132, and 142 may exchange information using one or more customized protocols associated with the SWIFT network.

The disclosed embodiments are, however, not limited to such exemplary communications networks. In additional embodiments, communications links 122 and 124 may be representative of any additional or alternative communications network apparent to one or skill in that art that facilitates protocol processing, real-time messaging functionalities, and secure file transfer among file transfer servers 114, 132, and 142.

Further, communication links 122 and 124 may function, respectively, as bi-directional reconciliation links between trading platform 110 and CCP 130 and between CCP 130 and settlement agent 140. In such embodiments, communication links 122 and 124 may ensure that components of trading platform 110, CCP 130, and settlement agent 140 remain synchronized.

In the embodiment of FIG. 1, the individual servers of trading platform 110, CCP 130, and settlement agent 140 may each represent a general purpose computer (e.g., a personal computer, network computer, server, or mainframe computer) having one or more processors that may be selectively activated or reconfigured by a computer program to perform corresponding functions. In additional embodiments, one or more of the individual servers may be combined into a single hardware unit. For example, web server 112, file transfer server 114, and application server 118 could be combined into a hardware unit, with the communications functions of web server 112 and file transfer server 114 being implemented within a software-based front end of the hardware unit, and the functionalities of application server 118 being implemented in a corresponding back-end of the single hardware unit. Furthermore, one or more of the individual servers may be incorporated as a node in a distributed network, e.g., application server 118 may communication via network 120 with one or more additional servers (not shown), which may application server 118 to distribute processes for parallel execution by a plurality of the additional servers.

Figure 2:
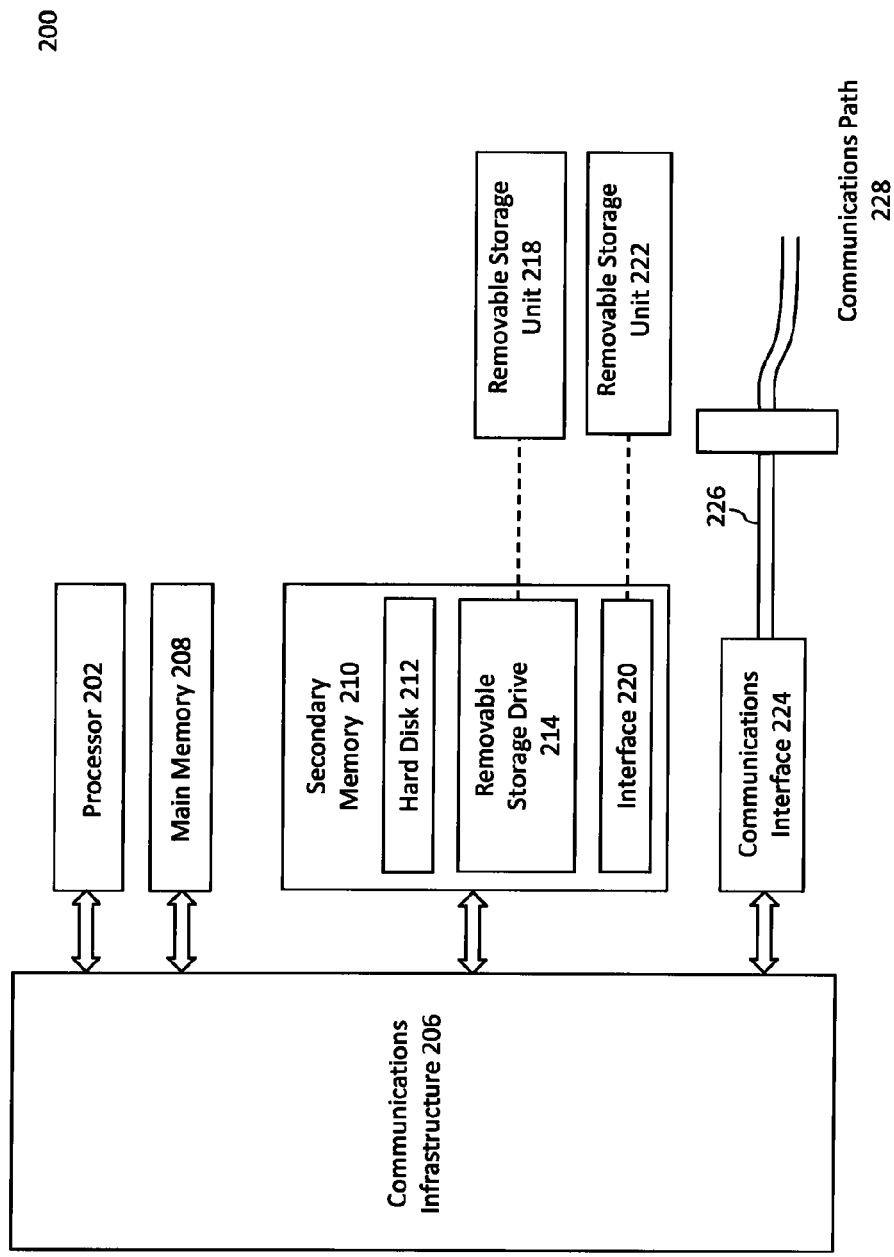
FIG. 2 is a diagram of an exemplary computer system, consistent with disclosed embodiments.

Individual computing devices and servers associated with system users 102 and 104, trading platform 110, CCP 130, and settlement agent 140 may represent any type of computer system capable of performing communication protocol processing. FIG. 2 is an exemplary computer system 200, according to an embodiment of the invention. Computer system 200 includes one or more processors, such as processor 202. Processor 202 is connected to a communications infrastructure 206, such as a bus or network, e.g., network 120 and communications links 122 and 124 of FIG. 1.

Computer system 200 also includes a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 represents a magnetic tape, optical disk, or other computer-readable storage medium that is read by and written to by removable storage drive 214. As will be appreciated, the removable storage unit 218 can represent a computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, a wireless transmitter or card, etc. Software and data may be transferred via communications interface 224 in the form of signals 226, which may be electronic, electromagnetic, optical or other signals capable of being received by communications interface 224. These signals 226 are provided to communications interface 224 via a communications path (i.e., channel 228). Channel 228 carries signals 226 and may be implemented using wire or cable, fiber optics, an RF link, wireless transmissions, and other communications channels. In an embodiment of the invention, signals 226 comprise data packets sent to processor 202. Information representing processed packets can also be sent in the form of signals 226 from processor 202 through communications path 228.

The terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer system 200. Such computer programs and sets of instructions can be stored within one or more computer readable media. Additionally or alternatively, computer programs and sets of instructions may also be received via communications interface 224 and stored on the one or more computer readable media.

Such computer programs and instructions, when executed by processor 202, enable processor 202 to perform one or more of the computer-implemented methods described herein. Examples of program instructions include, for example, machine code, such as that code produced by a compiler, and files containing a high-level code that can be executed by processor 202 using an interpreter.

The computer-implemented methods described herein can also be implemented on a single processor of a computer system, such as processor 202 of system 200. In another embodiment, computer-implemented methods consistent with embodiments of the invention may be implemented using one or more processors within a single computer system, and additionally or alternatively, these computer-implemented methods may be implemented on one or more processors within separate computer systems linked via a network.

As described above, computing environment 100 enables a trader associated with a client system (e.g., client system 102) to access an electronic trading platform 110 to negotiate, execute, settle, and manage previously-settled securities lending transactions with one or more counterparties. For example, in such embodiments, the trader may access trading platform 110, identify one or more counterparties based on posted order information and prior business or personal relationships, direct trades to one or more of the identified counterparties, and electronically negotiate terms of one of more stock lending transactions in a manner that optionally preserves an anonymity of the trader and/or one or more of the counterparties, as described below in reference to FIG. 3.

Figure 3:
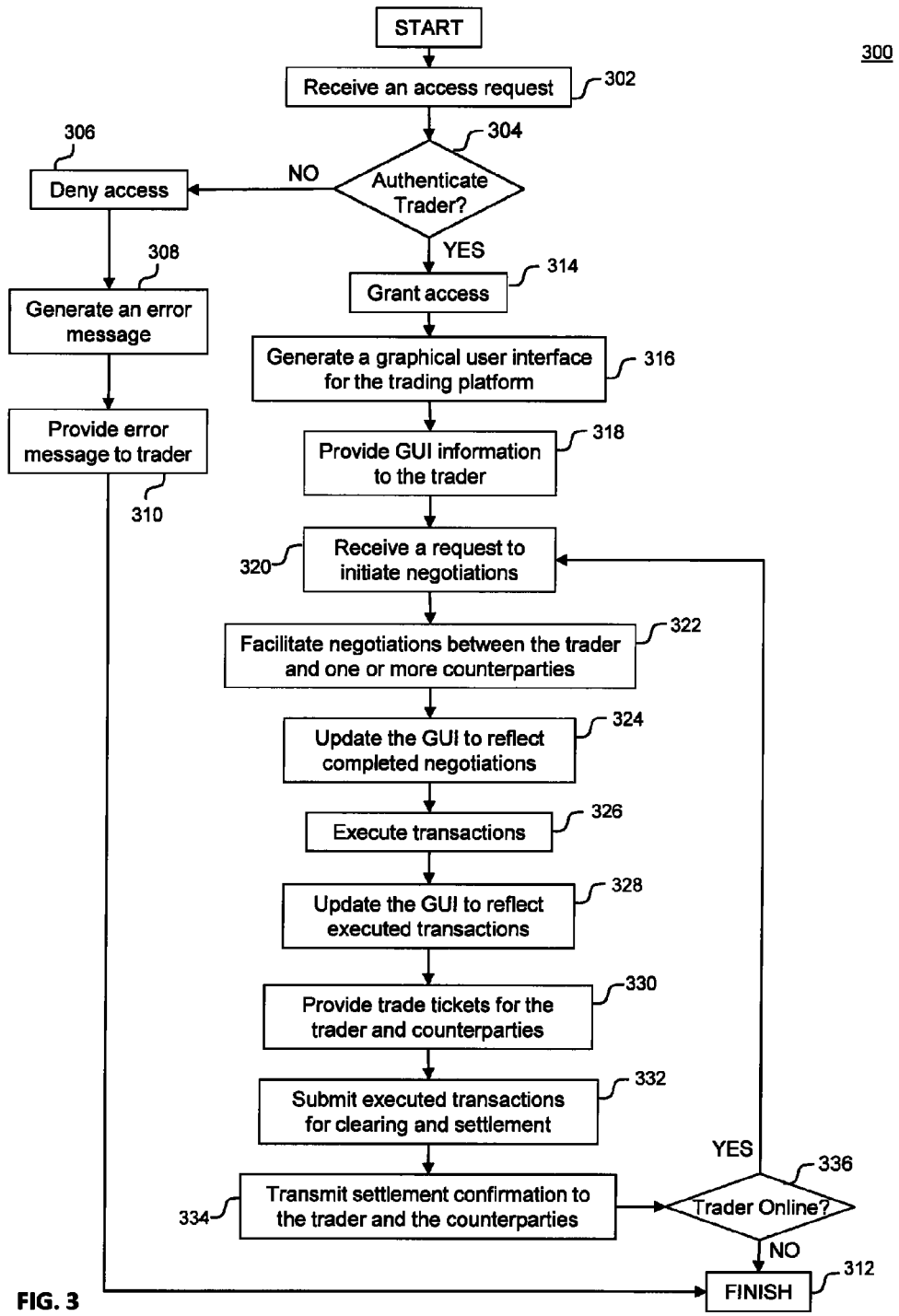
FIG. 3 is flowchart of an exemplary method for electronically initiating and executing a securities lending transaction, according to disclosed embodiments.

FIG. 3 is a flowchart of an exemplary method 300 for electronically initiating and executing a securities lending transaction, according to disclosed embodiments. Method 300 may be implemented by a server of an electronic trading platform (e.g., application server 118 of FIG. 1), which enables a trader at a client system (e.g., client system 102) to negotiate terms of a securities lending transaction with one or more counterparties, to execute the securities lending transaction in accordance with the negotiated terms, and to submit the executed transactions to a clearinghouse (e.g., CCP 130) for subsequent clearing and settlement. As will be apparent to one of skill in the art from the present disclosure, the steps and arrangement of the same in FIG. 3 may be modified, as needed.

In step 302, application server 112 may receive a request from the trader to access trading platform 110 and initiate a securities lending transaction. In such embodiments, the trader may be associated with a prime broker (e.g., an investment bank or other similar) that provides securities lending and borrowing services to hedge funds and other large investors. Alternatively, for example, the trader may be associated with an agent lender, who may hold securities for large individuals, corporations, and institutional investors and offer these held securities for lending. Further, in the embodiments described herein, the term "security" may refer to any stock, bond, derivative, or other financial instrument traded on any domestic, international, private, secondary, or over-the-counter exchange accessible to electronic trading platform 110 of FIG. 1.

In an embodiment, the received request may include one or more login credentials of the trader, e.g., a user name and a corresponding password. For example, the trader may enter a URL into a web browser executing on client system 102, and may subsequently provide the corresponding login credentials to request access to trading platform 110.

Alternatively, trading platform 110 may be associated with an executable program installed locally on client system 102. The trader may then execute the application program and provide the corresponding login credentials through a graphical user interface (GUI) associated with the application program. In such an embodiment, the received request may include not only the login credentials of the trader, but also information identifying a validity of a license associated with the application program (e.g., an alpha-numeric key or license number).

Referring back to FIG. 3, a web server associated with trading platform 110 (e.g., web server 112 of FIG. 1) may receive the request from client system 102 over network 120, and may provide the received request to application server 118 for authentication in step 304. For example, application server 118 may subsequently obtain login credentials associated with the trader from a data repository (e.g., data repository 116 of FIG. 1), and may compare the received and obtained login credentials to authenticate the trader in step 304.

If the authentication fails in step 304, then application server 118 may deny the trader access to trading platform 110 in step 306. In step 308, application server 118 may generate a corresponding error message, and in step 310, may provide the error message to the trader at client system 102. In an embodiment, web server 112 may transmit the error message to client system 102 across network 120 using any of the communications protocols outlined above. Exemplary method 300 is then complete in step 312.

Alternatively, however, if the trader is authenticated in step 304, then application server 118 grants the trader access to trading platform 110 in step 314. In step 316, application server 118 generates an graphical user interface (GUI) to facilitate access of trading platform 110 by the trader.

For example, in step 316, application server 118 may access data repository 116 to obtain layout information identifying a standard layout or template of the GUI, and further to obtain additional information that customizes the GUI to the trader. For example, such customized information may include, but is not limited to, statistics summarizing securities lending transactions executed by trading platform 110, information that identifies one or more trading groups and trading partners associated with the trader, and information associated with pending and completed negotiations involving the trader. The disclosed embodiments are not limited to such exemplary information, and in further embodiments, application server 118 may obtain any additional or alternate information that customizes the GUI to the trader from data repository 116, or from any other data repository accessible to trading platform 110 over network 120.

Application server 118 may subsequently provide the layout and customized information to client system 102 in step 316. For example, the layout and customized information may be transmitted by web server 112 to client system 102 across network 120 using any of the communications protocols outlined above. In such an embodiment, client system 102 may receive the transmitted information and render the information to generate and display the GUI to the trader, as described below in reference to FIG. 4.

Figure 4:
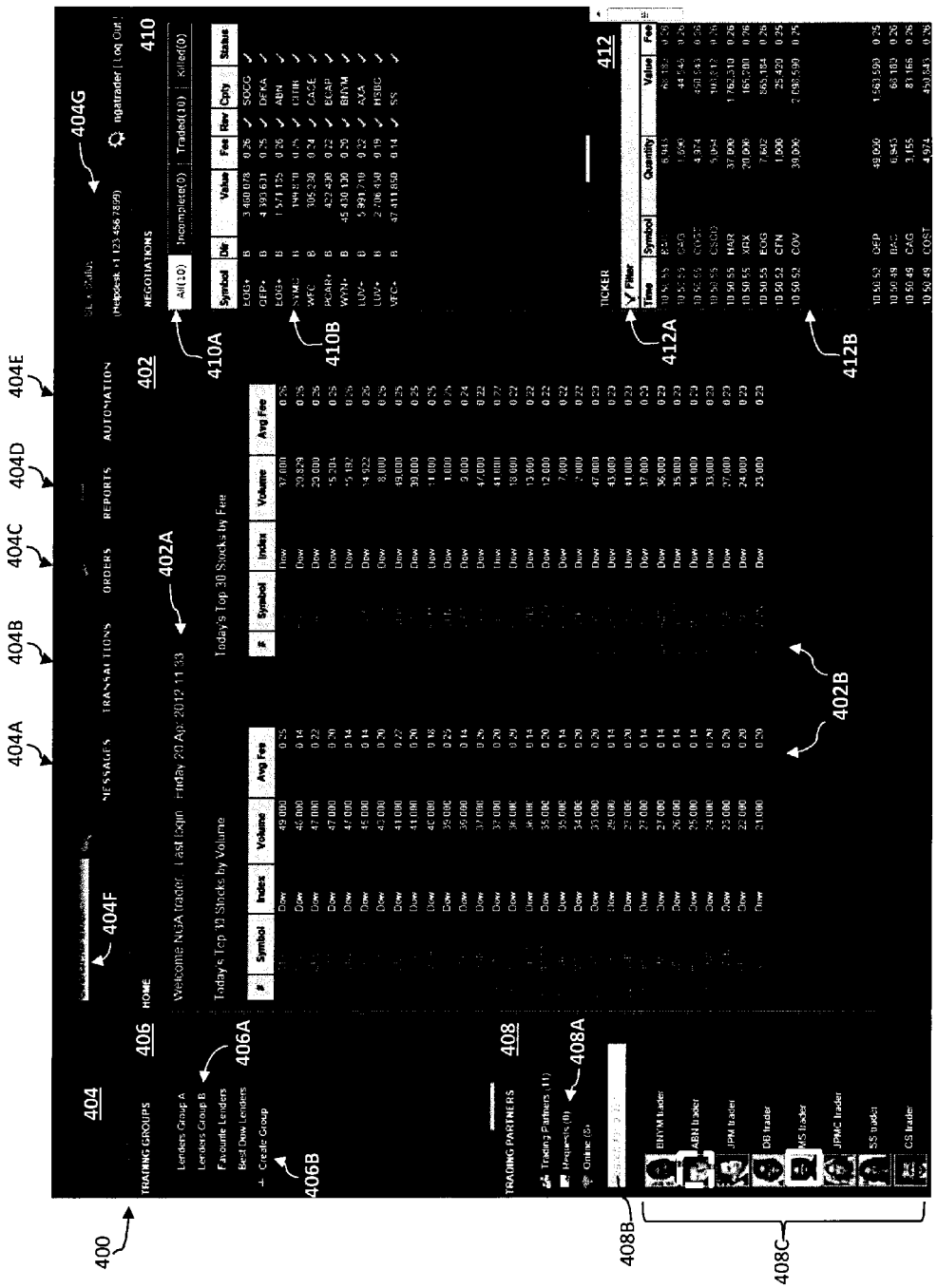
FIG. 4 is a diagram of an exemplary graphical user interface for an electronic trading platform, according to disclosed embodiments.

FIG. 4 illustrates an exemplary graphical user interface (GUI) 400, which may be displayed to a trader, in accordance with disclosed embodiments. For example, and as described above, client system 102 may receive, from an electronic trading platform (e.g., trading platform 110 of FIG. 1) layout information associated with a graphical user interface (GUI) and additional information that customizes the GUI to a trader. In such an embodiment, client system 102 may render the received layout information to generate the template of the GUI, and further process the additional information to populate individual fields of the template and customize the template to the trader.

For example. in FIG. 4, user interface 400 includes a home page portion 402 that includes a welcome message 402A and information 402B that describes current trading statistics associated with the electronic trading platform. For example, welcome message 402A identifies the trader (e.g., "NGA Trader") last accessed trading platform 110 on Apr. 20, 2012, at 11:33 a.m. Further, in FIG. 4, information 402B may include a list of a predetermined number of the "top" stocks within trading platform 110, as determined by volume and fee. In such embodiments, the predetermined number may include thirty stocks, fifty stocks, or any additional or alternate number of stocks, and the determination of the "top" stocks may be determined in accordance with any additional or alternate metric appropriate to trading platform 110. Further, as described below, the content displayed within home page portion 402 may vary in accordance with one or more activities of the trader.

User interface 400 also includes a menu portion 404 that facilitates navigation within user interface 400 and access to the functionalities of trading platform 110. In FIG. 4, menu portion 404 may include a plurality of actionable icons representative of trading platform 110 functions, which are responsive to actions by the trader (e.g., clicking or hovering using a mouse pointer, selection via a touch pad, or the entry of one or more keystrokes). For example, menu portion 404 may include a "Messages" icon 404A that enables the trader to access messages concerning system activity, a "Transactions" icon 404B that enables that trader to access information associated with transactions awaiting settlement, an "Orders" icon 404C that enables the trader to access information associated with orders entered into trading platform 110, by the trader or other members of a corresponding firm, a "Reports" icon 404D that provides the trader with information on previously-executed and/or settled transactions, and an "Automation" icon 404E that enables the trader to access one or more automation settings of trading platform 110.

Main menu portion 404 may also include a region 404F (e.g., a text box) that enables the trader to search for one or more securities tradable within trading platform 110 using, for example, a name of a security or a corresponding CUSIP code. In such embodiments, and in response to the search query, trading platform 110 may display an order book for the queried security within home page portion 402 of interface 400. Further, main menu portion 404 may also include a region 404G that displays, for example, a status of trading platform 110, information identifying one or more helpdesk numbers, and that provides a user with an opportunity to logout of trading platform 110 (e.g., a "Log Out" icon).

User interface 400 may also include sidebars that display information related to trading groups and trading partners. In the embodiments of FIG. 4, a "Trading Group" sidebar 406 may be disposed in an upper-left portion of user interface 400, and a "Trading Partner" sidebar 408 may be disposed in a lower-left portion of user interface 400. The disclosed embodiments are, however, not limited to such exemplary dispositions, and in additional embodiments, sidebars 406 and 408 may be disposed in any additional or alternate portion of the user interface.

In an embodiment, "Trading Group" sidebar 406 lists one or more existing trading groups to which the trader may broadcast messages and direct transactions. For example, sidebar 406 lists four existing trading groups 406A associated with the trader, including "Lenders Group A," "Lenders Group B," "Best Dow Lenders," and "Favourite Lenders." The disclosed embodiments are not limited to such exemplary trading groups, and in additional embodiments, sidebar 406 may list any additional or alternate number of trading groups defined by the trader and further, that include any number of individual trading parties apparent to one of skill in the art and identified by the trader. Further, in such embodiments, a member of a trading group (e.g., "Lenders Group A") may be unaware of other members of Lending Group A, of the existence of trading group Lenders Group A, or of any other trading group associated with the trader.

Further, sidebar 406 may also include icon 406B, which upon selection by the trader, may provide the trader with an opportunity to define a new trading groups and include one or more corresponding parties. In such embodiments, the corresponding parties may be selected by the trader (e.g., based on one or more identifiers entered into user interface 400), or alternatively, may be generated programmatically with or without user input.

For example, in response to the trader's selection of icon 406B, application server 118 of trading platform 110 may identify a plurality of candidate members of the new trading group based on one or more inclusion rules, and may filter the candidate members in accordance with one or more exclusion rules to generate the members of the new trading group. The inclusion rules may, in such embodiments, identify a candidate trading group member based on a total number of and/or a total value of trades executed by the candidate trading group member, a number of and/or a value of trades executed by the candidate trading group member that involve the trader, a number of and/or a value of trades executed by the candidate trading group member that involve a specified financial instrument, and a social networking relationship between the candidate trading group member and one or more existing trading partners. Further, in such embodiments, the exclusion rules may disqualify a candidate trading group member based on a number of defaults within a predetermined time period or a system ranking assigned to the candidate trading group members.

The disclosed embodiments are not limited to such exemplary inclusion and exclusion rules, and in further embodiments, the inclusion and exclusion rules may include any additional or alternate user-defined or system-defined rule apparent to one of skill in the art and appropriate to the traders of trading platform 110. Further, as described above, a member of the new trading group may be unaware of any other members of the new trading group, of the existence of trading group Lenders Group A, and further, of any other trading groups associated with the trader.

Referring back to FIG. 4, "Trading Partner" sidebar 408 may include a region 408A that displays statistics regarding the trading partners associated with the trader. For example, as depicted in FIG. 4, such statistics may include, but are not limited to, a number of existing trading partners, a number of outstanding requests to establish new trading partners, and a number of existing trading partners that are currently online. Further, in an embodiment, while each of the trading partners may be known to the trader, trading platform 110 may maintain a level of confidentiality between trading partners such that no single trading partner has knowledge of an identify any other trading partner.

Further, "Trading Partner" sidebar may 408 also provide a text box 408B that enables a trader to search for trading partners and images or avatars 408C of one or more of the online trading partners. In such embodiments, each image or avatar may be associated with a border indicative of a level of activity of the corresponding trading partner, and a color of the border may be indicative of the status of that the trading partner associated with that avatar within trading platform 110. For example, a green border surrounding an avatar of a trading partner may indicate that the trading partner is online and currently active, while an orange border may indicate that the trading partner is online, but inactive.

The disclosed embodiments are not limited to such exemplary indicia of trading partner availability. In additional embodiments, a weight and or style of the border surrounding an avatar may be indicative of the status of that the trading partner associated with that avatar within trading platform 110. For example, a dashed border surrounding an avatar of a trading partner may indicate that the trading partner is online and currently active, while a solid border may indicate that the trading partner is online, but inactive. Thus, in sidebar 408 of FIG. 4, the avatar for "ABN trader" is surrounded by dashed line, and as such, "ABN trader" is logged into and active within trading platform 110. Similarly, a solid line surrounding "MS trader" in sidebar 408 indicates that "MS trader" may be logged into trading platform 110, but is currently indicative. In additional embodiments, user interface 400 may indicate trading partner activity using any additional or alternate color, and further, using any additional or alternate technique to visually distinguish between active and inactive trading partner avatars displayed within sidebar 408.

Further, in FIG. 4, user interface 400 may includes sidebars that display information related to pending and completed negotiations for transaction terms and executed transactions (e.g., through a ticker of executed trades). In the embodiment of FIG. 4, a "Negotiations" sidebar 410 may be disposed in an upper-right portion of the user interface, and a "Ticker" sidebar 412 may be disposed in a lower-right portion of the user interface. The disclosed embodiments are, however, not limited to such exemplary dispositions, and in additional embodiments, the "Negotiations" and "Ticker" sidebars may be disposed in any additional or alternate portion of the user interface.

In an embodiment, "Negotiations" sidebar 410 may list one or more negotiations initiated by the trader and/or members of the trader's firm. For example, in FIG. 4, sidebar 410 may include a plurality of tabs 410A that display information on all current negotiations (e.g., the "All" tab in FIG. 4), incomplete negotiations (e.g., the "Incomplete" tab in FIG. 4), negotiations associated with completed transactions (e.g., the "Traded" tab in FIG. 4), and negotiations terminated by the trader or a counterparty (e.g., the "Killed" tab in FIG. 4).

For example, under the "All" tab of FIG. 4, sidebar 410 displays a list of all current negotiations that involve the trader. Further, for each listed transaction, sidebar 410 may display a ticker symbol associated with a corresponding financial instrument (e.g., in the "Symbol" column), a type of transaction associated with the negotiation (e.g., in the "Dir" column), a value of the negotiation (e.g., in the "Value" column), and a fee associated with the transaction (e.g., in the "Fee" column). Further, for each negotiation, sidebar 410 may also provide an indication as to whether an identity of the trader is revealed to the counterparty (e.g., in the "Rev" column), an identity of the counterparty, if revealed (e.g., in the "Cpty" column), and an indication of the status of the negotiation (e.g., in the "Status" column).

In such embodiments, depicted in FIG. 4, the trader may have previously conducted a negotiation to borrow shares of Symantec Corporation from Citibank. Upon completion of the negotiation process, application server 118 of trading platform 110 may update interface 400 to include information identify the completed negotiation under both the "All" tab of sidebar 410 and the "Traded" tab of sidebar 410. For example, entry 410B of sidebar 410 indicates the trader borrowed shares of Symantec (i.e., "SYMC") valued at $199,870 at a fee of 0.25% from Citibank (i.e., "CITIB"). Further, entry 410B also indicates that the trader revealed a corresponding identity to Citibank.

Further, in FIG. 4, "Ticker" sidebar 412 may provide information associated with a plurality of transactions executed by trading platform 110. For example, the executed transactions may be filtered using icon 412A in accordance with execution time, value, stock symbol, or transaction fee, and colors may be assigned to the executed transaction information to indicate the assigned fee. Further, in such embodiments, while sidebar 412 may display detail of executed transactions, sidebar 412 may maintain an anonymity of the negotiating parties associated with the executed transaction.

In such embodiments, a change in the transaction fees associated with the executed trades may be indicated by a color of the displayed information. For example, if the electronic trading platform executes a transaction for a particular stock at a fee higher than for previous transaction, information on the executed transaction may be displayed in green. Similarly, if the fee for the executed transaction were lower than that for previous transactions, then information on the executed transactions may be displayed in red. Further, for example, if the fee were to remain unchanged, then information on the executed transaction may be displayed in white. The disclosed embodiments are not limited to such exemplary colors, and in additional embodiments, sidebar 412 may indicate a change in transaction fee using any additional or alternate color, or using any additional or alternate visual indicator apparent to one of skill in the art.

Further, in an embodiment, information associated with a trade may be displayed in sidebar 412 immediately upon execution to preserve transparency. For example, trade 412B, which involved 5,064 shares of Cisco Systems ("CSCO") valued at $103,812 at a fee of 0.26%, was executed at 10:50: 52 a.m. Thus, information associated with trade 412B may be displayed within sidebar 412 at or immediately after the time of execution.

The disclosed embodiments are, however, not limited to interfaces that immediately display information associated with executed transaction. While an individual trader may be anonymous within sidebar 412, information on transactions executed by that trader may be visible to other market participants and may influence transaction fees and prices for securities of interest to the trader. Thus, the trader may wish to delay the display of the transaction executed by the trader while the trader accumulates a desired position in the security of interest.

In such embodiments, application server 118 may implement a delay between a time of execution and a time at which details are displayed within sidebar 412 of interface 400 for transactions associated with specific counterparties, or alternatively, for transactions involving specific securities. For example, the delay may be five minutes, fifteen minutes, thirty minutes, or any additional or alternate time period apparent to one of skill in the art and appropriate to trading platform 110. Further, in additional embodiments, application server 118 may determine that sidebar 412 may not display details associated with transactions involving certain securities and certain counterparties or traders. In such embodiments, details on such executed trades would be withheld from the broader market and the broker/dealer community to the extent allowable by regulatory authorities.

Further, in such embodiments, a trader or firm associated with the trader may submit a fee or surcharge to the entities that administer trading platform 110 to ensure that details of transactions that involve the trader are not published or displayed within user interface 400. For example, such fees may be paid as a surcharge on each executed trade, or alternatively, may be paid daily, monthly, annually, or at any other interval apparent to one of skill in the art. Further, in an embodiment, application server 118 may prevent the display of transaction details upon agreement not of one party, but of both counterparties to the executed transaction.

Referring back to FIG. 3, client system 102 may display the GUI to the trader, and based on the displayed information, the trader may identify one or more potential counterparties and transmit a request to initiate negotiations with the one or more counterparties from client system 102 to application server 118. Application server 118 may receive the request from client system 102 in step 320, and may process the received requests in step 322 to facilitate a negotiation process between the trader and the identified counterparty or counterparties to determine mutually-agreeable terms for transactions to lend or borrow securities.

For example, the GUI may enable the trader to identify orders to lend or borrow a security (e.g., bids to borrow or offers to lend) posted to trading platform 110 by corresponding counterparties. In such embodiments, as described below, the GUI may display the posted orders within an order book associated with the security, which may be presented to the trader upon entry of a corresponding query. The order book may include, for each posted order, information identifying the corresponding financial instrument (e.g., a stock symbol), a corresponding counterparty, and one or more negotiable terms.

For example, such terms may include, but are not limited to, a type of collateral (e.g., cash or non-cash collateral), a term (e.g., fixed or indeterminate), a quantity of securities, a market value of the securities, and a type of transaction fee (e.g., percentage fee or rebate). Further, the order book may also include counterparty information for each of the posted orders that includes, but is not limited to, an identity of the counterparty (e.g., a firm), a type of firm with which the counterparty is associated, and ownership status of the subject securities (e.g., whether the counterparty is an owner, beneficial owner, or trader), a role of the counterparty in the transaction (e.g., a middleman), a location of the counterparty, a type of counterparty, social networking information associated with the counterparty (e.g., trading partners in common between the trader and the counterparty), a location of the counterparty, a trading history of the counterparty (e.g., a number and/or a value of prior trades and a number of defaults), a system rating assigned by application server 118 to the counterparty, and any additional or alternate information apparent to one of skill in the art and appropriate to trading platform 110.

In such an embodiment, the trader may "lift" a posted order from the displayed order book (e.g., through clicking, tapping, or entering a predetermined sequence of keywords to select the posted order), and client system 102 may transmit information associated with the lifted order to application server 118 as a request to initiate negotiations with the one or more corresponding counterparties. As described above, application server 118 may receive the negotiation request from client system 102 in step 320, and may process the received request in step 322 to facilitate negotiations between the trader and the identified counterparty or counterparties to determine mutually-agreeable terms for a transaction involving the security associated with the lifted order.

Additionally, as described above, the counterparty associated with the selected order may be a member of a trading group created by the trader and displayed within a corresponding sidebar of the displayed user interface (e.g., "Trading Group" sidebar 406 of FIG. 4). In such an embodiment, the trader may identify the trading group associated with the counterparty (e.g., by hovering a mouse point over the displayed counterparty of the selected order, or by selecting the trading groups from the corresponding sidebar), and client system 102 may transmit information associated with the displayed order and the trading group to application server 118 as a request to initiate negotiations with each member of the trading group.

Application server 118 may receive the negotiation request from client system 102 in step 320 and process the received request in step 322 to facilitate negotiations between the trader and each of the members of the trading group for a transaction involving the security associated with the selected order. Further, in such embodiments, each of the negotiations between the trader and a corresponding one or the members of the trading group may be confidential, and application server 118 may ensure that one trading group member is unaware of negotiations conducted with other trading group members, absent explicit disclosure from the trader.

Further, in an additional embodiment, the trader may select an avatar associated with a online and active trading partner displayed within the trader interface (e.g., in "Trading Partners" sidebar 408 of FIG. 4A). Client system 102 may then transmit information identifying the selected trading partner to application server 118 as a request to initiate negotiations with the selected trading partner for a transaction to lend or borrow shares of a security. In such an embodiment, the selected trading partner need not have evinced a desire to borrow or lend the security, and the selection of the trading partner by the trader may be based on, for example, a desire to obtain a "special" security or one that is in short supply within the order posted to trading platform 110.

Further, and upon receipt of the request from the trader in step 320, application server 118 may generate a corresponding interface (e.g., a negotiations window) within step 322 that enables the trader to enter a set of initial negotiation terms and counterparties for a corresponding transaction to borrow or lend shares of a security. In such embodiments, an identifier of the security and a quantity of the shares subject to the transaction may represent "essential" components of the initial terms, which may also include, but are not limited to, a type of collateral (e.g., cash or non-cash collateral), a term of the transaction (e.g., fixed or indeterminate), a market value of the securities, and a type of transaction fee (e.g., percentage fee or rebate). Further, although the initial transaction terms may include a value of the corresponding transaction fee, such a term is not essential and may excluded to enable the counterparty to provide a quote for the transaction fee.

In such embodiments, the negotiations window may be provided to client system 102 and displayed within the GUI provided to the trader (e.g., GUI 400 of FIG. 4). The displayed negotiations window may further enable the trader to request a broadcast of the initial negotiation terms to the counterparties (e.g., the counterparty associated with the selected order, each of the trading group members, and the selected trading partner) to facilitate negotiations on the terms of the stock lending transaction.

The disclosed embodiments may also enable a potential counterparty to post an "anonymous" order to trading platform 110. For example, a counterparty may accumulate a position in a security to hedge against a prior short or long position, and may thus wish to remain anonymous while posting an order to borrow a certain quantity of the security to hedge against the short position. In such embodiments, application server 118 of trading platform 110 may enable the counterparty to post an order to trading platform 110 while remaining completely anonymous, or alternatively, while revealing various levels of identifying information, including, but not limited to, the counterparty's name or user name, a firm associated with the counterparty, a role played by the counterparty in the transaction (e.g., a middleman), the counterparty's ownership stake in the security (e.g., an owner, beneficial owner, etc.), a location of the counterparty, social networking information associated with the counterparty (e.g., trading partners of the counterparty), and a trading history of the counterparty (e.g., a number and/or a value of prior trades and a number of defaults).

In such an embodiment, the negotiations window provided to the trader in step 322 may enable the trader, along with the other negotiable terms, to request that the counterparty, or alternatively, a subset of counterparties, reveal identifying information as a condition of continuing negotiations. Additionally or alternatively, the negotiations window may enable the counterparty or counterparties to provide, in response to the request, corresponding identities or types of identifying information described above.

Upon presentation of the negotiations window within the displayed GUI, the trader may further enter a personal message for broadcast to the counterparty or counterparties, and may subsequently enter the initial proposal for terms of the desired transaction. Client system 102 may subsequently transmit information associated with the initial transaction terms and the personal message to application server 118 via web server 112, and application server 118 and web server 112 may coordinate to broadcast the received initial transaction terms and personal message to the counterparty (or counterparties) over communications network 120. In such an embodiment, application server 118 may update portions of the trader interface displayed to the trader at client system 102 to indicate the ongoing negotiation with each of the counterparties and the corresponding terms of each step in the negotiation process (e.g., within "Negotiations" sidebar 410 of FIG. 4).

Upon broadcast of the initial terms, application server 118 may facilitate negotiation processes in step 322 that enable each of the counterparties to respond to the initial terms with agreement, a request to terminate the negotiations, or alternatively, with a counter to the initial terms. Upon receipt of the response, application server 118 may update a portion of the displayed GUI (e.g., "Negotiations" sidebar 410 to reflect a current status and current terms of the negotiation with each of the counterparties. In the case of a counter to the initial transaction terms, application server 118 may provide the trader with an opportunity to agree to the terms of the counter, terminate the negotiation process, or alternatively, submit an additional counter using the displayed negotiations window. In such embodiment, when broadcasting to multiple counterparties, the negotiations between the trader and each of the counterparties may be confidential such that the terms offered to one counterparty and unknown to any of the other counterparties.

The negotiation process facilitated by application server 118 in step 322 may continue until either the trader or the counterparties agree to terms for a transaction or alternatively, elect to terminate the negotiation process. Further, during negotiation with multiple counterparties (e.g., from a single trading group), and upon identification of an agreement between the trader and a corresponding one of the counterparties, application server 118 may provide the trader with an option to kill ongoing negotiations with the other counterparties in view of the agreement with the corresponding counterparty. Upon completion of the negotiation process, application server 118 may receive information identifying a success or failure of the negotiations between the trader and the counterparty or multiple counterparties.

Further, in the negotiation process facilitated by application server in step 322, the trader and the one or more counterparties may reach an agreement on each of the multiple terms or parameters that specify a transaction for lending or borrowing securities. For example, to successfully negotiate the transaction, the trader and counterparties must not only agree on a value for a fee associated with the transaction (e.g., a corresponding "price"), but also on other negotiable terms that include, but are not limited to, a type of collateral for the transaction (e.g., cash or non-cash), a fee arrangement for the transaction (e.g., a percentage fee of a value of the negotiated shares or a rebate), a duration of the transaction, a quantity of the shares of the security, and any additional or alternate parameter or transaction term appropriate to the transaction and negotiable using trading platform 110.

Referring back to FIG. 3, in step 324, application server 118 may update the displayed GUI to indicate a status of the completed negotiation process with the one or more counterparties. For example, if the negotiations with a particular counterparty were unsuccessful (e.g., the trader or one of the counterparties elected to end negotiations), application server 118 may update the displayed GUI to indicate a failure of the particular negotiation (e.g., through an entry under the "Killed" tab of sidebar 410 in GUI 400). Alternatively, if the negotiations with a particular counterparty resulted in agreement, application server 118 may update the displayed GUI to indicate a success of the particular negotiation (e.g., through an entry under the "Completed" tab of sidebar 410 in GUI 400).

In such embodiments, in step 324, application server 118 may update a status of each of the pending negotiations (e.g., between the trader and each of the multiple counterparties) automatically, without trader input, and upon completion of the corresponding pending negotiations. Further, in such embodiments, application server 118 may generate an alert indicating a completion of the negotiations (e.g., success and agreed-upon terms, or failure) with a particular counterparty, which may be broadcast directly to the trader and the particular counterparty, and additionally or alternatively, provided to the trader and counterparty within portions of corresponding displayed GUIs (e.g., under "Messages" icon 404A of GUI 400).

Application server 118 may subsequently execute transactions for the successful negotiations in accordance with the agreed-upon terms in step 326. For example, as described above, application server 118 may execute transactions not only on the basis of a mutually-acceptable price or transaction fee, but also on the basis of mutually-acceptable values for each of the negotiable terms or parameters that specify the transaction, as outlined above. In such embodiments, application server 118 may execute transaction to borrow and lend a security, or a basket of securities, based on a set of mutually-acceptable transaction terms that satisfy the requirements of the trader and each of the one or more counterparties.

Further, in step 328, application server 118 may update a portion of the displayed GUIs (e.g., a corresponding entry under "Ticker" sidebar 412 within GUI 400) to reflect terms of each executed transaction. As described above, the GUI may immediately display the updated entry upon execution, or may display information associated with the executed transactions subsequent to a predetermined delay.

Further, in step 330, and for each successful negotiation between the trader and a corresponding counterparty, application server 118 may generate transaction receipts or "trade tickets" memorializing the agreed-upon terms for the transaction to lend or borrow the corresponding financial instrument. Application server 118 may then provide, for each executed transaction, the generated trade tickets to the trader and the corresponding counterparty. For example, the generated trade tickets may be transmitted, to the trader and the corresponding counterparties, over network 120 by a file transfer server associated with trading platform 110 (e.g., file transfer server 110 of FIG. 1) using any of the file transfer protocols outlined above (e.g., FTP). Additionally or alternatively, application server 122 may provide the generated trade tickets in step 330 to the trader and counterparty within portions of corresponding displayed GUIs (e.g., under "Messages" icon 404A of GUI 400), or web server 112 may distribute the trade tickets across network 120 using any of the communications protocols outlined above.

In step 332, application server 118 may submit the terms of the executed transactions to a central clearing counterparty (e.g., CCP 130 of FIG. 1) over communications link 122. In such embodiments, the terms of the executed transaction may be provided to CCP 130 using file transfer server 114, and upon receipt of the terms of the executed transaction, CCP 130 performs the corresponding clearance functions for the trader and the corresponding counterparties based on clearance data and corresponding collateral deposits provided to CCP 130, as described above.

CCP 130 may subsequently transmit information identifying the executed transactions to a settlement agent (e.g., settlement agent 140 of FIG. 1) via a corresponding communications link (e.g., communications link 124 of FIG. 1). Upon completion of settlement of the executed transaction, settlement agent 130 may transmit, over communication link 124, confirmations of the settlement to CCP 130, which may subsequently forward the settlement confirmations to trading platform 110 across communications link 122.

In step 334, application server 118 may distribute the received settlement confirmations to the trader and each of the corresponding counterparties across network 120. For example, and as described above, application server 118, in conjunction with web server 112, may transmit the settlement confirmation to the trader and corresponding counterparties over network 120 using any of the communications protocols outlined above. Further, in step 334, application server 118 may update corresponding portions of the GUI displayed to the trader and to the one or more counterparties to reflect the settled transactions (e.g., under "Orders" icon 404C of GUI 400).

Further, in an embodiment, application server 118 may also generate in step 334 a report for the settled transactions, and additionally or alternatively, the executed transactions. Such reports may include, but are not limited to, information identifying the terms of the corresponding transactions, information identifying the trader and the corresponding counterparties, and information identifying a status of the settlement of the transaction. Application server 118 may provide the generated reports directly to the trader and the corresponding counterparties over network 120, or alternatively, application server 118 may update corresponding portions of the GUI displayed to the trader and to the one or more counterparties to include the generated reports (e.g., under "Reports" icon 404D of GUI 400).

Application server 118 may then determine in step 336 whether the trader is currently logged onto trading platform 110. If the trader is currently online and active within trading platform 110, method 300 passes back to step 320, and application server 118 awaits an additional request from the trader to initiate a securities lending transaction with one or more counterparties. Alternatively, if application server 118 determines that the trader has logged out of trading platform 110 (e.g., the trader clicked the "Log Out" icon in region 404G of GUI 400), exemplary method 300 passes back to step 312 and is complete.

In the embodiments described above, trading platform 110 may transmit information associated with the executed trades to a single central clearing counterparty (e.g., CCP 130 of FIG. 1). The disclosed embodiments are not limited to such a single central clearing counterparty, and in additional embodiments, trading platform 110 may leverage a plurality of geographically-dispersed central clearing counterparties to provide clearing functions to executed trades (e.g., based on trader locations, etc.).

As described above, trading platform 110 may enable potential counterparties to post orders to lend or borrow financial instruments to trading platform 110. In such embodiments, a trader may view posted orders to borrow or lend for a particular security and, through trading platform 110, negotiate with terms of a transaction to borrow or lend shares of the security with a corresponding counterparty, as described below in reference to FIG. 5.

Figure 5:
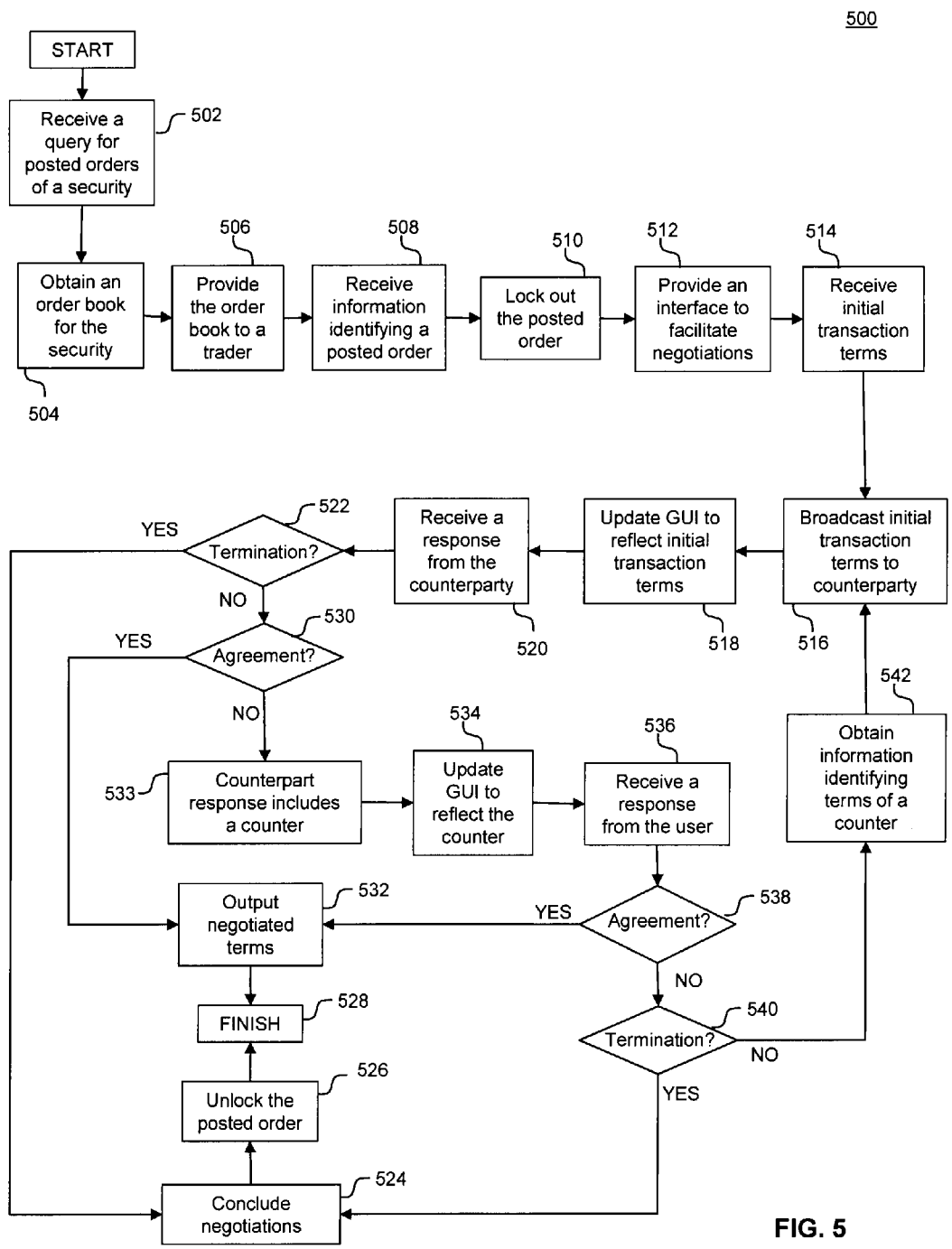
FIG. 5 is a flowchart of an exemplary method for electronically negotiating terms of a securities lending transaction between a trader and a single counterparty, according to disclosed embodiments.

FIG. 5 is a flowchart of an exemplary method 500 for electronically negotiating terms of a securities lending transaction between a trader and a single counterparty, according to disclosed embodiments. Method 500 may provide functionality that enables a server of an electronic securities lending system (e.g., application server 118 of trading platform 110 in FIG. 1) to provide posted orders to lend or borrow a security to a trader, and to enable the trader to select a posted order and negotiate terms of a transaction involving that security with a corresponding counterparty. In such embodiments, method 500 may be incorporated into the exemplary processes of step 322 of FIG. 3, which enables application server 118 to facilitate direct negotiations between the trader and the one or more counterparties. As will be apparent to one of skill in the art from the present disclosure, the steps and arrangement of the same in FIG. 5 may be modified, as needed.

In FIG. 5, application server 118 may receive a request for information associated with posted orders to lend or borrow shares of a security (e.g., bids to borrow or offers to lend) in step 502. As described above, trading platform 110 may enable various counterparties to post orders to lend or borrow one or more securities. In such embodiments, and in contrast to conventional techniques, the orders posted to trading platform 110 do not specify a firm price or establish a specified transaction fee and as such, represent "non-firm" orders to borrow or lend the corresponding security.

For example, as described above, a trader at a client system (e.g., client system 102 of FIG. 1) may request access to an electronic trading platform (e.g., trading platform 110 of FIG. 1), and upon authentication, application server 118 may provide to the trader a graphical user interface (e.g., GUI 400 of FIG. 4). In such embodiments, the trader may access a search function of the graphical user interface (e.g., text box 404F of GUI 400) and may enter a search query to identify posted orders to lend or borrow shares of a security. For example, the search query may include, but is not limited to, a name of the security, and symbol associated with the security on exchange, or any additional or alternative information identifying the financial instrument as would be appropriate to trading platform 110. Upon entry of the search query, client system 102 may transmit information associated with the search query as a request for posted orders, which may be received by application server 118 in step 502.

Upon receipt of the request, application server 118 may access a corresponding data repository (e.g., data repository 116 of FIG. 1), and obtain information associated with one or more posted orders to lend or borrow the security. For example, the obtained information may correspond to an order book for the security, which may include tabular data on posted bids and offers for the security and information identifying terms for the posted bids and offers. In such embodiments, as described above, the posted orders need not be associated with a price or transaction fee, and as such, these posted orders represent non-firm orders to lend and/or borrow the financial instrument.

Application server 118 may provide the obtained order book information to client system 102 in step 506. In such embodiments, a web server associated with trading platform 110 and in communication with application server 118 (e.g., web server 112 of FIG. 1) may transmit the order book information to client system 102 using the communications protocols outlined above. Upon receipt of the order book information, client system 102 may process the received information and display the order book for the requested financial instrument to the trader within a corresponding portion of the graphical user interface (e.g., within home page portion 402 of GUI 400), as described below in reference to FIG. 6A.

Figures 6A, 6B:
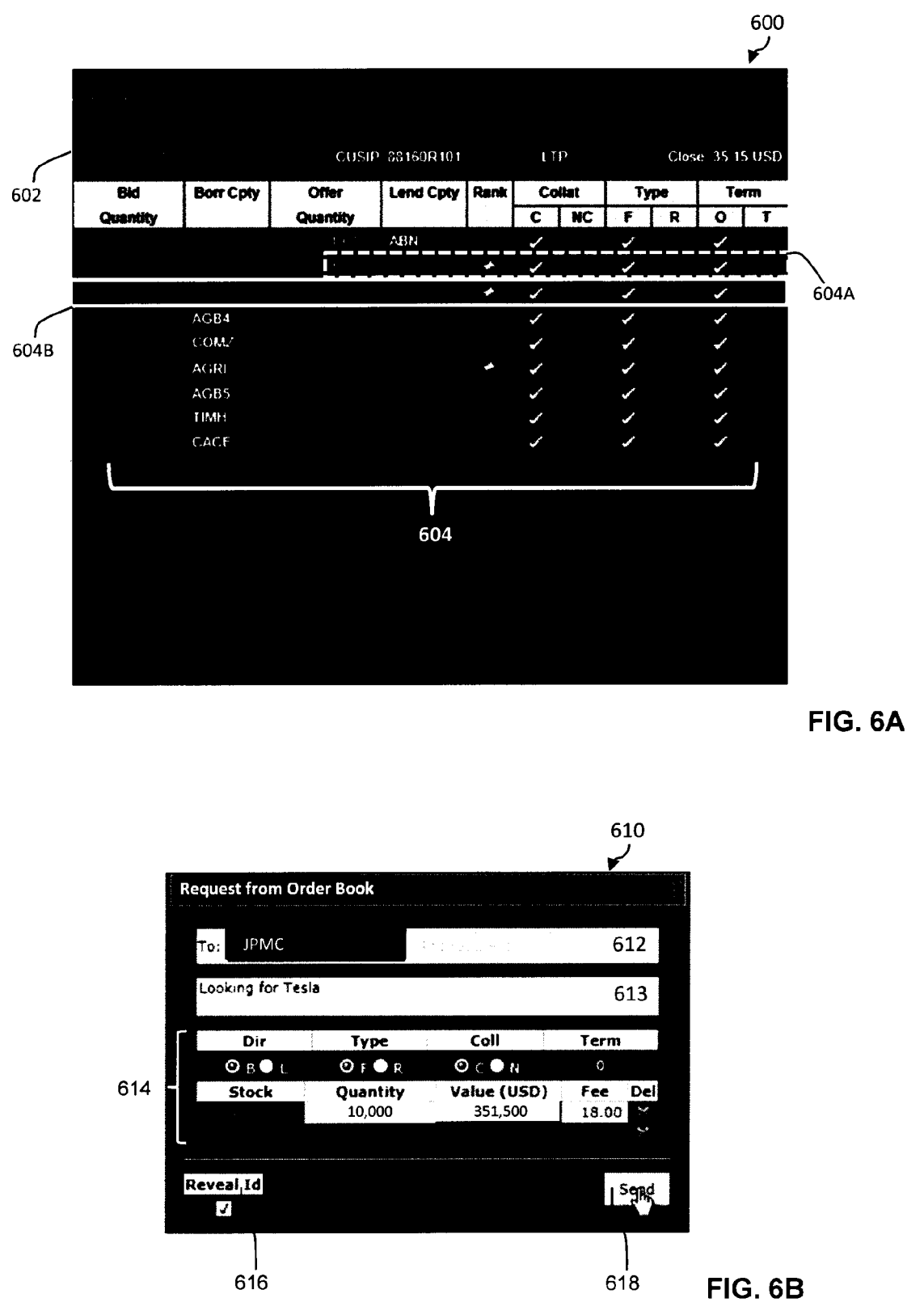

FIG. 6A illustrates an exemplary electronic (or online) order book 600 for a financial instrument, in accordance with disclosed embodiments. In an embodiment, order book 600 may be displayed to a trader within a corresponding portion of a graphical user interface (e.g., home page portion 404 of GUI 400 in FIG. 4). Order book 600 is not limited to such exemplary dispositions, and in additional embodiments, order book 600 may disposed within any additional or alternate portion of GUI 400, or within any additional or alternate user interface, apparent to one of skill in the art appropriate to a client system of the trader.

In FIG. 6, region 602 includes information identifying the financial instrument associated with order book 600. For example, region 600 may indicate that the security corresponds to shares of Tesla Motors Inc. (i.e., "TSLA") having a CUSIP code "88160R101," and that shares of TSLA last closed on the NASDAQ at $38.15. The information within region 602 is not limited to such exemplary identifiers and valuations, and in additional embodiments, region 602 may include any additional or alternate apparent to one of skill in the art and identifying the security.

Order book 600 also includes tabular data 604 associated with one or more orders to lend or borrow the security posted to trading platform 110 by corresponding counterparties. In the embodiment of FIG. 6, tabular data 604 separates the posted orders into bids to borrow the security and offers to lend the security, and for each bid and offer, identifies a corresponding quantity of shares of the security, identifies the corresponding counterparty, and identifies one or more terms of the corresponding bid or offer.

The identified term of the posted orders may include, but is not limited to, a type of collateral (e.g., cash or non-cash), a type of transaction fee (e.g., fee or rebate), and a term (e.g., open-ended or fixed term). In such embodiments, however, values for the fees or rebates associated with the posted orders are not specified in order book 600, as these posted orders represent non-firm orders to borrow or lend the security.

Further, in order book 600, counterparties associated with the posted orders may be assigned a ranking by system 118 that indicates, for example, a quality of the corresponding counterparty (e.g., the firm and/or a specific trader). In such embodiments, the system ranking associated with a particular order may be indicated by a visual cue to assist traders in differentiating between orders on the platform that otherwise share the same or similar parameters. In an embodiment, the system ranking may be based on a ratio of a firm's trade quotes on the platform to executed transactions, and additionally or alternatively, the number of transactions a firm has executed on the platform.

The disclosed embodiments are not limited to such exemplary ranking techniques, and in additional embodiments, any of a number of different algorithms may be used to implement the ranking system based on the specific needs of traders using the system, which include but are not limited to input received from individual traders (e.g., personalized "likes" or "dislikes" of specific counterparties) and social networking information associated with the counterparties (e.g., presence of such counterparties in trading groups).

Further, in an embodiment, the visual cue associated with a posted order in order book 600 may depend on a value of the corresponding system ranking. For example, when a system ranking for a posted order exceeds a predetermined threshold value, a star may be provided next to the posted order in order book 600. Additionally or alternatively, a color of a star associated with a posted order may vary depending on a value of the corresponding system ranking (e.g., a red star if the system ranking exceeds a predetermined threshold value, and a blue star if the system ranking fails to exceed the predetermined threshold value). The disclosed embodiments are not limited to such exemplary visual cues, and in additional embodiments, order book 600 may leverage any additional or alternate visual indicator to differentiate posted orders based on system ranking that would be apparent to one of skill in the art.

In the exemplary order book of FIG. 6A, a single system ranking is generated for each of the posted orders. In additional embodiments, trading platform 110 may generate multiple rankings for each of the posted orders. For example, application server 118 may generate a first system ranking for each posted order that accounts for a trading history of the counterparty (e.g., numbers of trades and values of trades) and a second system ranking indicative of a number of defaults by the counterparty. Further, in such embodiments, an additional ranking may be assigned to each of the posted orders that accounts for input by traders associated with trading platform 110, and additionally or alternatively, social networking information associated with a counterparty (e.g., a presence of the counterparty in trading groups or an establishment of individual trading partners associated with the counterparty).

Referring back to FIG. 6A, order 604A indicates that counterparty JPMorgan Chase & Co. ("JPMC") offers to lend 17,000 shares of TSLA stock for an indeterminate time period in exchange for cash collateral (e.g., "C" under the "Collat" column) and a transaction fee to be specified later (e.g., "F" under the "Type" column). Further, in order book 600, counterparty JPMC is associated with a star under the "Rank" column, and as such, a system ranking for JPMC may exceed a threshold value, thus indicating that JPMC is a highly-rated counterparty. Further, order 604B indicates that an anonymous counterparty (e.g., "anon") bids to borrow 390,000 shares of TSLA stock for an indefinite time period in exchange for cash collateral (e.g., "C" under the "Collat" column) and a transaction fee to be specified later (e.g., "F" under the "Type" column).

As described above, trading platform 110 enables a counterparty to anonymously post an offer to borrow or lend a security, and further, facilitates a negotiation process conducted anonymously or with various levels of anonymity. For example, a counterparty may wish to remain anonymous in order to hide an accumulation of a specific financial instrument from the broader market, knowledge of which may influence prices on the market and motivate potential competitors to take similar positions. Further, in such embodiments, the counterparty associated with the posted order may remain completely anonymous to all other traders, or alternatively, the posted order may reveal information identifying the counterparty to a subset of the other traders (e.g., those traders that share a trading group with the counterparty, one or more trading partners of the counterparty, or any arbitrary subset of the other traders identified or approved by the counterparty).

In FIG. 6A, the anonymous counterparty in field 604B is associated with a star under the "Rank" column, indicating that while anonymous, the counterparty is highly rated by the system and is likely to be a reliable trading partner. Further, while the counterparty of order 604B may elect to remain completely anonymous, the disclosed embodiments may allow a counterparty to provide some degree of identifying information while withholding the name of the trader's firm.

For example, such identifying information may include, but is not limited to, a type of organization with which the counterparty is associated, an ownership status of the subject securities (e.g., whether the counterparty is an owner, beneficial owner, or trader), a role of the counterparty in the transaction (e.g., a middleman), a location of the counterparty, social networking information associated with the counterparty (e.g., trading partners in common between the trader and the counterparty), a location of the counterparty, a trading history of the counterparty (e.g., a number and/or a value of prior trades and a number of defaults), a system rating assigned by application server 118 to the counterparty, and any additional or alternate information apparent to one of skill in the art and appropriate to trading platform 110.

Referring back to FIG. 5, in step 508, application server 118 may receive from client system 102 information identifying a particular posted order within a displayed order book (e.g., order book 600 of FIG. 6A). For example, client system 102 may display the order book to the trader within the corresponding portion of the graphical user interface, and a trader may select a corresponding order within the displayed order book (e.g., by clicking on the displayed order using a mouse or touch page, or by entering a corresponding set of keystrokes). Upon selection of the corresponding order, client system 102 may transmit information identifying the selected order, which may be received by application server 118 in step 508.

For example, the selection of the posted order by the trader may be reflective of a desire by the trader to enter into negotiations with a counterparty for a transaction similar to the posted order and involving shares of the same security. In such an embodiment, application server 118 may "lock out" the posted order in step 510 and block other traders within the system from selecting the posted order. In such embodiments, application server 118 may modify a status associated with the posted order to prevent other traders from attempting negotiations based on the posted order. For example, the graphical user interface displayed to the trader may be updated to provide a visual indication of the locked-out status of the posted order, e.g., the posted order may be grayed-out or otherwise highlighted.

By locking out the posted order, application server 118 may provide a period of exclusivity within which the trader and a counterparty associated with the posted order may negotiate terms of a transaction based on the posted order. In such embodiments, the time period during which the posted order is locked out may correspond to a time period during which the negotiation between the trader and counterparty continue, or alternatively, the posted order may be locked out for a predetermined period of time (e.g., the trader may be granted a limited period of exclusivity within which negotiations must be completed).

In step 512, application server 118 may provide an interface to the trader to facilitate direct negotiations with the counterparty associated with the posted order. For example, the interface may correspond to an instant messaging window, and web server 112 may coordinate with application server 118 to transmit information associated with the instant messaging window to client system 102 for display to the trader. For example, the instant messaging window may provide functionality that enables the trader to modify terms of the posted order, provide a personalized message to the counterparty, and optionally reveal an identity to the counterparty, as described below in reference to FIG. 6B.

FIG. 6B illustrates an exemplary negotiations window 610 that enables a trader to conduct direct negotiations with a counterparty, in accordance with disclosed embodiments. For example, as described above in reference to FIG. 6A, the trader may select order 604A, thereby indicating a desire to borrow a portion of the shares of TSLA that JPMorgan Chase & Co. is willing to lend to potential counterparties. In response to this selection, application server 118 may automatically provide negotiations window 610 to client system 102 to enable the trader to directly negotiate with a counterparty at JPMorgan Chase & Co. In such embodiments, one or more fields within window 610 may be populated automatically by application server 118 to reflect information and terms associated with order 604A.

For example, in FIG. 6B, window 610 identifies counterparty JPMorgan Chase & Co. within address field 612. As described above, address field 612 may be automatically populated by application server 118 with the counterparty associated with the order. The disclosed embodiments are not limited to such exemplary techniques, and in additional embodiments, the trader may enter any additional or alternate address information within address field 612, including but not limited to multiple recipients, as described below.

Window 610 may also enable the trader to direct a message to the counterparty identified within message field 613. For example, in FIG. 6B, the trader may enter "Looking for Tesla" in message field 613. The disclosed embodiments are not limited to such exemplary message text, and in additional embodiments, the trader may enter any additional or alternate message text appropriate to trading platform 110 (e.g., within specified character limits).

The trader may further provide an initial proposal for terms of a transaction involving the identified counterparty within fields 614 of window 610. For example, fields 614 include a direction field (e.g., "Dir") that enables the trader to specify a direction of the transaction (e.g., borrow "B" or lend "L"), a "Type" field that enables the trader to specify a transaction type (e.g., fee-based "F" or rebate-based "R"), a collateral field (e.g., "Coll") that enables the trader to specify a type of collateral (e.g., cash "C" or non-cash "N"), and a "Term" field that enables the trader to specify a temporal term for the transaction. Further, fields 614 also includes a "Stock" field that enables the trader to identify the particular financial instrument of interest, a "Quantity" field that enables the trader to specify a desired quantity of the financial instrument, a "Value" field that automatically calculates a value of the proposed quantity of instruments (e.g., based on a prior closing value), and a "Fee" field that optionally allows the trader to specify a fee or rebate associated with the proposed transaction.

For example, in FIG. 6B, the trader selected JPMorgan Chase & Co. as a potential counterparty based on a order posted by JPMorgan Chase & Co. to lend shares of Tesla stock (e.g., by lifting order 604A from order book 600). In such embodiments, application server 118 may automatically populate one or more of fields 614 (e.g., the direction field, the Type field, the collateral field, and/or the Term field) with transaction terms associated with the posted order. Further, in an embodiment, application server 118 may prevent the trader from modifying one or more of the populated fields in a manner inconsistent with the posted order. For example, application server 118 may prevent the trader from modifying the direction field from borrow "B" to lend "L" when the selected order specifies the counterparty wishes to lend securities to other traders.

For example, referring back to FIG. 6B, the trader may propose within fields 614 to borrow 10,000 shares of Tesla (i.e., "TSLA") having a value of $351,500 for an indeterminate time in exchange for a fee of 18% and cash collateral. In such embodiments, the value of the 10,000 shares of TSLA is computed based on the prior day's close of TSLA shares (e.g., $35.15 US). Further, while the trader proposes a fee of 18% for the transaction, the proposed fee is not an essential element in negotiation processes consistent with the disclosed embodiments. In additional embodiments, application server 118 may enable the trader to leave the Fee field blank, thereby enabling counterparty JPMC to quote a transaction fee necessary to execute the transaction for TSLA shares.

Further, window 614 also provides "Reveal Id" field 616, which enables the trader to optionally provide identifying information to the counterparty. For example, by checking Reveal Id field 616, the trader elects to provide such identifying information to counterparty JPMC as a part of the negotiating process. In such embodiments, the identifying information may include, but is not limited to, the trader's name, a name of the trader's firm, a type of organization with which the trader is associated, an ownership status of the subject securities (e.g., whether the trader is an owner and beneficial owner), a role of the trader in the transaction or a type associated with the trader (e.g., a middleman), a location of the trader, a trading history associated with the trader, social networking information of the trader (e.g., identifies or a number of trading partners), and any additional or alternate type of identifying information apparent to one of skill in the art and appropriate to trading platform 110. For example, in FIG. 6B, the trader elects to reveal identifying information to counterparty JPMC, and as such, the trader is identified within the proposed terms.

Alternatively, the trader may elect not to check Reveal ID field 616 and to remain anonymous while proposing initial terms for the transaction to counterparty JPMC. For example, the trader may wish to mask his or her intentions to obtain a position in the financial instrument (i.e., Tesla stock), or further, the trader may believe that the revelation of his or her identity, or identifying information, at a later stage of the negotiation may result in more advantageous terms of the transaction. In such an embodiment, the trader's identity may not be included within the initial terms proposed to counterparty JPMorgan Chase & Co.

Upon entry of the initial terms for the negotiation within fields 614, and a corresponding entry within Reveal ID field 616, the trader may check or otherwise select a "Send" icon 618. In response to the trader's selection of Send icon 618, client system 102 may transmit the initial transaction terms, and additionally or alternatively, information identifying the trader, across network 120 to a web server of trading platform 110 (e.g., web server 112).

Referring back to FIG. 5, application server 118 may receive the initial negotiation terms from client system 102 in step 514, and may transmit the initial negotiation terms as a message to a corresponding counterparty, e.g., JPMorgan Chase & Co. in step 516. For example, web server 112 may broadcast the initial terms, and additionally or alternatively, information identifying the trader, to the counterparty over network 120 using any of the communications protocols outlined above. In such embodiments, application server 118 may facilitate a messaging session through which the trader and the counterparty may directly communicate and negotiate terms for the transaction based on the posted order.

In step 518, application server 118 may generate an update to the graphical user interface provided to the trader, which may subsequently be provided to client system 102. For example, the update may include information identifying the newly-initiated negotiation and the initial transaction terms proposed by the trader. In such embodiments, and as described above, web server 112 may transmit the update over network 120 to client system 102, which may display the update to the trader within a corresponding portion of the graphical user interface, as described below in reference to FIG. 6C.

Figures 6C, 6D, 6E:
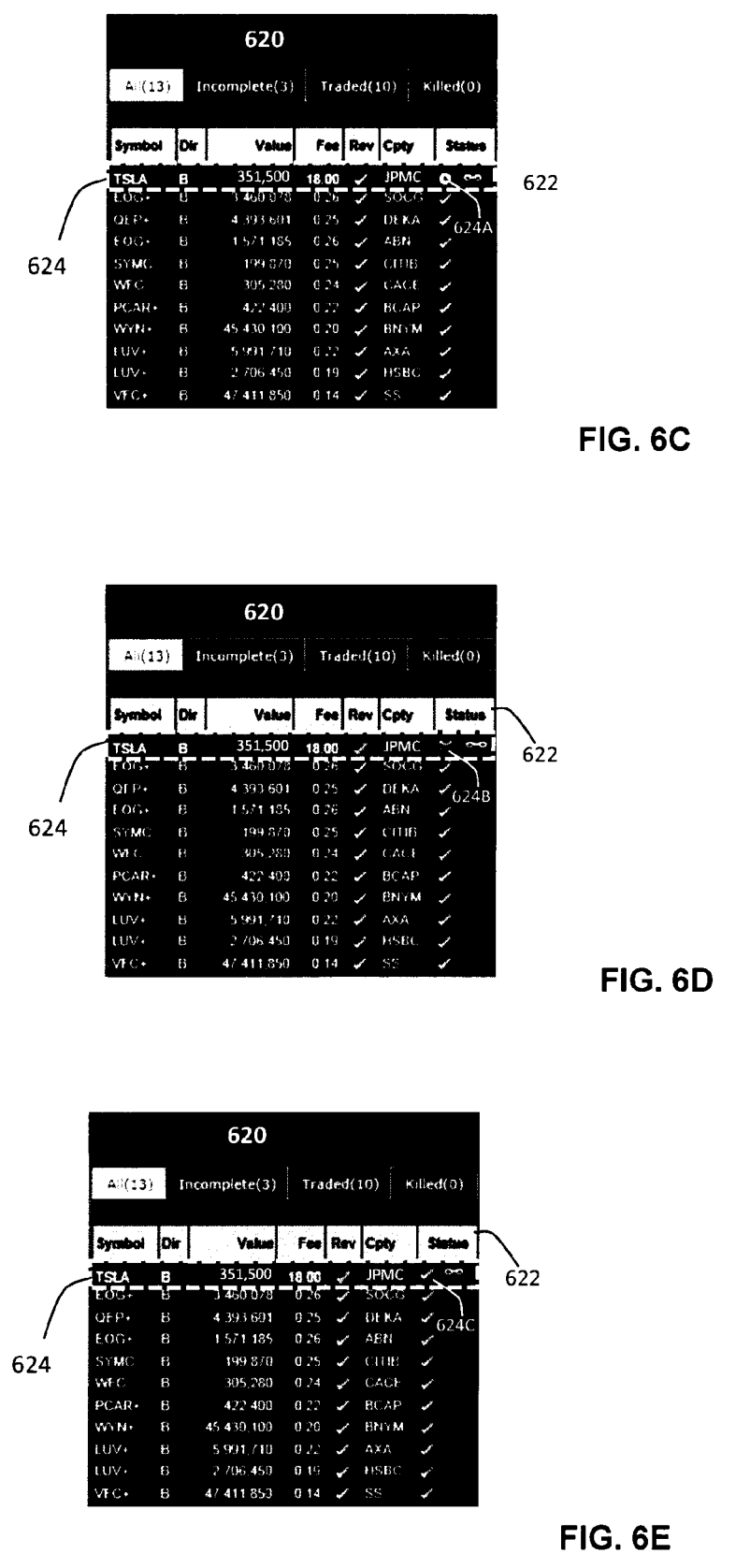

FIG. 6C illustrates an exemplary updated sidebar 620 of a graphical user interface, consistent with the disclosed embodiments. For example, updated sidebar 620 may correspond to a portion of a "Negotiations" sidebar (e.g., sidebar 410 of FIG. 4) displayed to a trader logged onto a trading platform provided by an electronic securities lending system (e.g., trading platform 110 of FIG. 1). In the embodiment of FIG. 6C, updated sidebar 620 may list one or more negotiations that involve the trader and/or a firm associated with the trade, which may be organized in accordance with a plurality of tabs 622. For example, tabs 622 may include, but are not limited to, an "All" tab that displays information on all current negotiation, an "Incomplete" tab that displays information on all incomplete negotiations, a "Traded" tab that displays information on all completed negotiations, and a "Killed" tab that displays information on all negotiations terminated by the trader or corresponding counterparties.

For example, in the embodiment of FIG. 6C, updated sidebar 620 includes entry 624 corresponding to the initial negotiation terms transmitted to counterparty JPMorgan Chase & Co. in step 516 of method 500. Entry 624 indicates that the trader proposes to borrow (e.g., "B" under the "DIR" column) shares of Tesla stock (i.e., "TSLA") from counterparty JPMorgan Chase & Co. (i.e., "JPMC") in exchange for a fee of 18% Further, icon 624A within entry 624 (i.e., under the "Status" column) indicates that the initial negotiation terms have been transmitted to the counterparty and that the trader awaits a reply from the counterparty.

Referring back to FIG. 5, application server 118 may receive a response to the trader's initial negotiation terms from the counterparty in step 520. For example, and as described above, web server 112 may have received the response from the counterparty across network 120 using any of the communications protocols outlined above. Based on the received response, application server 118 may determine in step 522 whether the counterparty ended the negotiation process in view of the trader's initial negotiation terms.

As described above, trading platform 110 may provide the counterparty, and additionally or alternatively, the trader, with an option to terminate negotiations at any point in the negotiation process with the trader. In such an embodiment, the counterparty response received by application server 118 in step 520 may indicate the counterparty's desire to terminate negotiations with the trader. For example, the counterparty may not desire to do business with the trader's firm, e.g., due to a conflict of interest, or alternatively, the initial negotiation terms provided by the trader may be wholly incompatible with the needs of the counterparty. Further, as described above, application server 118 may enable either the counterparty or the trader to terminate negotiations at any point within the negotiations process.

If application server 118 determines in step 522 that the counterparty terminates negotiations, then application server 118 may conclude the negotiation process between the trader and the counterparty in step 524, and may subsequently unlock the selected order (e.g., order 604B of order book 600) in step 526. Exemplary method 500 is then complete in step 528, and an indication of the terminated negotiation may be passed back to step 324 of exemplary method 300 of FIG. 3, which provides an update indicating a failure of the negotiation with the counterparty to the graphical user interface displayed to the trader at client system 102, as depicted in FIG. 6D.

FIG. 6D illustrates an exemplary updated sidebar 620 of a graphical user interface, consistent with the disclosed embodiments. As described above, counterparty JPMorgan Chase & Co. received the initial negotiation terms provided by the trader, and in response, elected to terminate negotiations with the trader. As such, entry 624 corresponding to the initial negotiation terms is updated to include icon 624B, which is indicative of the failed negotiation. Further, entry 624 may be moved from the "Incomplete" tab of tabs 622 to the "Killed" tab due to the termination of negotiations.

Referring back to FIG. 5, if application server 118 determines that the counterparty has not terminated negotiations in step 522, then application server 118 determines whether the counterparty has agreed to execute the transaction in accordance with the initial negotiation terms in step 530. If application server 118 determines in step 530 that the counterparty agrees to the initial negotiation terms, then application server 118 may generate and output information identifying the agreed-upon transaction terms in step 532. Exemplary method 500 then passes back to step 528, and the negotiation process is complete.

Figures 6F, 6G, 6H:
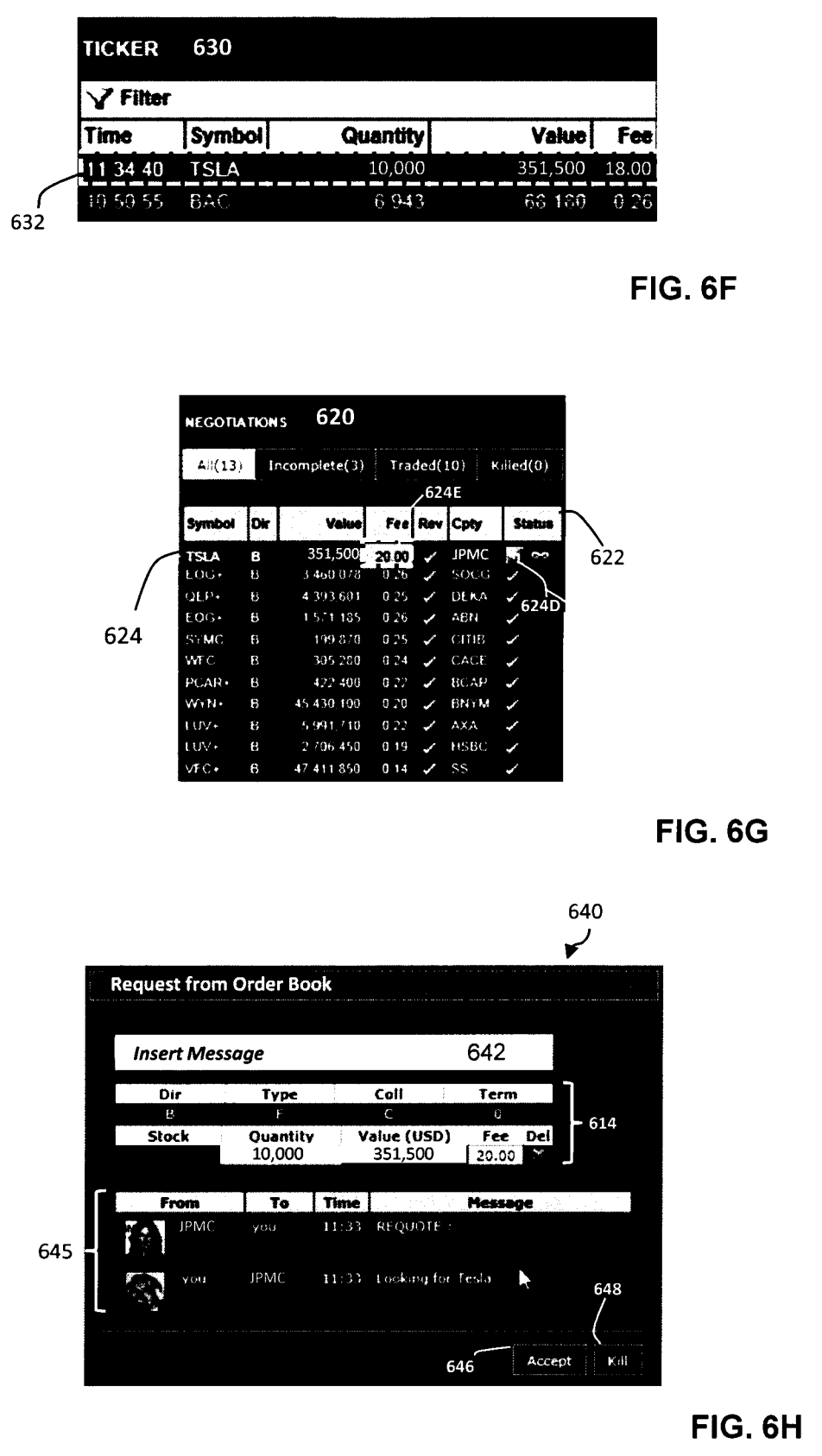

In such an embodiment, the agreed-upon transaction terms may be passed back to step 322 of exemplary method 300 of FIG. 3, which provides an update indicating a success of the negotiation with the counterparty to the graphical user interface displayed to the trader at client system 102, and which subsequently executes the transaction in accordance with the negotiated terms, as depicted in FIGS. 6E-6F FIG. 6E illustrates an exemplary updated sidebar 620 of a graphical user interface, consistent with the disclosed embodiments. As described above, counterparty JPMorgan Chase & Co. received the initial negotiation terms provided by the trader, and in response, elected to terminate negotiations with the trader. As such, entry 624 corresponding to the initial negotiation terms is updated to include icon 624C, which is indicative of the success of the negotiation. Further, entry 624 may be moved from the "Incomplete" tab of tabs 622 to the "Completed" tab due to the termination of negotiations.

Additionally, as depicted in FIG. 6F, application server 118 may also update a "Ticker" sidebar 630 displayed within a corresponding portion of the graphical user interface (e.g., sidebar 412 of GUI 400 in FIG. 4) to reflect a transaction executed in accordance with the agreed-upon terms. For example, entry 632 of FIG. 6F indicates that a transaction involving 10,000 shares of Tesla stock having a value of $351,500 US at a fee of 18% was executed by platform trading platform 110 at 11:34:40.

Referring back to FIG. 5, if application server 118 determines in step 530 that the counterparty fails to agree to the initial negotiation terms, then application server 118 may determine that the received response corresponds to a counter of the initial negotiation terms in step 533. For example, the counterparty may agree in principle to execute a transaction with the trader, but may wish to modify one or more of the material terms of the transaction. Such material terms may include, but are not limited to, a type of transaction, a value of a fee or rebate associated with the transaction, a number of shares subject to the transaction, a type of collateral associated with the transaction, and/or a temporal duration of the transaction.

In step 534, application server 118 may also provide an update to the graphical user interface of the trader that reflects the revised terms provided by the counterparty. In such embodiments, and as described above, web server 112 may transmit the update over network 120 to client system 102, which may display the update to the trader within a corresponding portion of the graphical user interface, and which may further provide the trader an opportunity to respond to the revised terms, as described below in reference to FIGS. 6G-6H.

FIG. 6G illustrates an exemplary updated sidebar 620 of a graphical user interlace, consistent with the disclosed embodiments. For example, updated sidebar 620 may correspond to a portion of a "Negotiations" sidebar (e.g., sidebar 410 of FIG. 4) displayed to a trader logged onto an electronic trading platform (e.g., trading platform 110 of FIG. 1). In the embodiment of FIG. 6G, entry 624 of updated sidebar 620 may include icon 624D, which indicates that a counter has been provided by counterparty JPMorgan Chase & Co.

Further, sidebar 620 may highlight one or more negotiation terms modified by the received counter, for example, to increase a visibility. In an embodiment, a border associated with each of the modified terms may be dashed or may be thickened to indicate the corresponding modification, and additionally or alternatively, a color of a portion of updated sidebar 620 may be modified to highlight the presence of a revised term. For example, a thickened, dashed border about entry 624E indicates that the counterparty proposes an increase in the transaction fee from 18% to 20%. The disclosed embodiments are, however, not limited to such exemplary techniques, and in further embodiments, a revised term within a corresponding entry of updated sidebar 620 may be highlighted using any of a number of additional or alternate visual cues.

Upon display of the revised terms within updated sidebar 620, the trader may select entry 624, or any term within entry 624, to obtain access to a negotiations window 640, which may enable the trader to respond to the counter provided by counterparty JPMorgan Chase & Co. FIG. 6H illustrates an exemplary negotiations window 640, in accordance with disclosed embodiments.

Similar to negotiations window 610 described above, negotiations window 640 of FIG. 6H includes a region 642 that enables the trader to include a personalized message to counterparty JPMorgan Chase & Co., and fields 614 that outline the current terms of the negotiation, which include the terms of the received counter. For example, fields 614 indicate that the counter provided by counterparty JPMorgan Chase & Co. increases the transaction fee from 18% to 20%, while leaving all other transaction terms unchanged. Further, negotiation window 640 provides messages region 645, which displays each direct communication exchanged between the trader and counterparty JPMorgan Chase & Co., and additionally or alternatively, may provide the trader with an opportunity to view a set of negotiation terms associated with each communication.

Negotiations window 640 may provide the trader with an opportunity to respond to the revised terms provided by counterparty JPMorgan Chase & Co. For example, the trader may be satisfied with the revised terms (e.g., the fee increase to 20%), and may signal acceptance of the revised terms by selecting an "Accept" icon 646. Alternatively, the trader may find the revised terms unacceptable, or further, may determine that more advantageous terms may be obtained from an additional counterparty. In such an embodiment, the trader may terminate the negotiations by selecting a "Kill" icon 648.

Further, the trader may be dissatisfied with the revised terms provided by counterparty JPMorgan Chase & Co., but may wish to continue negotiations. In such an embodiment, negotiations window 640 may enable the trader to modify one or more of the terms within fields 614 (e.g., reducing the transaction fee to 19%) and provide the modified terms in response to the counter. Upon entry of a counter or selection of icons 646 or 648, client system 102 may transmit information associated with the trader's response across network 120 to web server 112 of trading platform 110.

Referring back to FIG. 5, application server 118 may receive the trader's response to the counter in step 536, and may subsequently determine in step 538 whether the trader agrees to the revised terms of the counter. If the trader agrees to the revised terms, exemplary method 500 may pass back to step 532, and application server 118 may generate information identifying the agreed-upon transaction terms. As described above, the negotiation process is complete in step 528, and the agreed-upon transaction terms may be passed back to step 324 of exemplary method 300 of FIG. 3, which provides an update indicating a success of the negotiation to the graphical user interface displayed to the trader at client system 102.

Alternatively, if application server 118 determines that the trader does not to agree to the revised terms, then application server 118 determines whether the trader terminates the negotiations in step 540. If the trader terminates the negotiations with the counterparty in step 540, then exemplary method 500 passes back to step 524, in which application server 118 may generate an indication of the failed negotiations. Further, application server 118 may unlock the posted order in step 526, and the negotiation process is completed in step 528. In such embodiments, the generated indication may be passed back to step 324 of exemplary method 300 of FIG. 3, which provides an update indicating a failure of the negotiations to the graphical user interface displayed to the trader by client system 102.

If the trader does not terminate the negotiations in step 540, application server 118 determines in step 542 that the trader has countered the revised terms. Method 500 then passes back to step 516, and application server 118 broadcasts the terms of the trader's counter to the counterparty. In such embodiments, the exemplary negotiation processes described above may continue until either the trader or the counterparty agree to terms for the proposed transaction, or alternatively, one of the trader or the counterparty elects to terminate the negotiations.

Further, in an embodiment, trading platform 110 may impose a time limit on the negotiation process. For example, the time limit may be imposed directly, e.g., trading platform 110 terminates negotiations between the trader and counterparty after an expiration of a threshold time period, or indirectly, e.g., trading platform 110 unlocks the posted order corresponding to the negotiations after the expiration of the threshold time period to allow other parties to negotiate. In an embodiment, and in response to a direct or indirect termination, the trader and counterparty could optionally continue negotiations offline to obtain agreement, and the agreed-upon terms could be submitted to trading platform 110 for clearing, settlement, and novation through a "locked order" function outlined below in reference to FIG. 12.

In the embodiments described above, an individual trader may obtain information identifying an order book associated with a particular financial instrument (e.g., shares of Tesla stock), and may subsequently "lift" a posted order within the order book to initiate negotiations with a corresponding counterparty for a transaction involving Tesla stock. The disclosed embodiments are not, however, limited to negotiations between the trader and a single counterparty.

For example, as described above, a trader may be associated with one or more trading groups. In such embodiments, a trading group may include one or more counterparties with whom the trader often interacts and conducts business. As described above, the trader may manually generate a trading group by selecting the preferred counterparties for inclusion in the group, or alternatively, an application server associated with an electronic trading platform (e.g., application server 118 of trading platform 110 in FIG. 1) may generate a trading group programmatically by filtering a set of candidate counterparties in accordance with any arbitrary set of rules (e.g., that exclude counterparties disposed in certain geographic locations, e.g., Spain or Greece). In such embodiments, application server 118 may enable the trader to direct specific trades to a group of multiple counterparties, e.g., a trading group, as outlined below in reference to FIG. 7.

Figure 7:
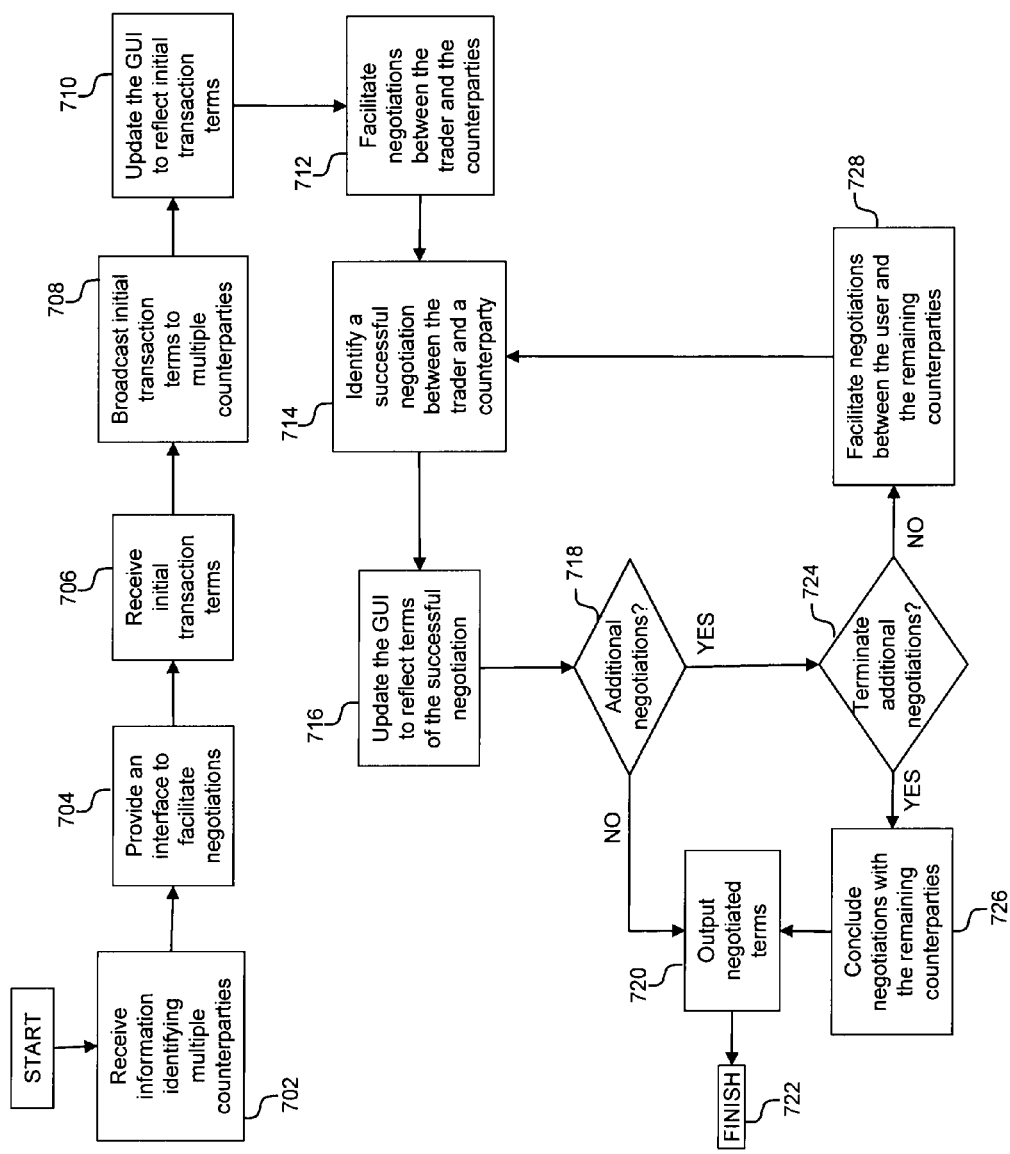
FIG. 7 is a flowchart of an exemplary method for electronically negotiating terms of a securities lending transaction between a trader and multiple potential counterparties, according to disclosed embodiments.

FIG. 7 is a flowchart of an exemplary method 700 for electronically negotiating terms of a securities lending transaction between a trader and multiple potential counterparties, according to disclosed embodiments. Method 700 may provide functionality that enables a server of an electronic trading platform (e.g., application server 118 of trading platform 110 in FIG. 1) to receive information identifying multiple counterparties from a trader and to enable the trader to simultaneously and confidentially negotiate terms of a transaction with the corresponding counterparties. In such embodiments, method 700 may be incorporated into the exemplary processes of step 322 of FIG. 3, which enable application server 118 to facilitate direct negotiations between the trader and the counterparties. As will be apparent to one of skill in the art from the present disclosure, the steps and arrangement of the same in FIG. 7 may be modified, as needed.

In step 702, application server 118 may receive information identifying a plurality of counterparties from a trader at a client system (e.g., client system 102 of FIG. 1.). For example, the trader may provide information identifying the counterparties to client system 102 (e.g., using a displayed graphical interface, and as described above), and client system 102 may transmit the information to a web server of trading platform 110 (e.g., web server 112 of FIG. 1) using the communications protocols outlined above.

Figure 8A:
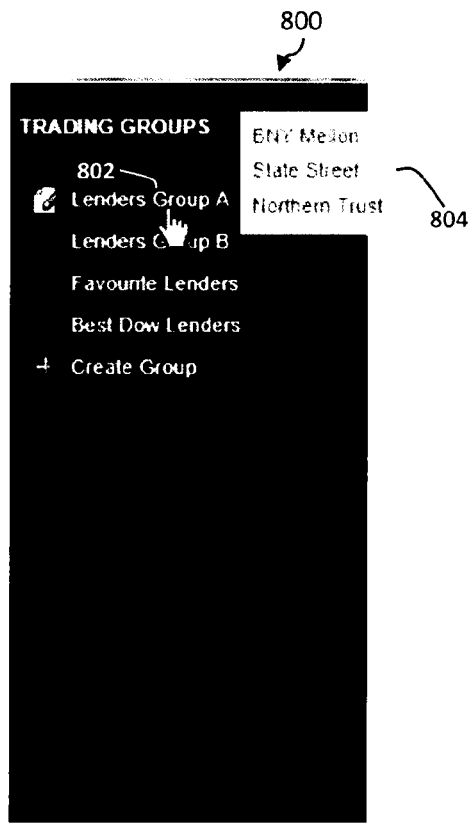

In an embodiment, the counterparties may be members of a trading group associated with the trader (e.g., "Lenders Group A" of GUI 400 in FIG. 4), and the trader may hover over an icon representing "Trading Group A" within a corresponding graphical user interface to view the counterparties associated with "Lenders Group A." For example, as depicted in FIG. 8A, the trader may hover over an icon 802 representing "Lenders Group A" in "Trading Groups" sidebar 800 to obtain a list 804 of the members of "Lenders Group A," including counterparties "BNY Mellon," "State Street," and "Northern Trust." The trader may subsequently click or otherwise select icon 802, and client system 102 may transmit information associated with the members of "Lenders Group A" to trading platform 110 as a request to initiate simultaneous negotiations with the members of "Lenders Group A."

Additionally or alternatively, as described above, the trader may access an order book associated with a corresponding security (e.g., order book 600 of FIG. 6A). Upon hovering over a counterparty associated with a posted order within the order book (e.g., counterparty "JPMC" of order 604A in FIG. 6A), the graphical user interface may display a trading group to which JPMorgan Chase & Co. belongs, and the trader may click or otherwise select the displayed trading group. In such embodiments, client system 102 may transmit information associated with the displayed trading group, and additionally or alternatively, its members, to trading platform 110 as a request to initiate simultaneous negotiations with the members.

Further, as also described above, the trader may access an interface (e.g., negotiations window 610 of FIG. 6B) that enables the trader to initiate negotiations for a transaction involving a single counterparty. In such an embodiment, and prior to entering one or more initial terms, the trader may specify additional counterparties to whom the initial terms should be broadcast. Upon entry of these additional counterparties, which may form an "ad hoc" trading group, client system 102 may transmit information associated with the displayed trading group, and additionally or alternatively, its constituent members, to trading platform 110 as a request to initiate simultaneous negotiations with the members.

Further, in an embodiment, the interface may enable the trader to specify terms of a transaction to lend or borrow shares of a single security, or alternatively shares of multiple securities. For example, the interface may enable the trader to identify each of the multiple securities, specify a quantity of shares and corresponding share value for each of the multiple securities, and enter corresponding transaction terms for each of the multiple securities. In such embodiments, the interface may enable the trader to initiate negotiations with a single counterparty for a transaction to borrow or lend a "basket" of securities.

Upon receipt of the information identifying the multiple counterparties (e.g., the members of a corresponding trading group), application server 118 may subsequently provide an interface to the trader in step 704 to facilitate direct negotiations with the each of the multiple counterparties. For example, the interface may correspond to an instant messaging window, and web server 112 may coordinate with application server 118 to transmit information associated with the instant messaging window to client system 102 for display to the trader. In such embodiments, the instant messaging window may provide functionality that enables the trader to broadcast a personalized message, initial terms for the negotiation of the transaction, and optionally, an identity of the trader, to each of the multiple counterparties, as described below in reference to FIG. 8B.

Figure 8B:
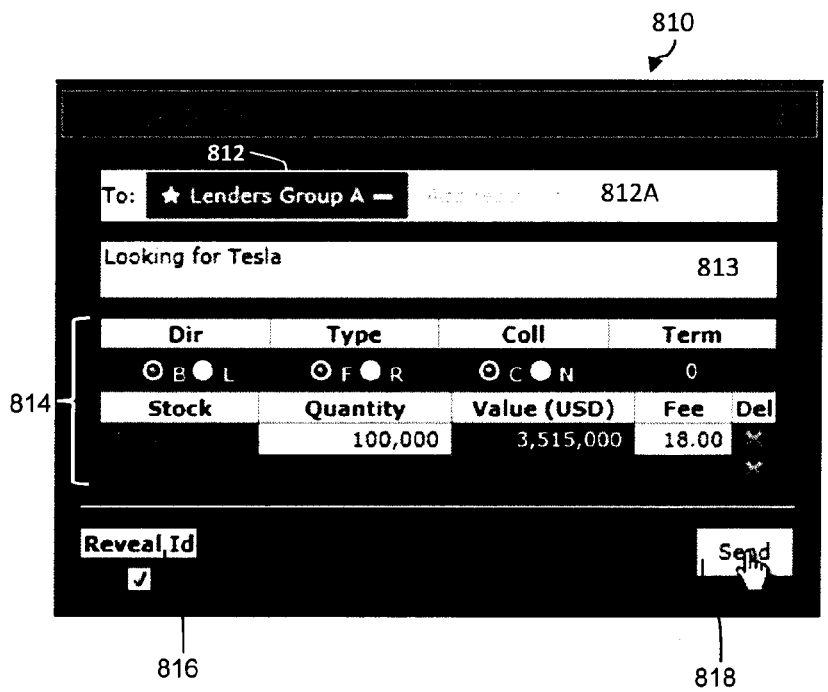

FIG. 8B illustrates an exemplary negotiations window 810 that enables a trader to confidentially conduct direct negotiations with multiple counterparties, in accordance with disclosed embodiments. As depicted in FIG. 8B, negotiations window 810 includes a region 812 specifying the multiple counterparties to which the initial negotiation terms may be directed (e.g., "Lenders Group A" described above). In such embodiments, region 812 may also include a text box 812A that enables the trader to enter one or more additional counterparties or groups of counterparties to generate an "ad hoc" trading group, as discussed above.

Negotiations window 810 may also include a text box 813 within which the trader may enter a personalized message that will be transmitted by application server 118 to each of the multiple counterparties specified in region 812. For example, in FIG. 8B, the trader has entered the phrase "Looking for Tesla" within text box 813.

Fields 814 in negotiation window 810 enable the trader to specify values for one or more initial negotiation parameters. For example, fields 814 of negotiation window 810 may also include, but are not limited to, a direction field (e.g., "Dir") that enables the trader to specify a direction of the transaction (e.g., borrow "B" or lend "L"), a "Type" field that enables the trader to specify a type of transaction fee associated with the transaction (e.g., fee-based "F" or rebate-based "R"), a collateral field (e.g., "Coll") that enables the trader to specify a type of collateral (e.g., cash "C" or non-cash "N"), and a "Term" field that enables the trader to specify a temporal term for the transaction. Further, fields 814 also include a "Stock" field that enables the trader to identify the particular security of interest, a "Quantity" field that enables the trader to specify a desired quantity of the security, a "Value" field that automatically calculates a value of the proposed quantity of securities (e.g., based on a prior day's closing value), and a "Fee" field that optionally allows the trader to specify a fee or rebate associated with the proposed transaction.

Further, in an embodiment, negotiation window 810 may enable the trader to specify terms of a transaction to lend or borrow shares of a single security, or alternatively shares of multiple securities. For example, as described above, negotiation window 810 may enable the trader to identify each of the multiple securities (e.g., within the Stock field), specify a quantity of shares and corresponding share value for each of the multiple securities (e.g., within the Quantity and Value fields), and enter corresponding transaction terms for each of the multiple securities (e.g., within the Fee field). In such embodiments, the interface may enable the trader to initiate negotiations with multiple counterparties for a transaction to borrow or lend a "basket" of securities.

Negotiations window 810 also provides a "Reveal Id" field 816, which enables the trader to optionally provide identifying information to each of the multiple counterparties. For example, by checking "Reveal Id" field 816, the trader elects to provide identifying information within the initial negotiating terms broadcast to the multiple counterparties. In such embodiments, the identifying information may include, but is not limited to, the trader's name, a name of the trader's firm, a trading history of the trader, information identifying the trader's relationship to the security (e.g., ownership), information identifying the trader's role in the transaction (e.g., a middleman), social networking information of the trader (e.g., identifies or a number of trading partners), a geographic location of the trader, and any additional or alternate type of identifying information apparent to one of skill in the art and appropriate to trading platform 110.

The disclosed embodiments are not limited to techniques that disclose information identifying the trader to each of the multiple counterparties. In additional embodiments, negotiations window 810 may afford the trader an opportunity to disclose identifying information to only a subset of the multiple trading parties. For example, the trader may desire to remain anonymous to a first subset of the multiple counterparties, who may represent competitors or unfriendly firms, and to disclose identifying information to a second subset of the multiple counterparties, which may represent friendly firms.

Additionally or alternatively, negotiations window 810 may provide the trader with an ability to disclose identifying information having various degrees of specificity. In such an embodiment, the trader may elect to remain completely anonymous to a first subset of the multiple counterparties, to be fully identified to a second subset of the multiple counterparties, and to disclose a portion of the identifying information to a third subset of the multiple counterparties in a manner that preserves the trader's strict anonymity. For example, the trader may withhold a firm name from the third subset of counterparties, while providing information identifying a trading history, a geographic location, or social networking information (e.g., common trading partners) to the third subset of counterparties.

Referring back to FIG. 8B, upon entry of data into fields 814, the trader indicates a desire to initiate negotiations with each member of "Lenders Group A" to borrow a total of 100,000 shares of Tesla stock (i.e., TSLA) valued at $3,515,000 US for an indefinite term in exchange for a fixed fee of 18% and cash collateral. As described above, the value of the proposed quantity of TSLA stock is computed automatically based on the prior day's close of TSLA shares (e.g., $35.15 US). Further, while the trader proposes a fee of 18% for the transaction, the proposed fee is not an essential element in negotiation process, and in additional embodiments, the trader may request a quote for an appropriate fee from each of the members of Lenders Group A. Furthermore, by checking "Reveal ID" field 816, the trader elects to transmit identifying information to the members of Lenders Group A as a part of the initial negotiation terms.

Once satisfied with the initial negotiation terms, the trader may subsequently click or otherwise select "Send" icon 818 in negotiations window 810, and client system 102 may transmit the initial negotiation terms to trading platform 110. In an embodiment, and as described above, client system 102 may establish communications with web server 112 of trading platform 110 and may transmit the initial negotiation terms to web server 112 using any of the communications protocols outlined above.

Referring back to FIG. 7, application server 118 may receive the information identifying the initial negotiation terms and the multiple counterparties in step 706, and in step 708, application server 118 may broadcast the initial negotiation terms to each of the multiple counterparties. For example, web server 112, in conjunction with application server 118, may transmit the initial negotiation terms to each of the members in Lenders Group A across network 120 using any of the communication protocols outlined above. In such embodiments, application server 118, in conjunction with web server 112, may serve as a conduit for negotiations between the trader and each of the multiple counterparties.

In step 710, application server 118 may provide an update that reflects the initial transaction terms to a graphical user interface displayed to the trader (e.g., by client system 102). For example, the update may identify the newly-initiated negotiations between the trader and the multiple counterparties, e.g., the members of "Lenders Group A," and the terms of these initial negotiations. In such embodiments, and as described above, web server 112 may transmit the update over network 120 to client system 102, which may display the update to the trader within a corresponding portion of the graphical user interface, as described below in reference to FIG. 8C.

Figures 8C, 8D:
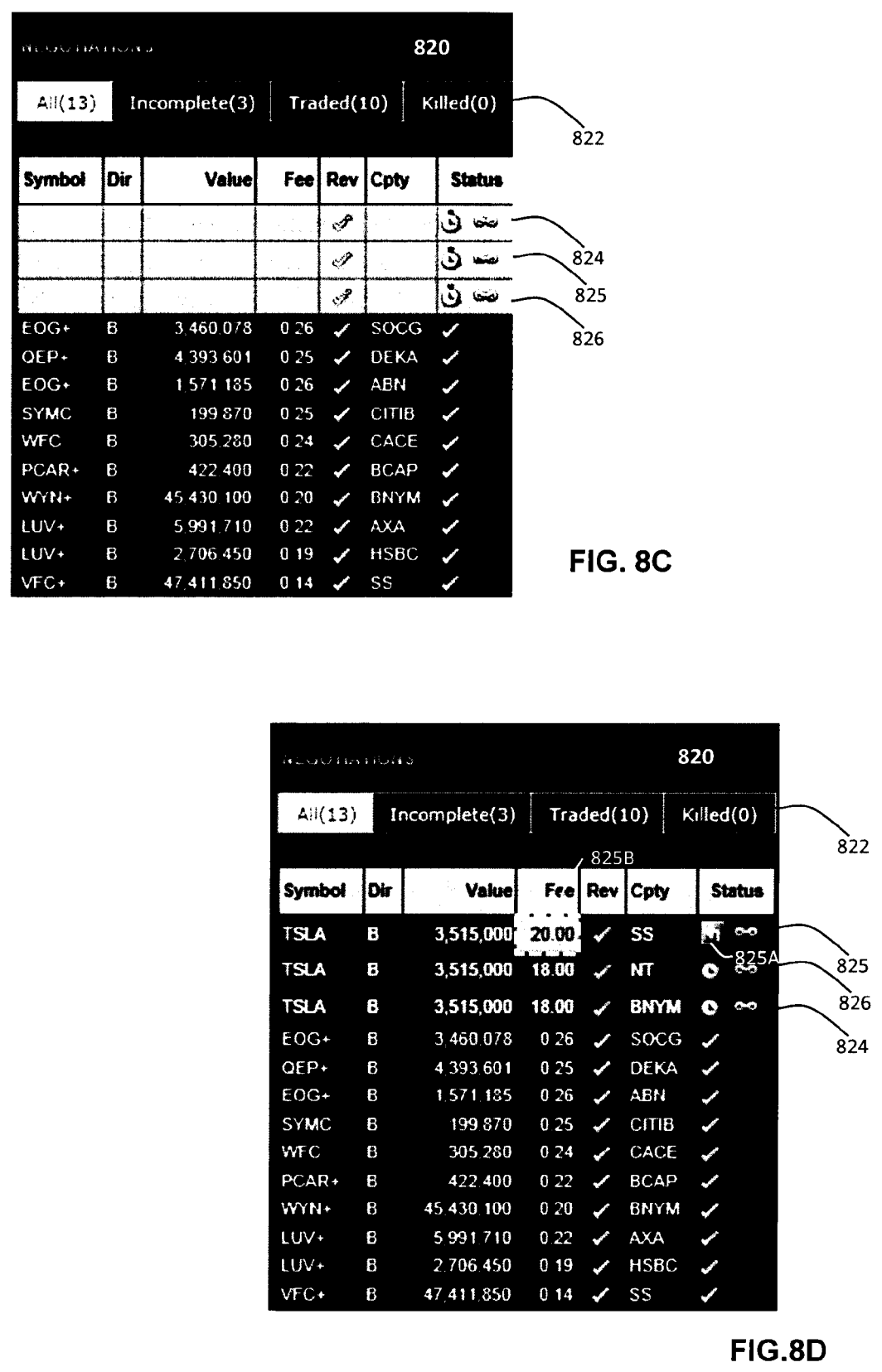

FIG. 8C illustrates an exemplary updated sidebar 820 of a graphical user interface, consistent with the disclosed embodiments. For example, updated sidebar 820 may correspond to a portion of a "Negotiations" sidebar (e.g., sidebar 410 of FIG. 4) displayed to a trader by an electronic trading platform (e.g., trading platform 110 of FIG. 1). Updated sidebar 820 may also list or more negotiations that involve the trader and/or a firm associated with the trader, which may be organized in accordance with a plurality of tabs 822. For example, tabs 822 may include, but are not limited to, an "All" tab that displays information on all current negotiations, an "Incomplete" tab that that displays information on all incomplete negotiations, a "Traded" tab that displays information on all completed negotiations, and a "Killed" tab that displays information on all negotiations terminated by the trader or corresponding counterparties.

As described above, the trader has initiated negotiations for a stock lending transaction with the members of Trading Group A, which includes BNY Mellon (i.e., "BNYM"), State Street (i.e., "SS"), and Northern Trust (i.e., "NT"). In such an embodiment, updated "Negotiations" sidebar 820 may include entry 824 corresponding to counterparty BNY Mellon, entry 825 corresponding to counterparty State Street, and entry 826 corresponding to counterparty Northern Trust. As updated "Negotiations" sidebar 820 includes only the initial negotiation terms for negotiations with these three potential counterparties, the terms displayed within entries 824, 825, and 826 are identical. Further, as depicted in FIG. 8C, entries 824, 825, and 826 each includes a "clock" or "hourglass" icon indicative of an ongoing nature of the corresponding negotiations and a "link" icon indicative of a linkage between the corresponding negotiations.

Referring back to FIG. 7, in step 712, application server 118 may facilitate an individual and confidential negotiation session between the trader and each of the multiple counterparties (e.g., BNY Mellon, State Street, and Northern Trust). Each of the negotiation sessions facilitated by application server 118 in step 712 may be comparable to those described above with respect to the individual counterparty of FIG. 5 (e.g., within steps 512-542 of method 500 in FIG. 5).

For example, and for each individual negotiation session, application server 118 may await a response to the broadcasted initial transaction terms from the corresponding counterparty. In such an embodiment, one of the counterparties, e.g., State Street, may provide a response to the initial transaction terms. As described above, trading platform 110 may enable State Street to accept the initial transaction terms, to terminate the negotiations with the trader, or alternatively, provide a counter to the initial transaction terms. For example, if State Street elects to terminate negotiations, application server 118 may provide an update a "Negotiations" sidebar provided to client system 102 that reflects the failed negotiations (e.g., by adding an appropriate icon to entry 825 of updated Negotiations sidebar 820 of FIG. 8C). Further, if counterparty State Street agrees to the initial negotiation terms, application server 118 may identify a successful negotiation between State Street and the trader, as described below in reference to step 714.

If, however, counterparty State Street provides a counter to the initial negotiation terms, application server 118 may update a graphical user interface displayed to the trader to reflect the terms of the counter. For example, as described above, the update may identify those terms modified by the counter within a corresponding entry in a Negotiations sidebar of the graphical user interface, may reorder the displayed entries to highlight the counter, and may provide the trader with an opportunity to respond to the counter, as described below in reference to FIGS. 8D and 8E.

FIG. 8D illustrates an additional portion of an exemplary updated sidebar 820 of a graphical user interface, consistent with the disclosed embodiments. As described above, and in response to the counter provided by State Street, application server 118 may reorder the entries of sidebar 820 to position entry 825, which is associated with counterparty State Street, at an initial position within the entries. Further, in FIG. 8D, re-ordered entry 825 of sidebar 820 may include an icon 825A, which indicates a response to the initial transaction terms has been received from counterparty State Street.

Sidebar 820 may also highlight each transaction term modified by the received counter to increase a visibility of the modified term. As described above, a color of a portion of sidebar 820 may be varied to visually highlight the presence of the revised term or terms. For example, a color of portion of sidebar 820 corresponding to entry 825B may be changed yellow to indicate that the State Street proposes an increase in the transaction fee from 18% to 20%. Additionally or alternatively, a border associated with each of the modified terms may be dashed or thickened to visually indicate the modification, e.g., a dashed border about entry 825B indicates may indicate the modified term.

Figure 8E:
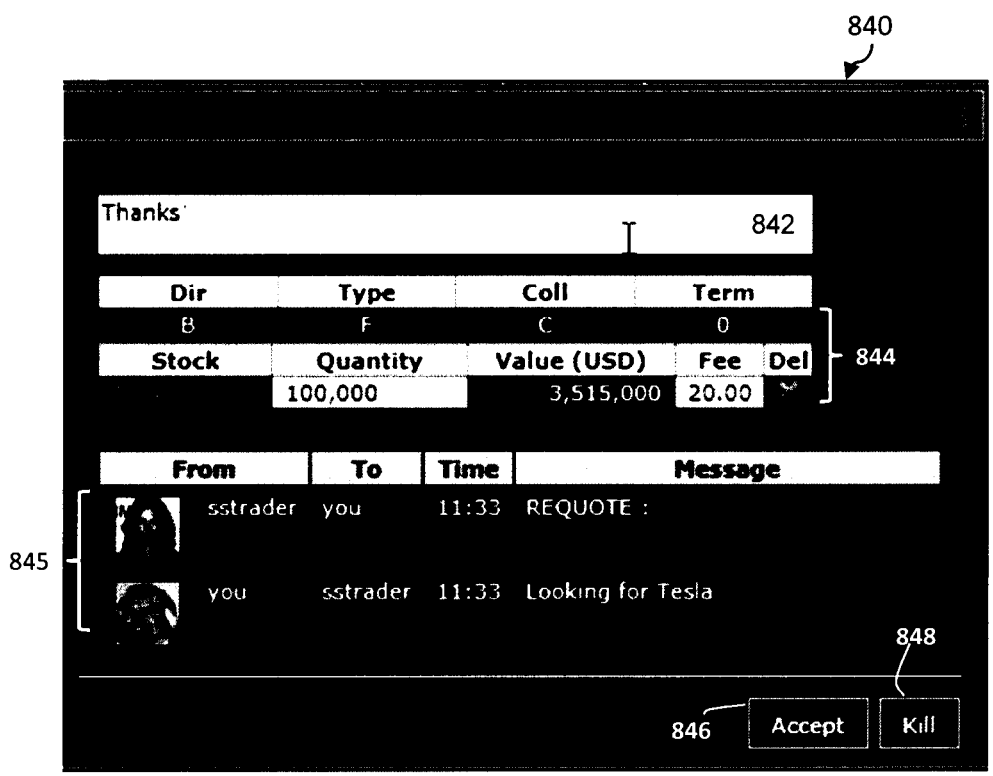

Upon display of the revised terms within updated sidebar 820, the trader may select entry 825, or any term within entry 825, to obtain access to a negotiations window 840, which enables the trader to respond to the counter provided by State Street, as described in FIG. 8E. Further, in an additional embodiment, the trader may select or click on a corresponding message within a messaging window or page of a displayed graphical user interface (e.g., associated with Messages icon 404A of FIG. 4) to obtain access to negotiations window 840.

FIG. 8E illustrates an exemplary negotiations window 840 of a graphical user interface, consistent with the disclosed embodiments. Negotiations window 840 of FIG. 8E may include a region 842 that enables the trader to include a personalized message to counterparty State Street and fields 844 that identify the current terms of the negotiation, including those modified by the counter. For example, fields 844 indicate that the counter provided by counterparty State Street increases the transaction fee from 18% to 20%, while leaving all other transaction terms unchanged. Further, negotiation window 840 provides a region 845 that displays each direct communication exchanged between the trader and counterparty State Street, and additionally or alternatively, may provide the trader with an opportunity to view a set of negotiation terms associated with each communication.

In an embodiment, negotiations window 840 may provide the trader with an opportunity to respond to the revised terms provided by counterparty State Street. For example, the trader may be satisfied with the revised terms (e.g., the fee increase to 20%), and may signal acceptance of the revised terms by selecting a "Accept" icon 846, and may include a message of "Thanks!" within region 842.

Alternatively, the trader may determine the revised terms are unacceptable, or alternatively, that more advantageous terms may be obtained from an additional counterparty. In such an embodiment, the trader may terminate the negotiations by selecting a "Kill" icon 848.

Additionally, the trader may be dissatisfied with the revised terms provided by counterparty State Street, but may wish to continue negotiations. In such an embodiment, negotiations window 840 may enable the trader to modify one or more of the negotiation terms within fields 844 (e.g., reducing the transaction fee to 19%). Upon entry of a counter or the selection of icons 846 or 848, client system 102 may transmit information associated with the trader's response across network 120 to web server 112 of trading platform 110.

Within step 712, application server 118 may receive the trader's response to the revised transaction terms provided by State Street. As described above, the trader may elect to terminate negotiations with State Street, agree to the revised transaction terms, or propose an additional counter to the revised terms. For example, if the trader elects to terminate negotiations, application server 118 may update a "Negotiations" sidebar provided to client system 102 to reflect the failed negotiations (e.g., by adding an appropriate icon to entry 825 of updated Negotiations sidebar 820 of FIG. 8C). Alternatively, if the trader agrees to the revised transaction terms, application server 118 may identify a successful negotiation between State Street and the trader, as described below in reference to step 714.

Furthermore, if the trader provides an additional counter, application server 118 may transmit information associated with the additional counter to State Street, update the Negotiations sidebar displayed to the trader (e.g., as described above in reference to FIG. 8C), and await an additional response from State Street. In such embodiments, the negotiation processes of step 712 may continue until either an agreement is reached between the trader and one or more of the counterparties (e.g., BNY Mellon, State Street, and Northern Trust) or alternatively, negotiations between the trader and each of the multiple counterparties are terminated. Furthermore, the negotiations between the trader and each of the multiple counterparties may be confidential, and no single counterparty may have knowledge of the terms of a pending negotiation with another counterparty.

Referring back to FIG. 7, in step 714, application server 118 may identify a successful negotiation between the trader and at least one of the multiple counterparties (e.g., the members of Lenders Group A). For example, as described above, the negotiations between the trader and counterparty State Street may result in an agreement on terms for a transaction that enables the trader to borrow shares of Tesla from State Street. Application server 118 may then provide information in step 716 to client system 102, which may update a Negotiations sidebar within a graphical user interface (e.g., Negotiations sidebar 820 of FIG. 8C) to reflect a success of the negotiation between the trader and State Street and the final negotiated terms.

In step 718, application server 118 may determine whether negotiations continue with any of the multiple counterparties subject to the broadcast in step 708. For example, as described above, application server 118 may broadcast the initial negotiation terms in step 708 to each member of Lenders Group A (i.e., State Street, BNY Mellon, and Northern Trust). In such embodiments, the trader may reach an agreement with counterparty State Street to borrow shares of Tesla, while continuing to negotiate with BNY Mellon and/or Northern Trust to borrow additional shares of Tesla stock.

If application server 118 determines that no additional negotiations involving with the multiple counterparties are pending in step 718, then application server generates information identifying the agreed-upon transaction terms in step 720. For example, the trader may have come to an agreement with counterparty State Street to borrow shares of Tesla, and additionally, counterparties BNY Mellon and Northern trust may have previously terminated negotiations without agreement. In such embodiments, application server 118 may generate information identifying the agreed-upon transaction terms between the trader and counterparty State Street in step 720. Exemplary method 700 is then complete in step 722, and the generated information may be passed back to step 324 of exemplary method 300 of FIG. 3, which provides an update indicating a success of the negotiation with the State Street to the graphical user interface displayed to the trader, as depicted in FIGS. 6E-6F

Alternatively, if application server 118 determines that negotiations are ongoing with other counterparties in step 718, application server 118 may provide the trader with an opportunity to terminate all ongoing negotiations, or alternatively, a subset of the ongoing negotiations, in favor of the successful negotiation in step 724. For example, as described above in reference to FIG. 8E, the trader may conclude negotiations with counterparty State Street to borrow the desired 100,000 shares of Tesla by clicking on "Accept" icon 848 of FIG. 8E. In step 720, application server 118 may provide an additional interface within which the trader may confirm an intention to execute the negotiated transaction with State Street, and terminate the additional negotiations initiated by the broadcast in step 708.

If the trader elects to terminate the additional negotiations in step 724, then application server may conclude negotiations with the remaining counterparties in step 726. For example, the trader may have accumulated the desired position in Tesla stock through the transaction with State Street, and additional negotiations with counterparties BNY Mellon and Northern Trust may be unnecessary. In such embodiments, application server 118 may terminate the negotiations with counterparties BNY Mellon and Northern Trust in step 726 in favor of the concluded negotiation with counterparty State Street.

Method 700 then passes back to step 720, in which application server 118 may generate and output information identifying the terms of the concluded negotiation with State Street, and information identifying the terminated negotiations with BNY Mellon and Northern Trust. Exemplary method 700 is then complete in step 722, and the generated information may be passed back to step 324 of exemplary method 300 of FIG. 3, which provides an update identifying the successful negotiation and the terminated negotiations to the graphical user interface displayed to the trader at client system 102.

For example, the update may reorganize entries within a Negotiations sidebar of the graphical user interface (e.g., sidebar 820 of FIG. 8C) such that an entry corresponding to the successful negotiation is identified and disposed under a tab corresponding to completed negotiations (e.g., the "Completed" tab within tabs 822 of FIG. 8C), and entries corresponding to the unsuccessful negotiations are disposed under a tab corresponding to terminated negotiations (e.g., the "Killed" tab within tabs 822 of FIG. 8C). Further, as described above, a "Ticker" sidebar within the graphical user interface (e.g., sidebar 812 of GUI 400 in FIG. 4) may be updated to reflect the terms of the executed transaction, either immediately upon execution by application server 118 or subsequent to a predetermined delay.

Referring back to FIG. 7, if the trader elects to continue the negotiations with the remaining counterparties in step 724, then application server 118 may continue to facilitate negotiations between the trader and the remaining counterparties in step 728. In such embodiments, the processes by which the trader and each of the multiple counterparties exchange corresponding offers and counters may continue, as described above, until the trader and corresponding counterparties come to an agreement on negotiated terms for a transaction, or alternatively, elect to terminate negotiations.

For example, as described above, the trader may conclude negotiations with counterparty State Street to borrow only a portion of the desired shares of Tesla stock. In such embodiments, the trader may elect to continue negotiations with counterparties Northern Trust and BNY Mellon in order to borrow additional shares of Tesla stock and accumulate the desired position.

In the embodiment of FIG. 7, trading platform 110 enables a trader to simultaneously initiate, conduct, and conclude negotiations to lend or borrow quantities of financial instruments from multiple counterparties. As described above, the multiple counterparties may be members of a trading group associated with the trader, e.g., Lenders Group A of GUI 400 described above. The disclosed embodiments are not limited to such exemplary sets of multiple counterparties, and in additional embodiments, the multiple counterparties described reference to FIG. 7 may include any arbitrary set of counterparties identified by the trader prior to initiation of negotiation (e.g., an "ad hoc" trading group), any set of multiple trading groups (e.g., a combination of the members of Lenders Group A and Lenders Group B of GUI 400), or alternatively, any subset of those counterparties associated with trading platform 110.

Further, the embodiments of FIG. 7 enable the trader to conduct simultaneous and confidential negotiations with each of the multiple counterparties. For example, the processes of FIG. 7 enable the trader to conduct three separate negotiations with corresponding members of Lenders Group A, as identified within GUI 400 of FIG. 4. In such embodiments, although the trader is simultaneously conducting negotiating with counterparties State Street, Northern Trust, and BNY Mellon, none of the multiple counterparties are aware of the negotiation terms offered to any of the other counterparties. Thus, using the exemplary processes of FIG. 7, counterparty BNY Mellon may be completely unaware during the negotiation process that counterparty State Street negotiated terms for a securities lending transaction that are more advantageous than terms for a similar transaction negotiated by BNY Mellon.

Additionally, and as described above, the exemplary processes of FIGS. 5 and 7 enable a trader to negotiate securities lending transaction with one or more counterparties in a manner that treats an identity of the trader, and additionally or alternatively, an identity of the one or more counterparties, as an essential term in the negotiation process. For example, the exemplary processes described above provide the trader with an ability to remain completely anonymous throughout a negotiation process with a counterparty, to provide identifying information at an initiation of a negotiation process with the counterparty, or alternatively, to selectively provide identifying information to the counterparty at various stages of the negotiation process.

For example, the information identifying the trader may include a name of the trader, a name of the trader's firm, or alternatively, a user name assigned to the trader by trading platform 110. The information is not limited to such exemplary means of identification, and in additional embodiments, the information identifying the trader may include, but is not limited to, a type of organization with which the trader is associated, an ownership status of a subject security (e.g., whether the trader is an owner, beneficial owner, etc.), a role of the trader in the transaction (e.g., a middleman), a geographic location of the trader, a trading history of the trader (e.g., a number and/or value of trades involving the trader at trading platform 110), a history of defaults by the trader or the trader's firm, and social networking information associated with the trader (e.g., a number of trading partners).

In such embodiments, the trader may provide the counterparty with identifying information having varying degrees of specificity at corresponding points within the negotiation process. For example, upon initiation of negotiations, the trader may elect to remain completely anonymous and provide no identifying information to the counterparty. If the trader is associated with a sufficiently high system ranking (e.g., a star in order book 600 of FIG. 6A), then the counterparty may be willing to conduct negotiations with the anonymous trader.

However, absent such a high system ranking, the trader may be required at some point within the negotiation process to provide additional identifying information to the counterparty. For example, in response to a request from the counterparty to provide identifying information, the trader may initially provide information of limited specificity, including, but not limited to information identifying a trading history within trading platform 110, and additionally or alternatively, a lack of defaults on trading platform 110, in order to advance the negotiations. In such embodiments, the counterparty may continue to request additional identifying information of greater specificity, including, but not limited to, the name of the trader's firm or the name of the trader, as a price for continuing negotiations, or alternatively, agreeing to negotiated terms that are acceptable to the trader.

Further, as described above, the trading platform 110 may enable traders (e.g., prime brokers and agent lenders operating at one or more of client systems 102 and 104) to post non-firm orders to borrow shares of a security from counterparties (i.e., bids to borrow) or to post non-firm orders to lend shares of a security to counterparties (i.e., offers to lend). Trading platform 110 may store information associated with the posted orders within a data repository (e.g., data repository 116 of FIG. 1) to form an order book for the corresponding security, which may be provided to a trader upon demand through a graphical user interface.

In an embodiment, the disclosed trading platform may also enable the trader to post an order to an order book with varying levels of anonymity. For example, trading platform 110 may enable a trader associated with a particular posting in an order book to remain completely anonymous to all other traders (e.g., order 604B within order book 600 of FIG. 6), or alternatively, to reveal an identity of the trader's firm to all traders without restriction (e.g., order 604A within order book 600 of FIG. 6).

Further, in additional embodiments, trading platform 110 may enable the trader to selectively reveal identifying information when posting orders to an order book. For example, trading platform 110 may reveal an identity of a firm associated with a posted order to only those traders associated with a specified trading group, and additionally or alternatively, within a specific group of firms identified by the trader that posted the order. For example, a posted order may reveal an identity of a trader at State Street to not only other members of Lenders Group A (e.g., BNY Mellon and Northern Trust), but also to other trading firms, e.g., JPMorgan Chase & Co., with whom the trader is attempting to build a working relationship.

In such embodiments, the exemplary processes described above may be leveraged to conduct negotiations for a securities lending transaction in which a trader and/or a counterparty remain completely or partially anonymous to each other. In such an embodiment, a trader may lift an anonymous order from a displayed order book (e.g., order 604B within order book 600 of FIG. 6A) and provide initial negotiations terms to trading platform 110 that initiate negotiations with the anonymous counterparty. Within such initial negotiation terms, the trader may elect to remain anonymous (e.g., by not selecting "Reveal ID" icon 616 within negotiations window 610 of FIG. 6B), or alternatively, the trader may elect to provide identifying information to the anonymous counterparty (e.g., by selecting "Reveal ID" icon 616 within negotiations window 610 of FIG. 6B).

Further, in an embodiment, trading platform 110 may provide appropriate interfaces (e.g., negotiations window 610 of FIG. 6B) to the trader and the anonymous counterparty to enable the trader and the anonymous counterparty to directly communicate and negotiate terms for a transaction to borrow or lend a particular security. Through such interfaces, trading platform 110 may enable the trader to request information identifying the anonymous counterparty, and additionally or alternatively, may enable the anonymous counterparty to request information identifying the trader, at any step within the negotiation process.

For example, an anonymous counterparty associated with a relatively low system ranking may post a bid to borrow securities to trading platform 110, and an anonymous trader may lift the posted bid to initiate negotiations for the desired transaction through trading platform 110. In such an embodiment, at an intermediate stage of the negotiation, the anonymous trader may request through trading platform 110 that the anonymous counterparty provide identifying information (e.g., a name of a corresponding firm) in order to obtain a reduced transaction fee or to establish a relationship with the counterparty.

As discussed above, trading platform 110 may enable the anonymous counterparty to agree to the anonymous trader's request to identify a firm, and to continue negotiations with the now-identified counterparty (e.g., through a one-way reveal). Further, as discussed above, the anonymous counterparty may elect to terminate negotiations upon receipt of the request for identification, or alternatively, submit a counteroffer to trading platform 110 that provides an alternate form of identification (e.g., a trading history), or provides additional transaction terms in an attempt to advance negotiations without revealing the counterparty's identity.

Trading platform 110 may also enable a trader to conduct simultaneous confidential negotiations with multiple counterparties. For example, the electronic trading platform may facilitate a separate negotiation with each of the multiple counterparties, and as such, the trader may elect to conduct negotiations with a subset of the multiple counterparties anonymously. For example, in such embodiments, trading platform 110 may enable the trader to conduct anonymous negotiations with one member of a trading group, while simultaneously and confidentially revealing identifying information during negotiations with the remaining members of the trading group.

In such embodiments, trading platform 110 may facilitate negotiations which an identity of the trader, and additionally or alternatively, an identity of a counterparty, may be revealed at any stage of the negotiation process. Thus, trading platform 110 may facilitate the negotiation of wholly anonymous transactions in which both the trader and the counterparty remain anonymous, or alternatively, the negotiation of one-way transactions in which either the trader or the counterparty reveal identifying information in order to advance negotiations or obtain more favorable terms for a resulting transaction.

In the embodiments described above, an electronic trading platform may enable a trader to initiate negotiations for a securities lending transaction with a counterparty, e.g., a trading firm, by lifting a posted order displayed in corresponding order book for a financial instrument, or alternatively, by directing a trade to a multiple counterparty firms associated with the trader, e.g., a trading group. The disclosed embodiments are not limited to such exemplary counterparties, and in additional embodiments, the electronic trading platform may enable a trader to directly negotiate terms of a securities lending transaction with an individual counterparty, e.g., a trading partner, with whom the trader has established a personal or professional relationship through mutual agreement.

As described above, an availability of a stock or security may depend on a number of factors, such as a "special" status of the stock or an especially high demand for that stock (e.g., subsequent to an initial public offering (IPO)). For example, a trader may search for an order book of stock of Sears Holding Corp. and may subsequently determine that a supply of Sears stock within the system is especially low due to its "special" status. In such embodiments, the trader may leverage an electronic trading platform (e.g., trading platform 110 of FIG. 1) to negotiate with an established trading partner to obtain the needed securities, as described below in reference to FIG. 9.

Figure 9:
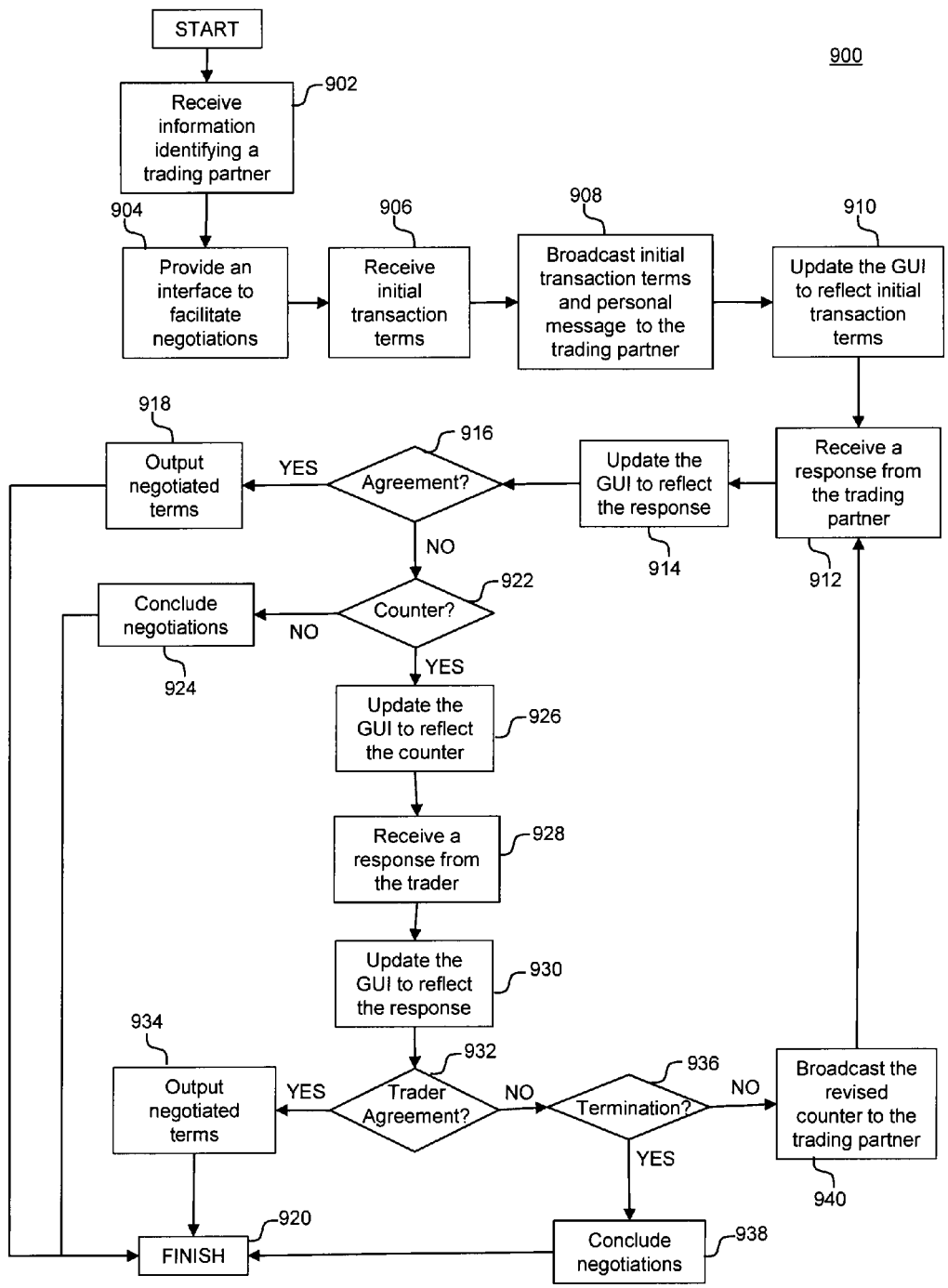
FIG. 9 is a flowchart of an exemplary method for electronically negotiating terms of a securities lending transaction between a trader and an established trading partner, according to disclosed embodiments.

FIG. 9 is a flowchart of an exemplary method 900 for electronically negotiating terms of a securities lending transaction between a trader and an established trading partner, according to disclosed embodiments. Method 900 may provide functionality that enables a server of an electronic trading platform (e.g., application server 118 of trading platform 110 in FIG. 1) to facilitate direct negotiations between a trader and an established trading partner for a transaction to lend or borrow shares of a security. In such embodiments, method 900 may be incorporated into the exemplary processes of step 322 of FIG. 3, which enable application server 118 to facilitate direct negotiations between the trader and the one or more counterparties. Further, as will be apparent to one of skill in the art from the present disclosure, the steps and arrangement of the same in FIG. 9 may be modified, as needed.

For example, application server 118 may provide a graphical user interface to a client system associated with a trader (e.g., client system 102 of FIG. 1), and client system 102 may process the received information to display the graphical user interface to the trader. As described above, the graphical user interface may include a sidebar that displays information identifying existing trading partners associated with the trader and information on pending requests to establish counterparties as trading partners, as described below in reference to FIG. 10A.

Figure 10A:
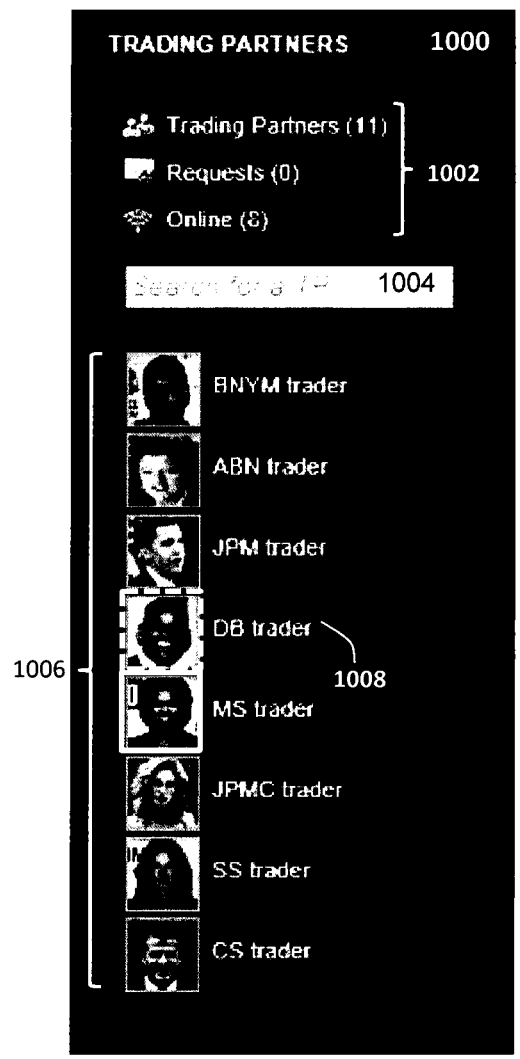

FIG. 10A illustrates an exemplary sidebar 1000 that displays information associated with trading partners of a trader, in accordance with disclosed embodiments. As described above, sidebar 100 may be incorporated within a portion of a graphical user interface (e.g., "Trading Partner" sidebar 408 within GUI 400 of FIG. 4).

Sidebar 1000 includes a region 1002 that displays statistics regarding the trading partners associated with the trader. For example, as depicted in FIG. 10A, such statistics may include, but are not limited to, a number of existing trading partners, a number of outstanding requests to establish new trading partners, and a subset of the existing trading partners that are currently online and available for negotiations. In the embodiment of FIG. 10A, the trader is associated with eleven trading partners, eight of which are currently online and available for negotiations.

Further, in the embodiment of FIG. 10A, sidebar 1000 may provide a text box 1004 that enables the trader to enter a query and identify existing trading partners, and additionally or alternatively, potential trading partners. Sidebar 100 may include information 1006 identifying at least a subset of the existing trader partners. For example, information 1006 may be include, but not limited to, avatars or images of the trading partners that indicate a level of activity and availability of the corresponding trading partner to negotiate within trading platform 110. In such embodiments, a green border surrounding an avatar of a trading partner may indicate that the trading partner is online and currently active, while an orange border may indicate that the trading partner is online, but inactive. Thus, in sidebar 1000, the avatar for "DB trader" may be surrounded by a green border, and as such, "DB trader" is logged into and active within trading platform 110. Similarly, an orange border may surround "MS trader" in sidebar 1000 indicates that "MS trader" may be logged into trading platform 110, but is currently inactive.

The disclosed embodiments are, however, not limited to such indicia of trading partner activity and in further embodiments, a thickness of a border, a style of the border (e.g., dashed or broken), and any additional or alternate visual indicator may identify a level of activity of the corresponding trading partner. For example, a dashed border surrounding an avatar of a trading partner may indicate that the trading partner is online and currently active (e.g., "DB Trader"), while an solid border may indicate that the trading partner is online, but inactive (e.g., "MS trader"). Further, in additional embodiments, the level of activity and the availability of a trading partner may be indicated by a colored circle surrounding the corresponding avatar displayed in sidebar 1000 (e.g., a green circle indicates the trading partner is online and currently active, and an orange circle indicates the trading partner is online, but inactive).

In such embodiments, the trader may click on or otherwise select an avatar associated with an online and available trading partner 1008, e.g., "DBTrader," and client system 102 may transmit a request to initiate negotiations with "DBTrader" across network 120 to trading platform 110. As discussed above, client system 102 may request may include information identifying the selected trading partner (i.e., DBTrader), and the request may be transmitted to a web server associated with trading platform 110 (e.g., web server 112 of FIG. 1) using any of the communications protocols outlined above.

Furthermore, while the trader may receive a timely response from an online and available trading partner, the disclosed embodiments may enable the trader to click on an avatar of an online, but inactive, trading partner in order to transmit a request to initiate negotiations with the inactive trading partner. In such embodiments, the request may be stored with an inbox or message queue associated with the inactive trading partner (e.g., within a messaging page associated with Messaging icon 404A of GUI 400) for subsequent retrieval and action.

Referring back to FIG. 9, application server 118 may receive the information identifying the selected trading partner in step 902, and may subsequently initiate negotiations between the trader and the selected trading partner in step 904 by providing a corresponding interface, e.g., a negotiations window, to client system 102 over network 120. In such embodiments, client system 102 may display the negotiations window to the trader within a corresponding portion of a graphical user interface, as described below in reference to FIG. 10B.

Figure 10B:
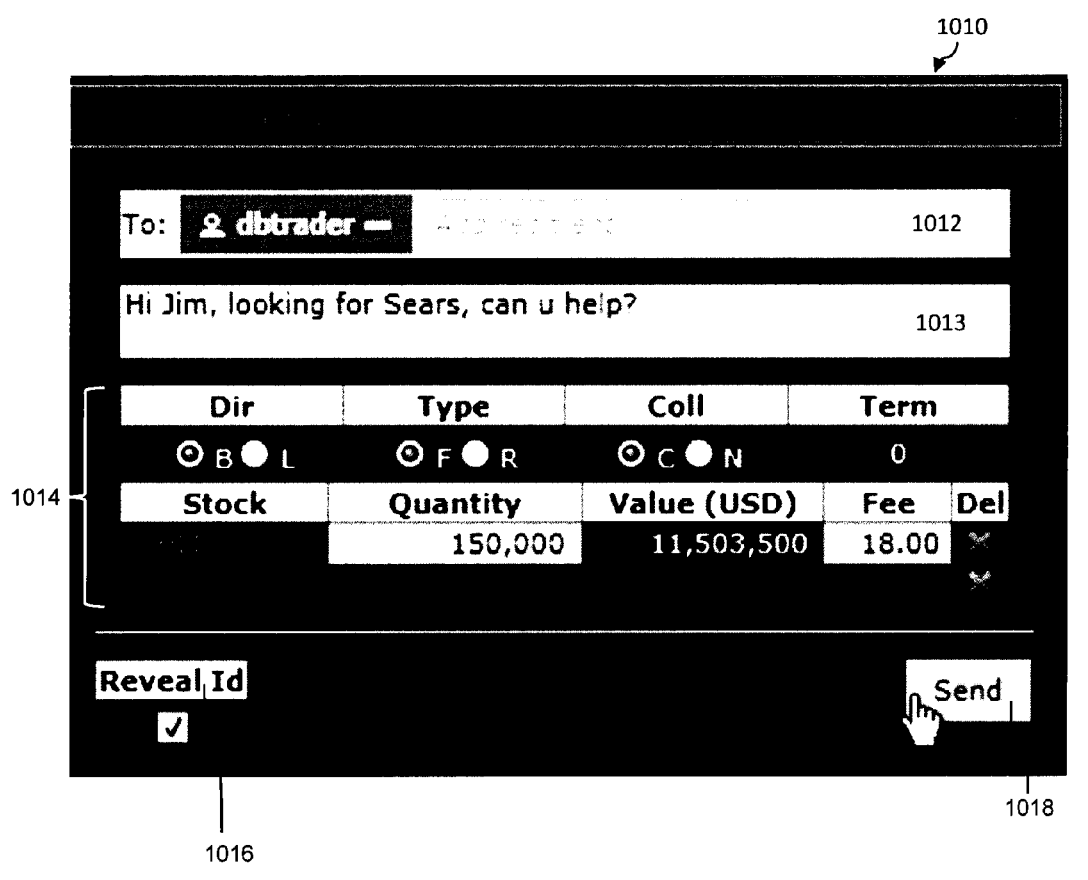

FIG. 10B illustrates an exemplary negotiations window 1010 that enables a trader to conduct direct negotiations with a trading partner, in accordance with disclosed embodiments. For example, as described above in reference to FIG. 10A, the trader may select existing trading partner 1008, e.g., "DBTrader," as a counterparty for negotiations for shares of a special stock, e.g., Sears Holdings Corp., and application server 118 provides negotiations window 1010 to facilitate the trader's entry of an initial set of terms for the negotiation with DBTrader.

In FIG. 10B, negotiations window 1010 includes an address region 1012, which application server 118 may automatically populate with DBTrader's address information. In additional embodiments, the trader may be able to add additional counterparties within address region 1012, and the initial negotiation terms may be broadcast to each of the counterparties identified in address region 1012. Application server 118 may then establish separate and confidential negotiations with each party, as described above in reference to FIG. 7.

Negotiations window 1010 may also enable the trader to provide a message to DBTrader within message field 1013. For example, as a personal or business relationship may exist between the trader and trading partner DBTrader, the trader may enter a personalized, informal text message to DBTrader in message field 1013 (e.g., "Hi Jim, looking for Sears, can u help?"). The disclosed embodiments are not limited to such exemplary messages, and in further embodiments, the trader may enter any additional or alternate message appropriate to trading platform 110 (e.g., within specified character limits).

The trader may specify initial terms for a transaction involving the trading partner "DBTrader" within fields 1014 of window 1010. For example, fields 1014 includes a direction field (e.g., "Dir") that enables the trader to specify a direction of the transaction (e.g., borrow "B" or lend "L"), a "Type" field that enables the trader to specify a type of transaction fee (e.g., fee-based "F" or rebate-based "R"), a collateral field (e.g., "Coll") that enables the trader to specify a type of collateral (e.g., cash "C" or non-cash "N"), and a "Term" field that enables the trader to specify a temporal term for the transaction. Further, fields 1014 also include a "Stock" field that enables the trader to identify a particular security of interest, a "Quantity" field that enables the trader to specify a desired quantity of the security, a "Value" field that automatically calculates a value of the proposed quantity of the security (e.g., based on a prior day's closing value), and a "Fee" field that optionally allows the trader to specify a fee or rebate associated with the proposed transaction. Further, and as described above, a "Reveal Id" field 1016 in negotiations window 1010 confirms the trader's intention to disclose identifying information to trading partner "DBTrader."

For example, in FIG. 10B, the trader requests assistance from "DBTrader" in borrowing 150,000 shares of Sears Holding Corp. ("SHLD") having a value of $11,503,500 US for an indefinite term in exchange for a fee of 18% and cash collateral. In such embodiments, the value of the 150,000 shares of Sears Holding Corp. may be computed based on the prior day's close, and further, while the trader proposes a fee of 18% for the transaction, the proposed fee is not an essential element in negotiation processes. In additional embodiments, application server 118 may allow the trader to leave the "Fee" field blank, thereby enabling counterparty "DBTrader" to quote a transaction fee at which he is willing to execute the transaction.

Upon entry of the initial terms for the negotiation within fields 1014, the trader may click or otherwise select a "Send" icon 1018. In response to the trader's selection of "Send" icon 1018, client system 102 may transmit the initial transaction terms and information identifying the trader across network 120 to a web server of trading platform 110 (e.g., web server 112 of FIG. 1).

Referring back to FIG. 9, in step 906, application server 118 may receive the initial negotiation terms and the personalized message from the trader, and application server 118 may then broadcast the initial negotiation terms and the personalized message to the identified trading partner, e.g., "DBTrader," in step 908. Application server 118 may then generate information updating the graphical user interface displayed to the trader to reflect the pending negotiations with "DBTrader," and the information may be provided to client system 102 in step 910. For example, as described above, web server 112 may transmit the information across network 120 to client system 102, which subsequently renders and displays the updated graphical user interface to the trader, as described below in reference to FIG. 10C.

Figure 10C:
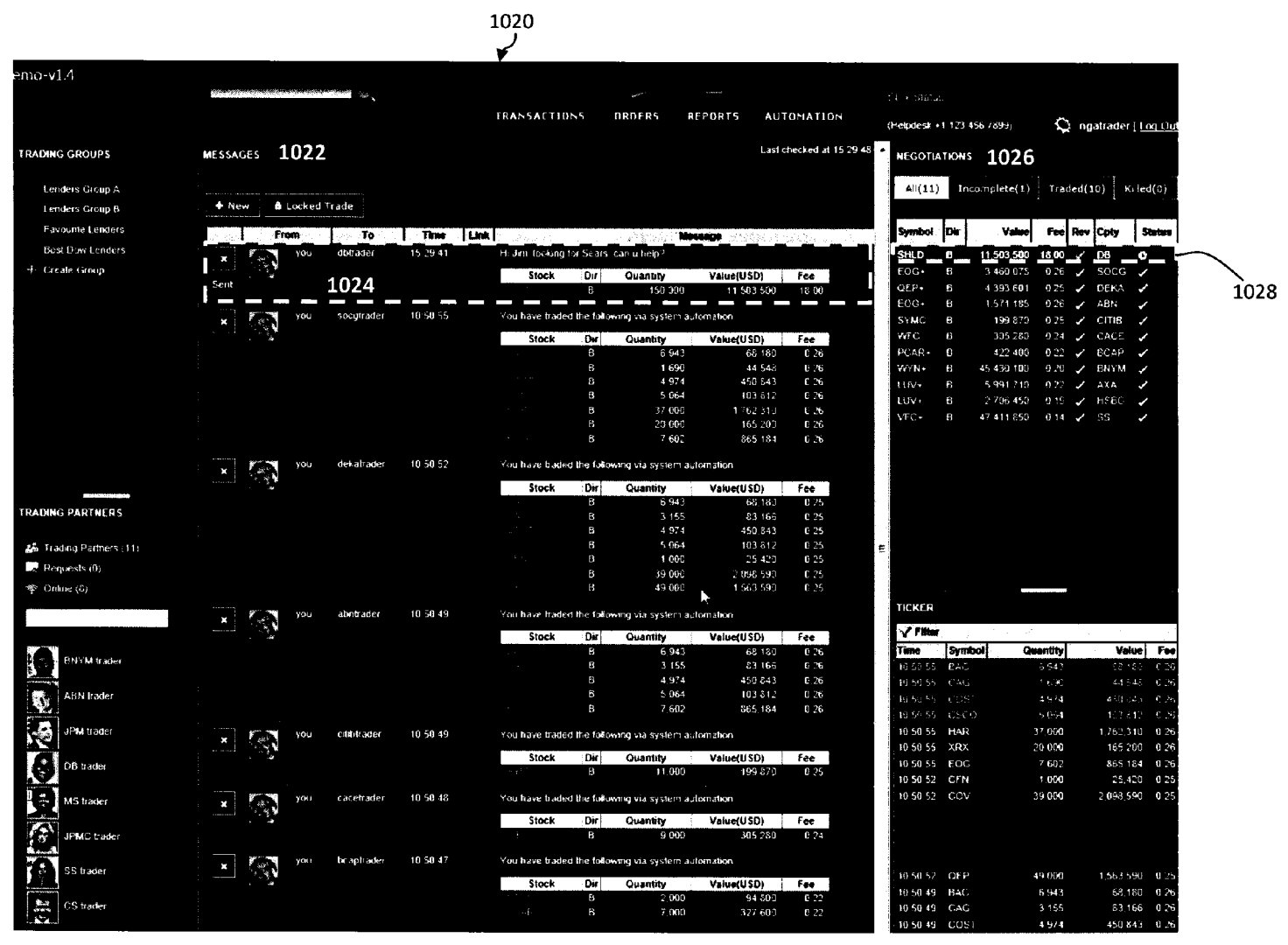

FIG. 10C illustrates an exemplary portion of an updated graphical user interface 1020, which may be displayed to a trader in accordance with disclosed embodiments. For example, interface 1020 may represent an update to a graphical user interface initially displayed to the trader by trading platform 110 (e.g., GUI 400 of FIG. 4) and may include additional information identifying the pending negotiations for shares of Sears Holding Corp. between the trader and trading partner "DBTrader."

For example, upon initiating negotiations with "DBTrader," application server 118 may update a messaging page 1022 of interface 1020 (e.g., associated with Messages icon 404A of FIG. 4) to include information 1024 identifying the personal message transmitted to "DBTrader" and the initial negotiation parameters. For example, information 1024 may include an avatar or image associated with the trader, information identifying the sender and recipient of the message, a time of transmission, the personalized message to "DBTrader" (e.g., as specified within field 1013 of negotiations window 1010), and information identifying elements of the initial negotiation parameters provided to "DBTrader." The disclosed embodiments are, however, not limited to such descriptive information, and in additional embodiments, message information 1024 may include any additional or alternate information that would be apparent to one of skill in the art and of interest to the trader.

Further, application server may also update a sidebar 1026 to include information 1028 identifying the ongoing negotiation between the trader and trading partner "DBTrader." For example, information 1028 may include, but is not limited to, information identifying a stock symbol of Sears Holding Corp. ("SHLD"), a direction of the associated negotiation (e.g., borrow "B"), a value of the requested shares, a fee associated with the transaction, information ("Rev") indicating whether the trader revealed an identity, information identifying the counterparty (e.g., "DBTrader"), and a status icon indicating an ongoing nature of the negotiation.

In such embodiments, application server 118 may continuously provide updates to interface 1020 in response to a change in status in the negotiation between the trader and trading partner "DBTrader." For example, as described below, application server may provide an additional update to interface 1020 when "DBTrader" provides a response to the initial negotiation terms, when the trader provides a response to a counteroffer of "DBTrader," or when the trader and trading partner "DBTrader" agree on a set of terms.

Referring back to FIG. 9, application server 118 may receive a response to the initial negotiation terms from the identified trading partner (i.e., "DBTrader") in step 912. Application server 118 may generate information updating the graphical user interface to reflect the response received from "DBTrader," and the update may be provided to client system 102 in step 914. For example, as described above, web server 112, the trader, and "DBTrader" may exchange responses and updates across network 120 to web server 112 using any of the communications protocols outlined above.

The response provided by "DBTrader" may indicate an agreement with the initial negotiation terms specified by the trader, a decision to terminate negotiation with the trader, or alternatively, a counter that modifies one or more of the initial negotiation terms. In such embodiments, application server 118 may determine in step 916 whether "DBTrader" agrees to the initial negotiation terms provided by the trader.

If application server 118 determines in step 916 that "DBTrader" agrees to the initial negotiation terms, then application server 118 may generate and output information identifying the agreed-upon transaction terms in step 918. Exemplary method 900 then passes to step 920, and the negotiation process is complete between the trader and trading partner "DBTrader." In such an embodiment, the agreed-upon transaction terms may be passed back to step 324 of exemplary method 300 of FIG. 3, which provides an update indicating a success of the negotiation with the "DBTrader" to the graphical user interface displayed to the trader at client system 102, as depicted in FIG. 10D.

Figure 10D:
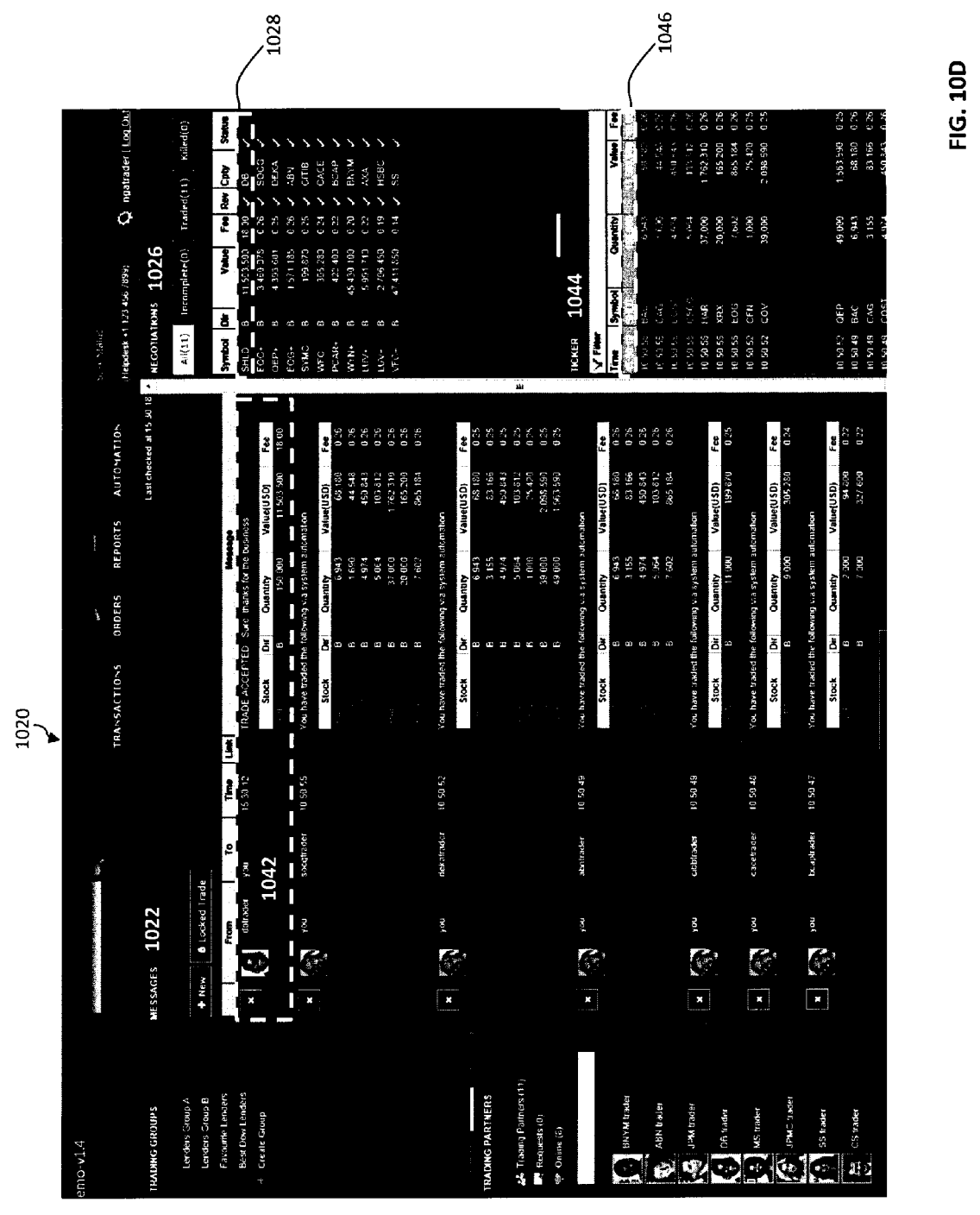

FIG. 10D illustrates an additional portion of an updated graphical user interface 1020, which may be displayed to a trader in accordance with disclosed embodiments. For example, interface 1020 may include an update that reflects the response received from trading partner "DBTrader" to the initial negotiation terms, and upon agreement with the initial transaction terms, the execution of the transaction to borrow shares of Sears Holding Corp. in accordance with the initial negotiation parameters.

For example, application server 118 may update a messaging page 1022 of interface 1020 (e.g., associated with Messages icon 404A of FIG. 4) to include information 1042 identifying the personal message transmitted from "DBTrader" to the trader in response to the initial negotiation terms. For example, information 1042 may include an avatar or image associated with "DBTrader," information identifying the sender and recipient of the message, a time of transmission, the personalized message from "DBTrader" indicating agreement with the initial negotiation parameters (e.g., "Sure, thanks for the business"), and information identifying elements of the agree-upon negotiation terms. The disclosed embodiments are, however, not limited to such descriptive information, and in additional embodiments, message information 1042 may include any additional or alternate information that would be apparent to one of skill in the art and of interest to the trader.

Further, application server may also update entry 1028 within sidebar 1026 to indicate a successful completion of the negotiation between the trader and trading partner "DBTrader." For example, updated information 1028 may include, but is not limited to, information identifying a stock symbol of Search Holding Corp. ("SHLD"), a direction of the associated negotiation (e.g., borrow "B"), a value of the requested shares, the agree-upon fee associated with the transaction, information ("Rev") indicating whether the trader revealed an identity, information identifying the counterparty (e.g., "DBTrader"), and an updated status icon indicating the successful completion of the negotiation. Further, in an embodiment, sidebar 1026 may be reorganized such that entry 1028 is placed under a "Completed" tab indicative of the successful negotiation.

Further, as described above, application server 118 may execute the transaction to borrow shares of Sears Holding Corp. in accordance with the agreed-upon terms of the negotiation, i.e., the initial negotiation terms. In such an embodiment, updated interface 1020 may also include an updated Ticker sidebar 1044, which includes an entry 1046 associated with the executed transaction. In such an embodiment, entry 1046 may include, but is not limited to, a time of execution, information identifying a stock symbol of Search Holding Corp. ("SHLD"), a number of shares subject to the executed transaction, a value of the shares, the fee associated with the executed transaction. Further, as described above, Ticker sidebar 1044 may be updated to include entry 1046 immediately upon execution, or after a predetermined delay subsequent the execution of the trade.

Referring back to FIG. 9, if the trading partner (i.e., "DBTrader") fails to agree to the initial negotiation parameters in step 916, then application server 118 determines in step 922 whether the response provided by "DBTrader" includes a counter that modifies one or more of the initial transaction terms. If application server 118 determines in step 922 that the response does not include a counter, then "DBTrader" elected to terminate negotiations, application server 118 concludes negotiations between the trader and "DBTrader" in step 924. Method 900 then passes back to step 920, and the negotiation process between the trader and trading partner "DBTrader" are complete. In an embodiment, the generated indication may be passed back to step 324 of exemplary method 300 of FIG. 3, which provides an update indicating a failure of the negotiations with "DBTrader" to the graphical user interface displayed to the trader by client system 102.

For example, a message associated with a decision by the trading partner to terminate negotiations may be displayed to the trader within a corresponding Messaging page of the graphical user interface (e.g., Messaging page 1022 within interface 1020 of FIG. 10D). Further, within a Negotiations sidebar (e.g., sidebar 1026 of FIG. 10D), an entry associated with the failed negotiation (e.g., entry 1028) may be updated to include a status icon indicative of the failed negotiation, and the corresponding entry may be placed under a "Killed" tab indicative of the failed negotiation.

If, however, application server 118 determines in step 922 that the response from "DBTrader" includes a counter, application server 118 may provide an update to the graphical user interlace that reflects the revised transaction terms of the counter in step 926. Application server 118 may then await a response from the trader to the counter, which may be received by application server 118 in step 928.

For example, application server 118 may have updated a graphical user interface displayed to the trader (e.g., within Messaging page 1022 and Negotiations sidebar 1026, as described above), and the trader may have selected a corresponding message within Messaging page 1002 to view and provide a response to the counter. In such embodiments, the trader may either accept the revised terms associated with the counter, elect to terminate negotiations with "DBTrader" in response to the counter, or alternatively, provide an additional counter to the revised terms provided by "DBTrader" (e.g., using negotiations window 1010, as described above).

Upon receipt of the trader's response to the counter in step 928, application server 118 may update portions of a graphical user interface (e.g., messaging page 1022 and sidebar 1026 of interface 1020) in step 930 to reflect the trader's response. Application server 118 may then determine, based on the response received from the trader, whether the trader agrees to counter in step 932.

If the trader agrees to the counter, then application server 118 may generate and output information identifying the agreed-upon transaction terms (i.e., the terms specified in the counter provided by "DBTrader") in step 934. Exemplary method 900 then passes back to step 920, and the negotiation process between the trader and trading partner "DBTrader" is complete. In such embodiments, the agreed-upon transaction terms may be passed back to step 324 of exemplary method 300 of FIG. 3, which provides an update indicating a success of the negotiation with DBTrader to the graphical user interface displayed by client system 102 (e.g., within Negotiations sidebar 1026 and Ticker sidebar 1044 of FIG. 10D, as described above).

If, however, the trader does not agree to the terms set forth in the counter, then application server 118 determines in step 936 whether the trader's response indicates a termination of negotiations with "DBTrader." If the trader elects to terminate negotiations in step 936, then application server 118 may conclude negotiation between the trader and "DBTrader" in step 938. Method 900 then passes back to step 920, and the negotiation process between the trader and trading partner "DBTrader" is complete. In an embodiment, an indication of the terminated negotiations may be passed back to step 324 of exemplary method 300 of FIG. 3, which provides an update indicating a failure of the negotiation with the counterparty to the graphical user interface displayed by client system 102 (e.g., within messaging page 1022 and negotiations sidebar 1026 of updated interface 1020, as described above).

Alternatively, if the trader elects to continue negotiations in step 936, the response received from the trader in step 928 includes a modification to one or more of the terms set forth in the counter (i.e., the trader responded with an additional counter). Application server 118 then broadcasts the revised negotiation terms to trading partner "DBTrader" in step 940. For example, the revised terms may be provided to trading partner "DBTrader" within a message transmitted across network 120 by web server 112 using any of the communications protocols outlined above.

Method 900 then passes back to step 912, and application server 118 awaits a response from the trading partner to the counter provided by the trader in step 928, and application server 118 may continue to facilitate negotiations between the trader and the trading partner, as described above. In such embodiments, the negotiations between the trader and trading partner "DBTrader" may continue with a series of proposals and counterproposals until agreement is reached, or alternatively, until either the trader or trading partner "DBTrader" elects to terminate the negotiation process.

In the embodiments described above, a trader is able to select a single trading partner and conduct negotiations with that trading partner to lend or borrow securities without any reference to a posted order within a corresponding order book for the financial instruments. The disclosed embodiments are, however, not limited to negotiations with a single trading partner. In an additional embodiments, the trader may leverage a negotiations window (e.g., negotiations window 1010 of FIG. 10B) to identify additional trading partners, additional counterparties, and further, additional trading groups or subsets thereof, to which application server 118 broadcasts the initial negotiation terms. In such embodiments, trading platform 110 may enable the trader to participate in multiple confidential negotiation sessions with each of the identified counterparties, as described above.

Figure 11:
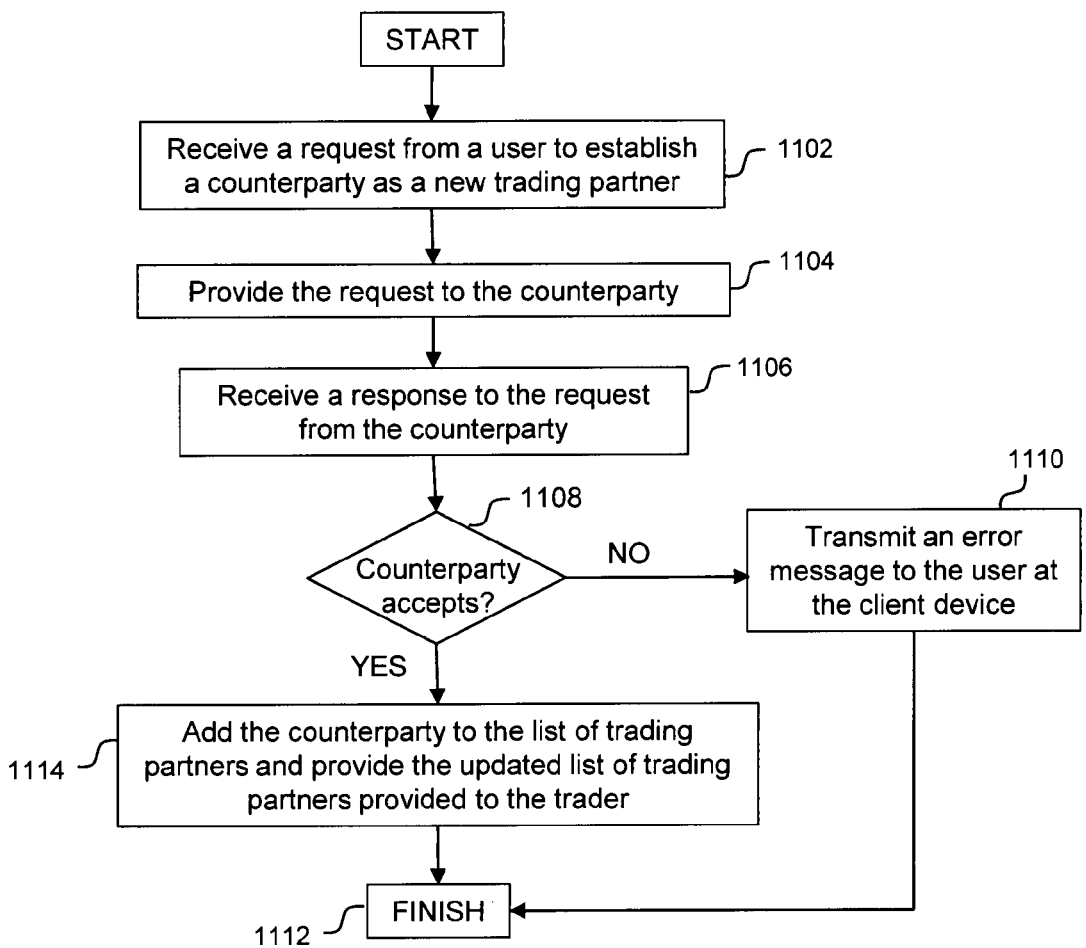
FIG. 11 is a flowchart of an exemplary method for electronically establishing a trading partnership between counterparties, according to disclosed embodiments.

FIG. 11 is a flowchart of an exemplary method 1100 for electronically establishing a trading partnership between two counterparties, according to disclosed embodiments. Method 1100 may provide functionality that enables a server of an electronic trading platform (e.g., application server 118 of trading platform 110 in FIG. 1) to receive a request to establish a trading partnership between a trader and a counterparty, to forward the request to the counterparty, and upon acceptance of the request, establish the counterparty as a trading partner.

In FIG. 11, application server 118 may receive a request from a trader to establish an identified counterparty as a trading partner in step 1102. For example, the counterparty may represent a colleague at a friendly firm with whom the trader has established a professional or personal relationship. Further, the trader may have knowledge of and confidence in the counterparty sufficient to regularly conduct securities lending borrowing transactions with counterparty.

In an embodiment, application server 118 may receive the request from a client system associated with the trader (e.g., client system 102 of FIG. 1), which may display a graphical user interface to the trader. For example, the trader may search for the counterparty (e.g., within text box 408B of a "Trading Partners" sidebar 408 in FIG. 4), and may initiate a transmission of the request through the displayed graphical user interface. In response to the initiation, client system 102 may transmit the request and information to application server 118 of trading platform 110 across network 120 using any of the communications protocols outlined above.

Upon receipt of the request, application server 118 may provide the received request to the counterparty in step 1104. In an embodiment, application server 118 may provide the request through a messaging functionality provided by a graphical user interface of trading platform 110 (e.g., through an interface associated with Messaging icon 404A of GUI 400). Additionally or alternatively, application server 118 may provide the request to the counterparty via email, text mail, or using any additional or alternate techniques apparent to one of skill in the art.

Application server 118 may subsequently receive a response from the counterparty in step 1106. In an embodiment, the received response may include information indicating the counterparty's agreement to the proposed trading partnership, or alternatively, information indicating the counterparty's determination to decline the trading partnership. In additional embodiments, the counterparty's response may include a personalized message for the trader, which may be provided to the trader by application server 118.

In step 1108, application server 118 may determine whether the counterparty accepts the trader's offer of a trading partnership. If the counterparty declines to become a trading partner, then application server 118 may generate a message indicating the counterparty's decision, which may be provided to the trader in step 1110. In an embodiment, the message may be provided to the trader through a messaging functionality provided by a graphical user interface (e.g., through a messaging page associated with Messaging icon 404A of GUI 400). Additionally or alternatively, application server 118 may provide the information to the trader via email, text mail, or using any additional or alternate techniques apparent to one of skill in the art. Exemplary method 1100 is then complete in step 1112.

If application server 118 determines in step 1108 that the counterparty accepted the trader's invitation to become a trading partner, then in step 1114, application server 118 may add the counterparty and information identifying the counterparty (e.g., an image or avatar and a corresponding name) to the a corresponding portion of the graphical user interface (e.g., within "Trading Partners" sidebar 408 within GUI 400 of FIG. 4), which may be provided to client system 102 for display to the trader. Further, in an embodiment, while the new trading partner may be known to the trader, application server 118 may maintain a level of confidentiality so that the new trading partner has no knowledge of any other established trading partner associated with the trader. Application server 118 may also store the information identifying the new trading partner within a corresponding portion of a data repository (e.g., data repository 116 of FIG. 1). Exemplary method 1100 is complete in step 1112.

In the embodiments described above, an electronic trading platform (e.g., trading platform 110 of FIG. 1) facilitates an online negotiation process in which a trader and one or more counterparties agree to terms for a transaction to lend or borrow one or more securities, which may be executed and subsequently submitted to a central clearing party (e.g., CCP 130 of FIG. 1) for clearing and settlement. The trader and the counterparty may, however, discuss and subsequently agree upon terms for a transaction to lend or borrow the securities outside of the electronic environment of trading platform 110. In such embodiments, the trader and the counterparty may access trading platform 110 to execute such transactions, i.e., "locked trades," in accordance with the prior agreed-upon terms, which may be fed into CCP 130 for clearing and settlement, as described below in reference to FIG. 12.

Figure 12:
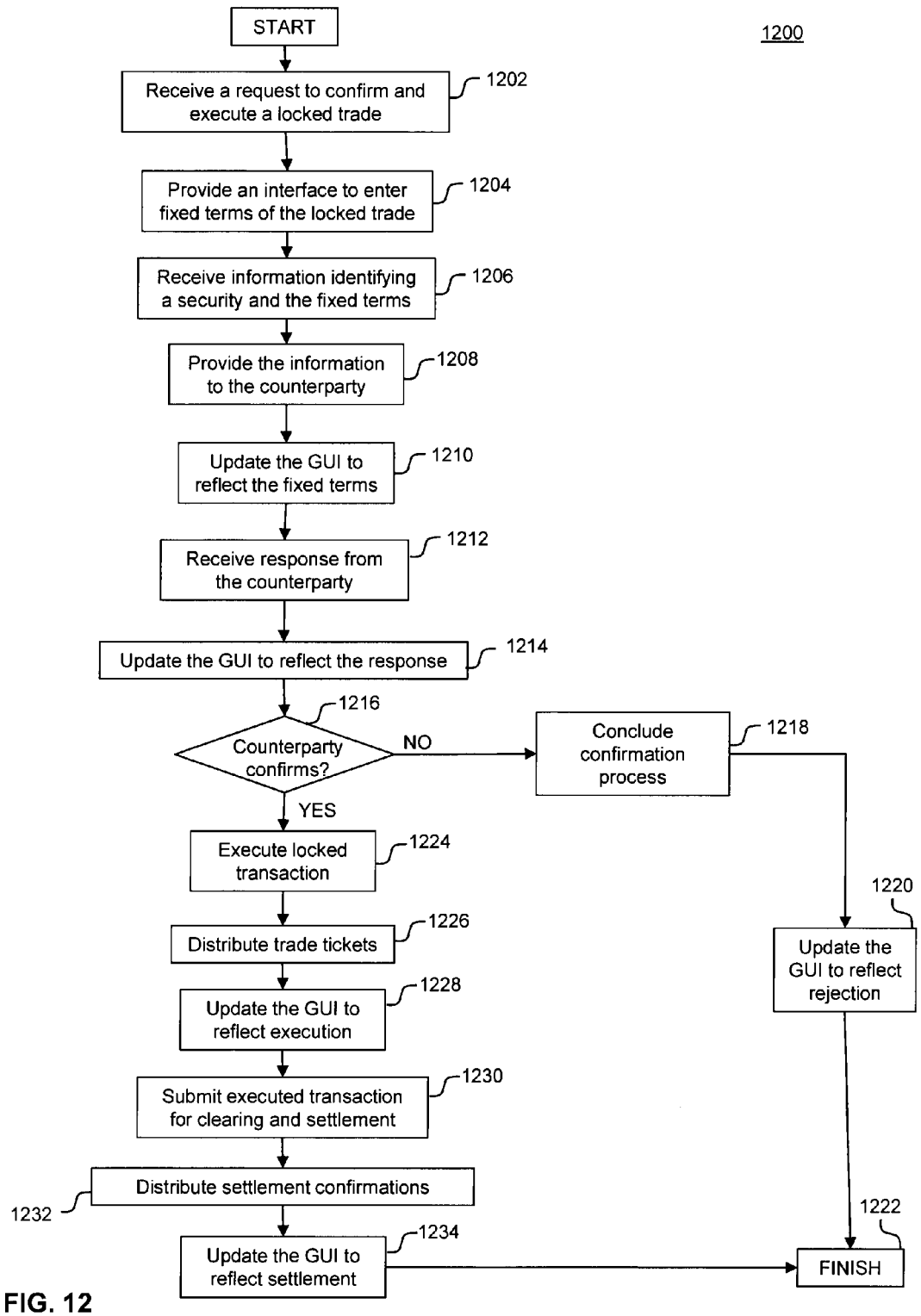
FIG. 12 is a flowchart of an exemplary method for electronically executing a locked transaction, according to disclosed embodiments.

FIG. 12 is a flowchart of an exemplary method 1200 for electronically executing and settling a locked transaction, according to disclosed embodiments. Method 1200 may provide functionality that enables a server of an electronic trading platform (e.g., application server 118 of trading platform 110 in FIG. 1) to receive a set of terms to which a trader and counterparty previously agreed, and subsequently execute a locked transaction in accordance with the agreed-upon terms. As will be apparent to one of skill in the art from the present disclosure, the steps and arrangement of the same in FIG. 12 may be modified, as needed.

In step 1202, application server 118 may receive a request from a trader to confirm and execute a locked transaction with a counterparty. A "locked transaction" or "locked trade" refers to a transaction whose terms are established offline and away from trading platform 110 in accordance with an agreement between the trader and the counterparty. In such an embodiment, the trader and counterparties may wish to access the clearing and settlement functionalities available to trading platform 110, without accessing the negotiation functions described above. In contrast to the embodiments outlined above, the confirmation and subsequent execution of the "locked trade" enables the trader and counterparty to merely assent to the fixed terms without any substantive negotiation.

For example, in an embodiment, the trader may access trading platform 110 using the processes described above, and upon authentication, may be provided a graphical user interface (e.g., graphical user interface 400 of FIG. 4). In such embodiments, the trader may access a portion of a messaging page associated with the graphical user interface (e.g., messaging page 1022 of FIG. 10C), and may click or otherwise select a corresponding icon to request confirmation and execution of a locked transaction with a counterparty, which may be transmitted from a corresponding client system (e.g., client system 102 of FIG.) to application server 118. The disclosed embodiments are, however, not limited to such exemplary techniques, and in additional embodiments, the trader may request confirmation and execution of the locked transaction using any other functionality of the graphical user interface, or any additional or alternate techniques apparent to one of skill in the art, including but not limited to email or text messaging a request to trading platform 110.

Upon receipt of the request in step 1202, application server 118 may initiate processing of the locked transaction by providing a corresponding interface, e.g., a locked trade window, to client system 102 over network 120 in step 1204. In such embodiments, client system 102 may display the locked trade window to the trader within a corresponding portion of a graphical user interface to facilitate entry of the fixed terms associated with the transaction.

Figure 13A:
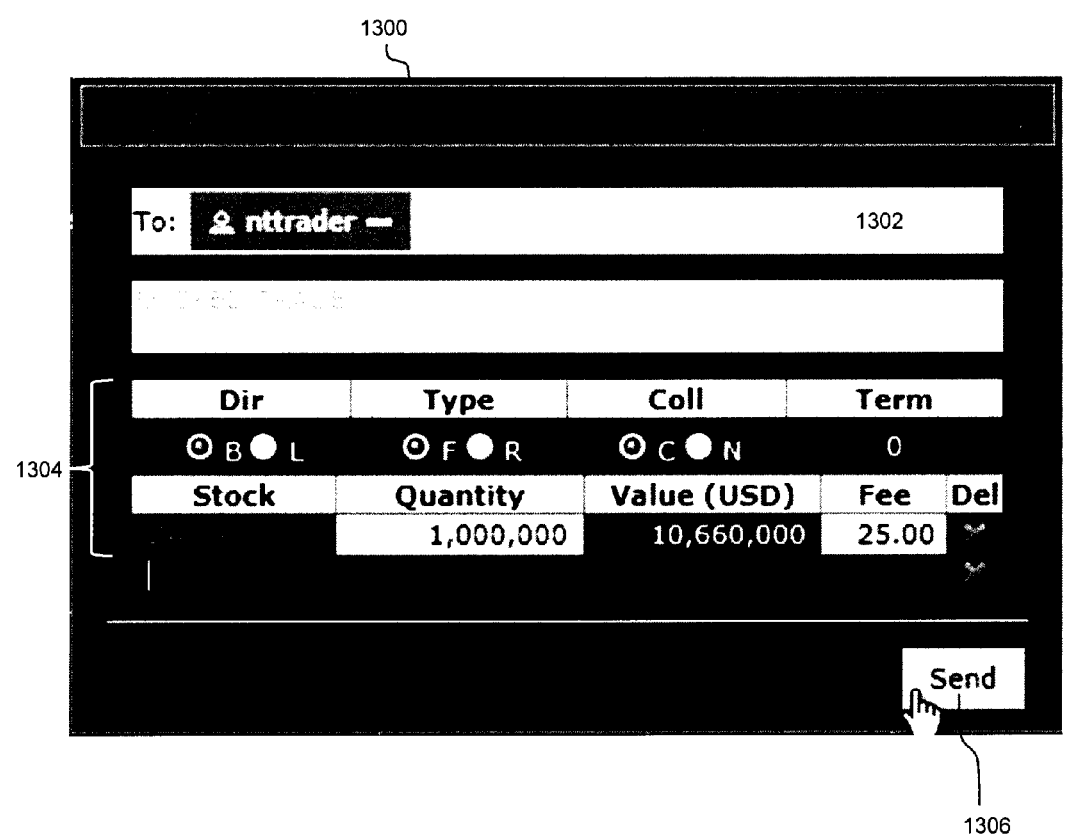

For example, as depicted in FIG. 13A, a locked trade window 1300 includes an address field 1302, within which the trader may enter information identifying the counterparty (e.g., "nttrader"), and fields 1304 that enable the trader to enter the fixed terms of the locked transaction. For example, fields 1304 includes a direction field (e.g., "Dir") that enables the trader to specify a direction of the transaction (e.g., borrow "B" or lend "L"), a "Type" field that enables the trader to specify a type of transaction fee (e.g., fee-based "F" or rebate-based "R"), a collateral field (e.g., "Coll") that enables the trader to specify a type of collateral (e.g., cash "C" or non-cash "N"), and a "Term" field that enables the trader to specify a temporal term for the transaction. Further, fields 1304 also include a "Stock" field that enables the trader to identify the particular security of interest, a "Quantity" field that enables the trader to specify a desired quantity of shares of the security, a "Value" field that automatically calculates a value of the desired shares (e.g., based on a prior day's closing value), and a "Fee" field that allows the trader to specify a fee or rebate associated with the transaction.

For example, in FIG. 13A, the trader may enter terms identifying a locked transaction to borrow 1,000,000 shares of Zagg Inc., having a value of $10,660,000 US from counterparty "nttrader" in exchange for cash collateral and a transaction fee of 25%. In contrast to the negotiation processes described above, the transaction fee for the locked transaction is an essential term, as trading platform 110 may only provide counterparty "nttrader" with an opportunity to accept or reject the fixed terms.

The disclosed embodiments are not limited to locked transactions involving shares of a single security, and in additional embodiments, locked trade window 1300 may enable the trader to specify terms of a locked transaction to lend or borrow shares of multiple securities. For example, locked trade window 1300 may enable the trader to specify each of the multiple securities within a Stock field, specify a quantity of shares (e.g., within the Quantity field) and corresponding share value (within a Value field) for each of the multiple securities, and enter corresponding transaction terms for each of the multiple securities with the Fee field. In such embodiments, locked trade window 1300 may enable the trader to confirm and execute terms for a locked transaction to borrow or lend a "basket" of securities.

Upon entry of the fixed terms for the negotiation within fields 1304, the trader may check of otherwise select a "Send" icon 1306. In response to the trader's selection of Send icon 1306, client system 102 may transmit the fixed transaction terms and information identifying the counterparty and trader across network 120 to a web server of trading platform 110 (e.g., web server 112).

Referring back to FIG. 12, application server 118 may receive the terms of the locked transaction and the information identifying the trader and counterparty in step 1206, and application server 118 may provide the fixed terms of the locked transaction to the counterparty (i.e., "nttrader") in step 1208. Application server 118 may then generate information updating the graphical user interface displayed to the trader to reflect the outstanding locked transaction with "nttrader," and the information may be provided to client system 102 in step 1210. For example, as described above, web server 112 may transmit the information across network 120 to client system 102, which subsequently render and display the updated graphical user interface to the trader, as described below in reference to FIG. 13B.

Figure 13B:
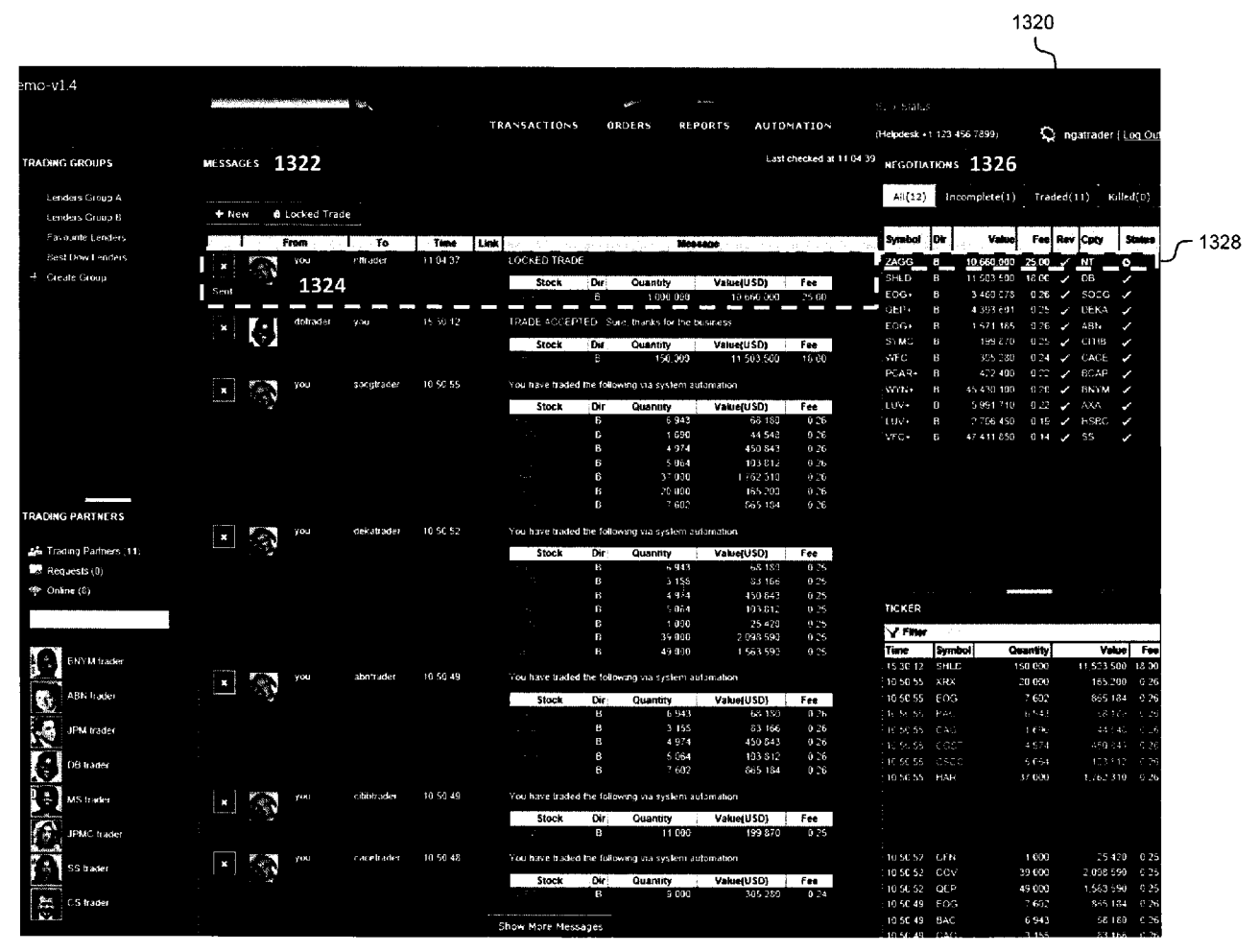

FIG. 13B illustrates an exemplary portion of an updated graphical user interface 1320, which may be displayed to a trader in accordance with disclosed embodiments. For example, interface 1320 may represent an update to the graphical user interface initially displayed to the trader (e.g., GUI 400 of FIG. 4), and may include additional information identifying the pending locked transaction for shares of Zagg, Inc., between the trader and counterparty "nttrader."

For example, upon initiating confirmation of a locked transaction with "nttrader," application server 118 may update a messaging page 1322 of interface 1320 (e.g., associated with Messages icon 404A of FIG. 4) to include information 1324 identifying the terms of the fixed transaction provided to counterparty "nttrader." For example, information 1024 may include an avatar or image associated with the trader, information identifying the sender and recipient of the message, a time of transmission, and information identifying elements of the fixed transaction terms provided to "nttrader." In contrast to the negotiation processes described above between, for example, established trading partners, the confirmation of the terms of the locked transaction does not enable the trader to provide a personalized message to "nttrader."

Further, application server 118 may also update a sidebar 1326 to include information 1328 identifying the locked transaction between the trader and counterparty "nttrader." For example, information 1328 may include, but is not limited to, information identifying a stock symbol of Zagg Inc. ("ZAGG"), a direction of the locked transaction (e.g., borrow "B"), a value of the requested shares, a fee associated with the locked transaction, information ("Rev") indicating whether the trader revealed an identity, information identifying the counterparty (e.g., "nttrader"), and a status icon indicating an pending nature of the locked transaction.

In such embodiments, application server 118 may continuously provide updates to interface 1320 in response to a change in status in the locked transaction between the trader and counterparty "nttrader." For example, as described below, application server may provide an additional update to interface 1020 when "nttrader" provides a response that accepts or rejects to the fixed transaction terms.

Referring back to FIG. 12, application server 118 may receive a response from the counterparty (i.e., "nttrader") to the fixed terms of the locked transaction in step 1212. In step 1214, application server 118 may subsequently generate information updating the graphical user interface displayed to the trader to reflect the response received from counterparty "nttrader," which may be provided to client system 102.

In contrast to the negotiation processes outlined above, the response to the locked transaction terms provided by "nttrader" includes either a confirmation of the terms or a rejection of the terms. In such embodiments, application server 118 may determine in step 1216 whether the response from "nttrader" indicates confirmation of the fixed terms of the locked transaction.

If application server 118 determines in step 1216 that "nttrader" rejects the terms of the locked transaction, then application server 118 may conclude the confirmation processes in step 1218 and update the graphical user interface displayed to the trader in step 1220 to reflect the rejection of the fixed terms. For example, a message associated with decision by "nttrader" to terminate negotiations may be displayed to the trader within a corresponding "Messaging" page of the graphical user interface (e.g., Messaging page 1322 within interface 1320 of FIG. 13B). Further, within a Negotiations sidebar (e.g., sidebar 1326 of FIG. 13B), a status icon within an entry corresponding to the failed negotiation (e.g., entry 1328) may be updated to reflect the failed negotiation, and the corresponding entry may be placed under a "Killed" tab indicative of the failed negotiation. The processes of FIG. 13 are then complete in step 1222.

Alternatively, if application server 118 determines in step 1216 that the response of "nttrader" confirms the terms of the locked transaction, then application server 118 may execute the locked transaction in step 1224 in accordance with the confirmed terms, and generate transaction receipts or "trade tickets" memorializing the terms for the locked transaction in which the trader borrowed the 1,000,000 shares of Zagg Inc. from counterparty "nttrader." In step 1226, application server 118 may then distribute the generated trade tickets for the executed locked transaction to the trader and counterparty "nttrader." For example, the generated trade tickets may be transmitted by web server 112 to the trader and the corresponding counterparties over network 120 using one or more of the communications protocols outlined above. Additionally or alternatively, application server 122 may provide the generated trade tickets to the trader and counterparty within portions of corresponding displayed graphical user interfaces (e.g., under "Messages" icon 404A of GUI 400).

Figure 13C:
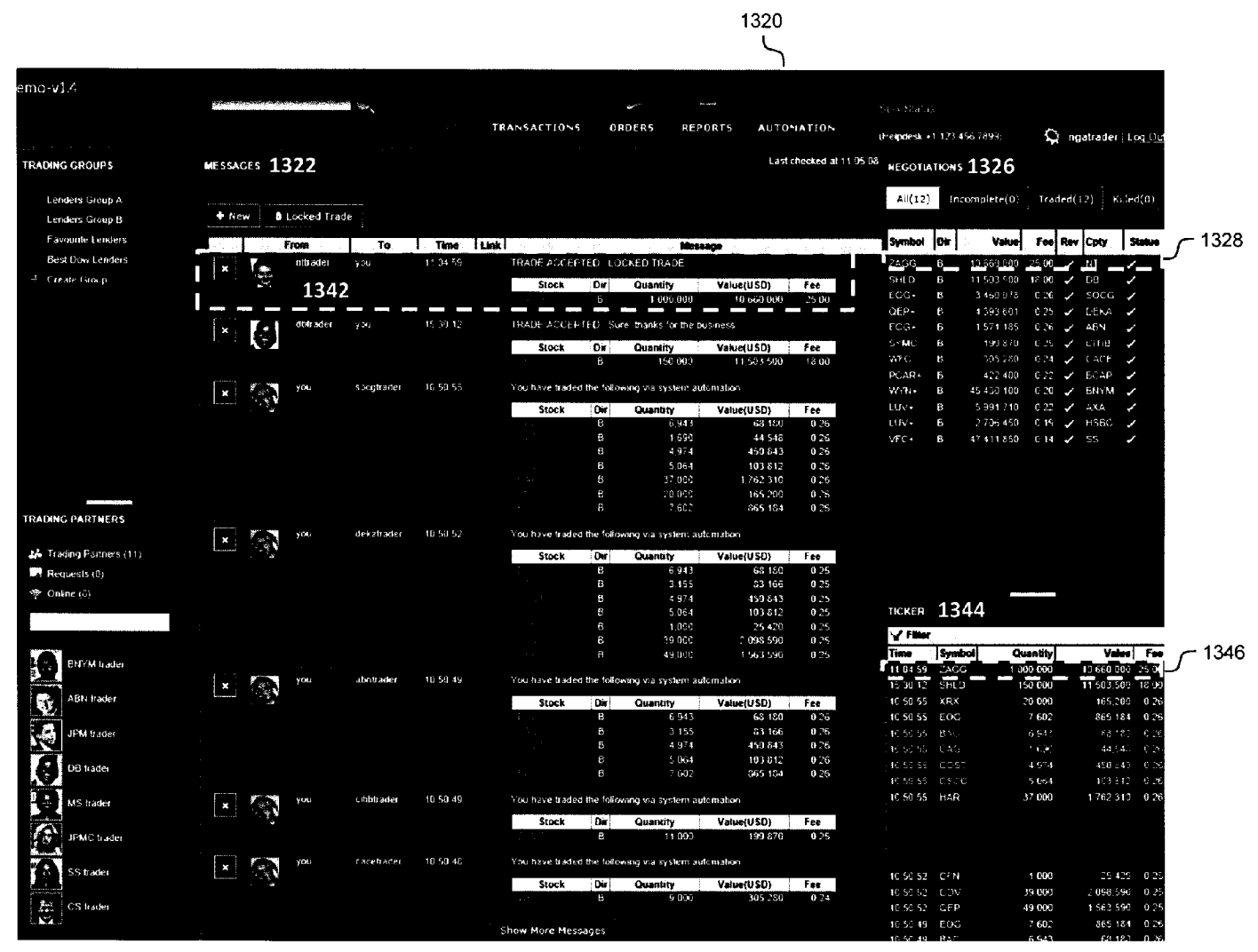

In step 1228, application server 118 may update the graphical user interface displayed to the trader to reflect the execution of the locked transaction according to the fixed terms. For example, as depicted in FIG. 13C, a message 1342 associated with the decision by "nttrader" to confirm the terms of the locked transaction may be displayed to the trader within a corresponding Messaging page 1322 of graphical user interface 1320. As depicted within Negotiations sidebar 1326 of FIG. 13C, a status icon within entry 1328 may be updated to reflect the confirmation by "nttrader," and the corresponding entry may be placed under a "Completed" tab indicative of the confirmation.

Further, application server 118 may also update an entry 1346 within Ticker sidebar 1344 to reflect the execution of the locked transaction between the trader and counterparty "nttrader." In such an embodiment, entry 1346 may include, but is not limited to, information indicating a time of execution, information identifying a stock symbol of Zagg Inc. ("ZAGG"), a number of shares subject to the executed transaction, a value of the shares, and the fee associated with the executed transaction. Further, as described above, Ticker sidebar 1344 may be updated to include entry 1346 immediately upon execution, or after a predetermined delay subsequent the execution of the locked transaction.

Referring back FIG. 12, in step 1230, application server 118 may submit the terms of the locked transaction to a central clearing counterparty (e.g., CCP 130 of FIG. 1) over communications link 122 for clearance and settlement. In such embodiments, the terms of the executed transaction may be provided to CCP 130 using file transfer server 114, and upon receipt of the terms of the executed transaction, CCP 130 performs the corresponding clearance functions for the trader and the counterparties based on clearance data and corresponding collateral deposits provided to CCP 130, as described above.

CCP 130 may subsequently transmit information identifying the executed transactions to a settlement agent (e.g., settlement agent 140 of FIG. 1) via a corresponding communications link (e.g., communications link 124 of FIG. 1). Upon completion of settlement of the executed transaction, settlement agent 130 may transmit, over communication link 124, confirmations of the settlement to CCP 130, which may subsequently forward the settlement confirmations to trading platform 110 across communications link 122.

In step 1232, application server 118 may distribute the received settlement confirmations to the trader and counterparty "nttrader" across network 120. For example, and as described above, application server 118, in conjunction with web server 112, may transmit the settlement confirmation to the trader and counterparty "nttrader" over network 120 using any of the communications protocols outlined above. Further, in step 1234, application server 118 may update corresponding portions of the GUI displayed to the trader and to the one or more counterparties to reflect the settled transactions (e.g., under "Orders" icon 404C of GUI 400). Method 1200 then passes back to back to step 1222, and the confirmation and execution process is complete.

In the embodiments described above, an electronic trading platform (e.g., trading platform 110 of FIG. 1) enables a trader to manually negotiate securities lending transactions involving a single financial instrument and a single counterparty, or alternatively, multiple counterparties, which may be subsequently submitted for clearing and settlement. The disclosed embodiments are, however, not limited to manual processes that enable a trader to directly communicate and negotiate transaction terms with a corresponding counterparty or counterparties. In a further embodiments, trading platform 110 may facilitate an automated process by which a trader executes multiple securities lending transactions involving corresponding securities with predetermined counterparties and at agreed-upon fees, as described below in reference to FIG. 14.

Figure 14:
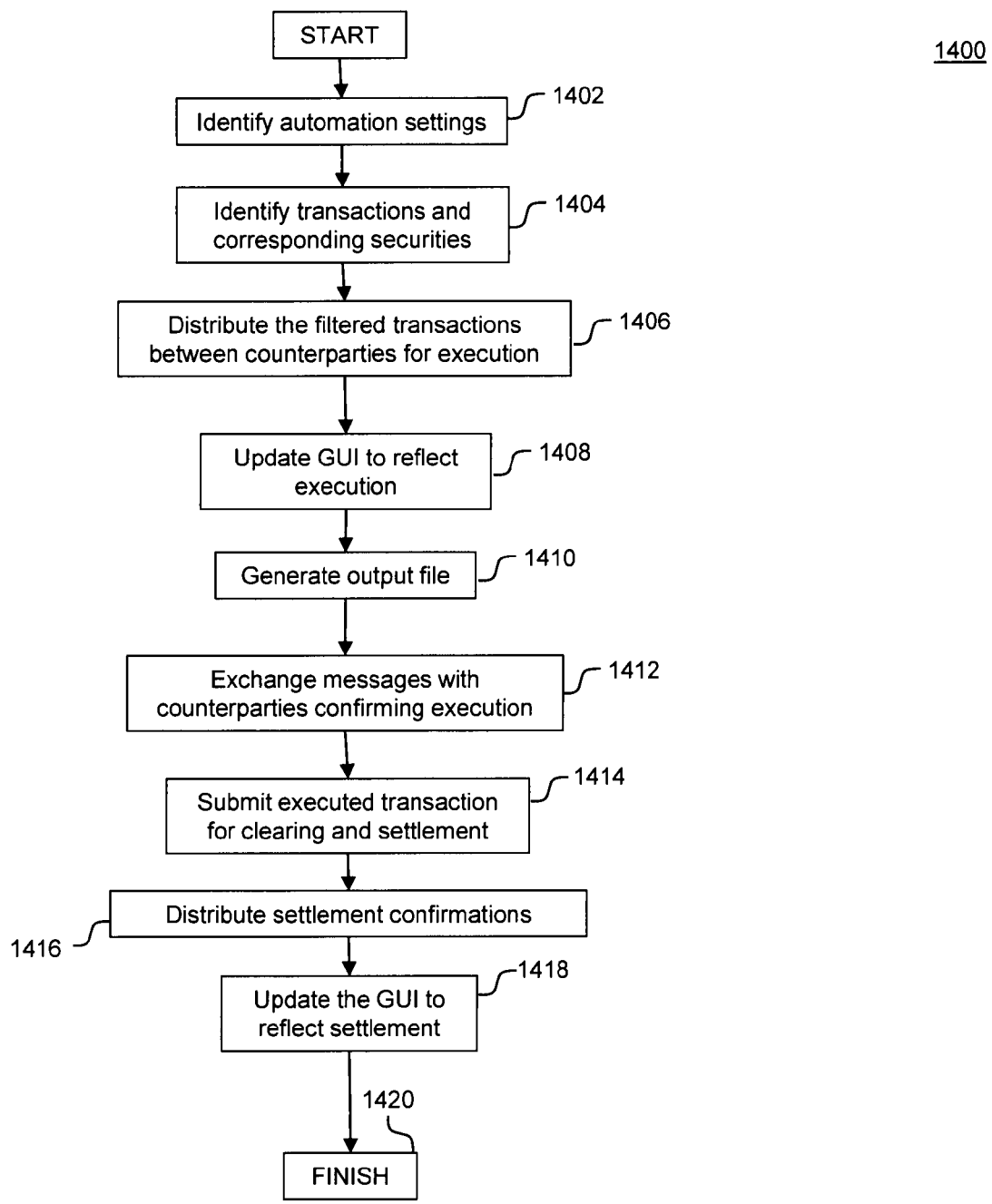
FIG. 14 is a flowchart of an exemplary method for automatically executing multiple securities lending transactions, according to disclosed embodiments.

FIG. 14 is a flowchart of an exemplary method 1400 for automatically executing multiple securities lending transactions, according to disclosed embodiments. Method 1400 may provide functionality that enables a server of an electronic trading platform (e.g., application server 118 of trading platform 110 in FIG. 1) to obtain information specifying terms for a plurality of transactions to lend or borrow securities, and to execute the plurality of transactions with corresponding pre-determined counterparties at fixed, pre-agreed transaction fees or ranges of transaction fees. As will be apparent to one of skill in the art from the present disclosure, the steps and arrangement of the same in FIG. 14 may be modified, as needed.

In step 1402, application server 118 may identify one or more automation settings associated with the trader. For example, the automation settings may include, but are not limited to, a prioritized list of counterparties (e.g., lenders in a borrowing transaction and borrowers within a lending transaction) that will trade securities at fixed, pre-agreed fees or ranges of fees. In such embodiments, the prioritized list of borrowers or lenders may be drawn from trading groups associated with the trader and additionally or alternatively, from trading partners associated with the trader.

The automation settings may also include information identifying one or more securities excluded from automated lending and borrowing transactions. For example, the excluded securities may include, but are not limited to, stocks having "special" status and stocks experiencing an especially high demand (e.g., subsequent to an initial public offering (IPO)).

Figure 15A:
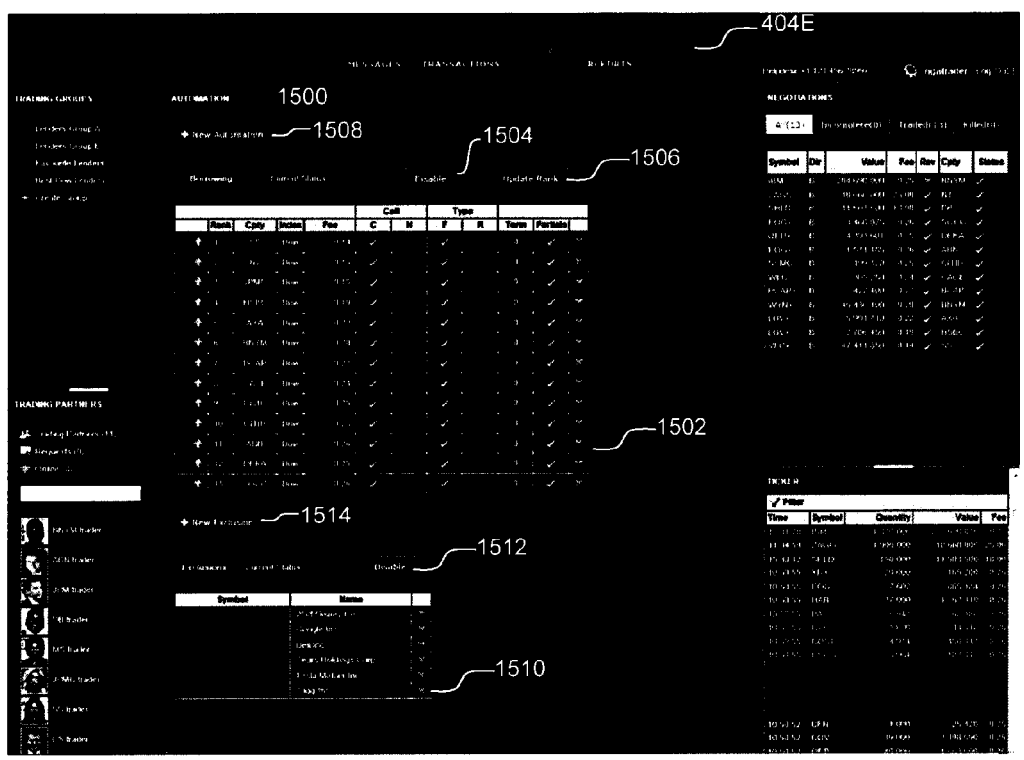
FIGS. 15A-15D and 16A-16B are diagrams of exemplary portions of a graphical user interface for an electronic trading platform, according to disclosed embodiments.

In an embodiment, the automation settings may be stored within a data repository associated with application server 118 (e.g., data repository 116 of FIG. 1), and may be accessed by the trader through an appropriate automation page of a displayed graphical user interface (e.g., through "Automation" icon 404E within GUI 400 of FIG. 4). For example, FIG. 15A illustrates an exemplary automation page 1500 that includes a prioritized list of lenders 1502 for a borrowing transaction, and a corresponding set of securities 1510 excluded from the automated borrowing transactions. Further, in the embodiments of FIG. 15A, the automation settings include selectable icons that enable the trader to disable trading at fixed fees or ranges of fees (e.g., "Disable" icon 1504), modify the rank of lenders within list 1502 (e.g., a "Modify Rank" icon 1506), add new lenders to list 1502 (e.g., a "New Automation" icon 1508), disable the exclusion of transactions involving excluded securities 1510, and add new stocks or securities to excluded securities 1510. Further, although not depicted in FIG. 15A, prioritized lenders list 1502 may include, for one or more of the lenders, a user-specified or predetermined trading limit that limits an ability of the one or more lenders to automatically execute transaction. In such embodiments, the trading limit may be expressed in terms of a number of executed transactions, a number of shares within such executed transactions, or a value of such executed transactions in an appropriate currency, including, but not limited to, U.S. dollars, British pounds sterling, Euros, Swiss francs, Japanese yen, and any additional or alternate currency appropriate to an exchange associated with trading platform 110.

Referring back to FIG. 14, application server 118 may obtain information identifying a plurality of transactions and corresponding securities in step 1404. The obtained information may include, for each transaction, an identifier of the particular security (e.g., a CUSIP code for a shares of a stock) and a quantity of the desired security. Further, in an embodiment, the obtained information may further include, for each transaction, an acceptable type of collateral (e.g., cash or non-cash), a type fee arrangement (e.g., as a percentage of a value of the transaction or a rebate), a duration of the transaction, and any additional or alternate term or parameter appropriate to the transaction.

For example, the trader may navigate to an order management page associated with the graphical user interface (e.g., associated with "Orders" icon 404C within GUI 400 of FIG. 4). In such an embodiment, as depicted in FIG. 15B, the trader may specify a type of automated transaction by clicking either a "Borrow" icon 1522 or a "Loan" icon 1524 within an exemplary order management page 1520, and by subsequently selecting "Browse" icon 1526, the trader may identify a file that includes the information identifying a particular security and a desired quantity of that security for each of a number of multiple transactions.

Figures 15B, 15C:
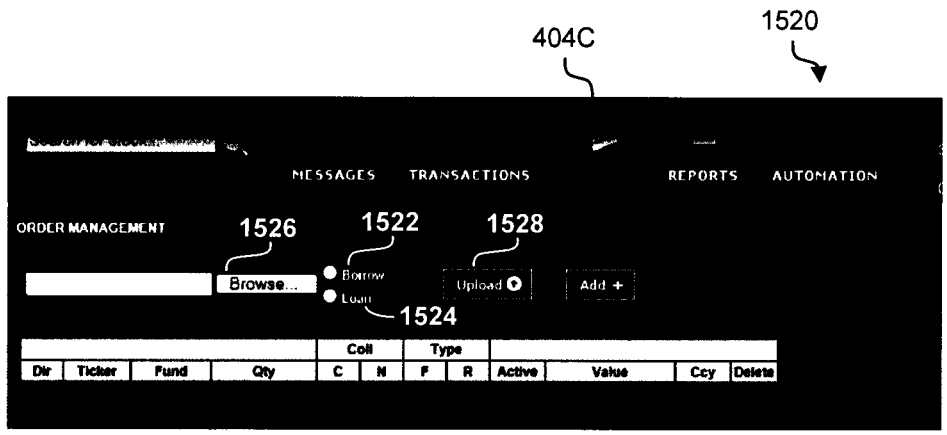

For example, as depicted in FIG. 15C, the identified file 1530 may be a comma-delimited file that includes, for each transaction, an identifier of a security (e.g., a corresponding CUSIP) followed by a desired quantity of shares of that security. The disclosed embodiments are not limited to such exemplary file formats, and in additional embodiments, the identified file may be tab delimited, space delimited, unstructured, or may have any additional or alternate format apparent to one of skill in the art, capable of identifying the stocks and desired quantities, and compatible with application server 118 and client system 102.

In such embodiments, the file including the transaction details may be locally stored within a client system associated with the trader (e.g., client system 102 of FIG. 2), or alternatively, within a location accessible to client system 102 across network 120. The trader may subsequently select "Upload" icon 1528 of FIG. 15B, and in response to the selection, client system 102 may transmit the identified file to application server 118. As described above, client system 102 may transmit the identified file to a file transfer server associated with trading platform 110 (e.g., file transfer server 114 of FIG. 1) using any appropriate file transfer protocol (e.g., FTP) or equivalent API interface. Further in additional embodiments, client device 102 may also transmit the identified file to a web server associated with trading platform 110 (e.g., web server 112 of FIG. 1) using any of the communications protocols outlined above.

Referring back to FIG. 14, in step 1406, application server 118 may coordinate with the counterparties identified in step 402 to automatically execute the transactions to lend or borrow the specified shares of securities at the fixed, fees or ranges of fixed fees. Further, in such embodiments, and in additional to values of the transaction fees and the share quantities, each of the counterparties may be associated with a set of transaction term values (e.g., types of collateral, transaction fee arrangements, durations) upon which an executed transaction between the trader and the corresponding counterparty may be based.

For example, in step 406, application server 118 may initially filter the information identifying the securities lending transactions to discard those transactions associated with stocks or securities present within the list of excluded stocks or securities identified in step 1402. Further, in step 1406, application server 118 may distribute the filtered transactions to the counterparties within the prioritized list for execution. In such embodiments, the counterparties within the prioritized list (e.g., prioritized lenders list 1502 of FIG. 15A) may automatically execute the filtered transactions based on a match between the terms of the filtered transactions specified by the trader and corresponding sets of transaction term values associated with the counterparties (e.g., a match between types of collateral, types of transaction fees, durations, and additionally or alternatively, transaction fees).

In an embodiment, the transactions may be distributed to the counterparties in round-robin fashion according to corresponding ranks within the prioritized list. Further, a counterparty may continue to receive distributed transactions for execution until a corresponding user-specified trading limit is reached, or alternatively, a cumulative value of the transactions executed that counterparty exceeds a threshold value, which may be based on, for example, a rank assigned to the counterparty within the prioritized list. The disclosed embodiments are, however, not limited to such exemplary distributions, and in further embodiments, application server 118 may distribute the transactions to the counterparties for automated execution using any additional or alternate algorithm apparent to one of skill in the art.

Figure 15D:

In an embodiment, application server 118 may provide an updated graphical user interface to the trader in step 1408 that reflects the outcome of the automated execution processes of step 1406, as described in reference to an updated graphical user interface 1540 of FIG. 15D. For example, in the embodiment of FIG. 15D, application server 118 attempted to automatically execute twenty-five securities lending transactions with corresponding counterparties, and successfully executed thirteen of the transactions. In such exemplary embodiments, application server 118 was unable to execute the remaining twelve transactions (e.g., the prioritized counterparties were unable to provide the desired quantity of securities), and application server 118 may provide information identifying these residual transactions within portion 1542 of interface 1540.

Application server 118 may also update a "Negotiations" sidebar 1544 to include entries 1545 indicative of the thirteen successfully-executed transactions. In such embodiments, entries 1545 may include, but are not limited to, information identifying a stock symbol associated with each transaction, a direction of the associated negotiation for each transaction, a value of the requested shares for each transaction, the fixed fee associated with each transaction, information ("Rev") indicating whether the trader revealed an identity to a counterparty associated with each transaction, information identifying the counterparty for each transaction, and an updated status icon indicating the successful execution of each transaction. Further, in an embodiment, sidebar 1544 may be reorganized such that entries 1545 is placed under a "Completed" tab indicative of the successful negotiation. Additionally, entries corresponding to the residual transactions may be disposed under an "Incomplete" tab indicative of the incomplete status of the residual transactions.

Interface 1540 may also include an updated "Ticker" sidebar 1546 having entries 1547 associated with the thirteen executed transaction. In such an embodiment, entries 1547 may include, but is not limited to, a time of execution, information identifying a stock symbol for each executed transaction, a number of shares subject to each executed transaction, a value of the shares in each executed transaction, and the fixed fee associated with the executed transaction. Further, as described above, "Ticker" sidebar 1546 may be updated to include entries 1547 immediately upon execution, or after a predetermined delay subsequent the execution of the trade.

Referring back to FIG. 14, application server 118 may then generate an output file (e.g., a STP file) that includes a detailed log of the executed transactions in step 1410. In an embodiment, the system-generated file, which may be in spreadsheet or any other appropriate format, may include detailed information associated with one or more of the executed transactions. For example, the system-generated file may include, but is not limited to, an identifier of the counterparty, a counterparty name, a CUSIP associated with the security, a name and ticker symbol of the security, a quantity of the security, a transaction fee, a transaction type, and a collateral type associated with each of the executed transactions.

In step 1412, application server 118 may transmit messages to each of the counterparties and to the trader that describe the terms of the executed transactions, which may be accessible within a messaging page of the graphical user interface (e.g., using "Messaging" icon 404A of GUI 400 of FIG. 4). Further, in step 1414, application server 118 may submit the terms of the executed transactions to a central clearing counterparty (e.g., CCP 130 of FIG. 1) over communications link 122 for clearance and settlement. In such embodiments, the terms of the executed transaction may be provided to CCP 130 using file transfer server 114, and upon receipt of the terms, CCP 130 performs the clearance functions for the trader and the counterparties based on clearance data and corresponding collateral deposits provided to CCP 130, as described above.

CCP 130 may subsequently transmit information identifying the executed transactions to a settlement agent (e.g., settlement agent 140 of FIG. 1) via a corresponding communications link (e.g., communications link 124 of FIG. 1). Upon completion of settlement of the executed transaction, settlement agent 130 may transmit, over communication link 124, confirmations of the settlement to CCP 130, which may subsequently forward the settlement confirmations to trading platform 110 across communications link 122.

In step 1416, application server 118 may distribute the received settlement confirmations to the trader and counterparties across network 120. For example, and as described above, application server 118, in conjunction with web server 112, may transmit the settlement confirmation to the trader and counterparties over network 120 using any of the communications protocols outlined above. Further, in step 1418, application server 118 may update corresponding portions of the GUI displayed to the trader and to the one or more counterparties to reflect the settled transactions (e.g., under "Orders" icon 404C of GUI 400). Method 1400 then passes to step 1420, and the automated transaction process is complete.

In additional embodiments, a trader may access a graphical user interface (e.g., GUI 400 of FIG. 4) associated with an electronic trading platform (e.g. trading platform 110 of FIG. 1) to manage one or more previously-executed transactions. For example, the trader may access a corresponding icon within a menu of a graphical user interface (e.g., "Transaction" icon 404B within GUI 400 of FIG. 4) to access a transaction page, a portion of which is depicted in FIG. 16A.

Figures 16A, 16B:
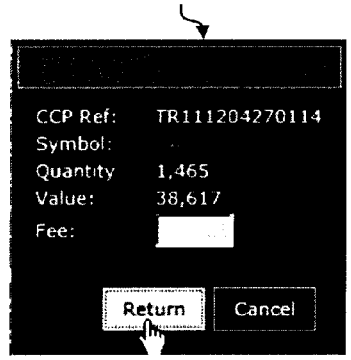

In FIG. 16A, an exemplary transactions page 1600 includes a list of transactions involving the trader, executed by the electronic trading system, and awaiting confirmation of an initial leg of settlement (e.g., via settlement confirmation from settlement agent 140). For example, such a list may provide, among other things, an intended settlement date (i.e., "ISD" within "Initial Leg" column 1604), a symbol, a transaction type, a transaction fee, a quantity, a value, a counterparty, and details on the initial leg of settlement for each transaction.

Upon completion of the initial leg of settlement, application server 118 may update transactions page 1600 to include a time stamp associated with the completion of the initial leg (i.e., an actual settlement date ("ASD") within "Initial Leg" column 1604) and a status of the transaction (e.g., within "Txn Status" column 1608). The trader may then select a transaction 1602 that requires a return of security to a counterparty, and upon selection, a corresponding "Stock Return" window 1610 may be displayed to the trader within the graphical user interface, as described in FIG. 16B. In FIG. 16B, "Stock Return" window 1610 provides details on a security corresponding to the selected transaction, such as a CCP reference number, a symbol of the security, a number of units, a value of the security, and a corresponding, negotiable transaction fee.

Upon activating the "Return" button within "Stock Return" window 1610, application server 118 books an intended settlement date ("ISD") associated with the return leg, and updates transactions page 1600 to reflect the ISD of the return leg (e.g., within "Return Leg" column 1606) and additionally or alternatively, a status of the transaction (e.g., within "Txn Status" column 1608). The corresponding quantity of stocks or securities associated with the selected transaction may be returned to the counterparty, and the return leg of the settlement process for transaction 1602 may be completed. Application server 118 may provide an additional update to "Transactions" page 1600 to indicate a time stamp associated with the completed return leg (e.g., an actual settlement date ("ASD") within "Return leg" column 1606) and information identifying a transaction status (e.g., within "Txn Status" column 1608).

In the embodiments described above reference is made to shares of securities denominated in U.S. dollars, and to transactions and trades valued in U.S. dollars. Such valuations and denominations are not, however, limited to a specific currency, e.g., U.S. dollars. In additional embodiments, any denomination of shares of securities, and any valuation of a trade or transactions, may be expressed in any of a number of currencies appropriate to an exchange or business model of trading platform 110, including but not limited to, U.S. dollars, British pounds sterling, Euros, Swiss francs, and Japanese yen.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the invention being indicated by the following listing of exemplary claims.

What is claimed is:

1. A computer-implemented method, comprising:
    receiving, from a trader, information identifying initial parameters of a transaction to lend or borrow a security;
    generating an electronic instruction to provide the initial parameters to a an anonymous counterparty;
    using at least one processor, initiating communications between the trader and the anonymous counterparty to negotiate final parameters of the transaction;
    during the negotiations for the final parameters, using the at least one processor, revealing first information identifying the trader to the anonymous counterparty without identifying the anonymous counterparty to the trader; and
    executing, using the at least one processor, the transaction between the trader and the anonymous counterparty in accordance with the negotiated final parameters.

2. The method of claim 1, further comprising generating an electronic instruction to submit information associated with the executed transaction to one or more central clearing parties.

3. The method of claim 1, wherein the initial parameters comprise an identifier of the security and a quantity of the security.

4. The method of claim 1, wherein during the negotiations for the final parameters, the method further comprises:
    receiving a response to the initial parameters from the anonymous counterparty, the response comprising a first request to obtain the first information; and
    generating an electronic instruction to provide the first request to the trader.

5. The method of claim 4, wherein during the negotiations for the final parameters, the method further comprises
    receiving a response to the first request from the trader; and
    revealing the first information to the anonymous counterparty, based on the response to the first request.

6. The method of claim 5, wherein during the negotiations for the final parameters, the method further comprises
    receiving, from the trader, a second request for second information identifying the anonymous counterparty;
    generating an electronic instruction to provide the second request to the anonymous counterparty;
    receiving a response to the second request from the anonymous counterparty; and
    revealing at least a portion of the second information to the trader, based on the response to the second request.

7. The method of claim 1, wherein the method further comprises generating an electronic instruction to provide at least the initial parameters to a plurality of counterparties, and wherein the revealing comprises revealing the first information to a subset of the counterparties.

8. The method of claim 6, wherein the second information comprises at least one of a name of the counterparty, an organization associated with the counterparty, a type of the organization associated with the counterparty, a role associated with the counterparty in the transaction, the counterparty's ownership stake in the security, a location associated with the counterparty, social networking information associated with the counterparty, or a trading history of the counterparty.

9. The method of claim 1, wherein:
    the first information comprises a name of the trader; and
    the revealing comprises revealing the name of the trader to the anonymous counterparty.

10. The method of claim 1, wherein:
    the first information comprises at least one of an organization associated with the trader, a type of the organization associated with the trader, a role associated with the trader in the transaction, the trader's ownership stake in the security, a location associated with the trader, social networking information associated with the trader, or a trading history of the trader; and
    the revealing comprises revealing the first information to the anonymous counterparty without revealing a name of the trader.

11. The method of claim 5, wherein during the negotiations for the final parameters, the method further comprises:
    obtaining information identifying a level of anonymity desired by the trader;
    selecting a portion of the first information in accordance with the level of anonymity; and
    revealing the selected portion of the first information to the anonymous counterparty.

12. The method of claim 1, further comprising generating an electronic instruction to transmit, to the trader and the anonymous counterparty, third information identifying the final parameters of the executed transaction, wherein the third information obscures an identity of the anonymous counterparty.

13. A computer-implemented method, comprising:
    receiving, from a trader, information identifying initial parameters of a transaction to lend or borrow a security;
    generating an electronic instruction to provide the initial parameters to a counterparty;
    using at least one processor, initiating communications between the trader and the counterparty to negotiate final parameters of the transaction, the counterparty being anonymous;
    during the negotiations for the final parameters, revealing first information identifying the counterparty to the trader without identifying the trader to the counterparty; and
    executing, using the at least one processor, the transaction between the trader and the counterparty in accordance with the negotiated final parameters.

14. The method of claim 13, further comprising generating an electronic instruction to submit information associated with the executed transaction to one or more central clearing parties.

15. The method of claim 13, further comprising generating an electronic instruction to transmit, to the trader and the counterparty, second information identifying the final parameters of the executed transaction, wherein the second information obscures an identity of the trader.

16. The method of claim 13, wherein the initial parameters comprise an identifier of the security and a quantity of the security.

17. The method of claim 13, wherein during the negotiations for the final parameters, the method further comprises:
    generating an electronic instruction to transmit, to the counterparty, a request to obtain the first information;
    receiving a response to the request from the counterparty; and
    revealing the first information to the trader, based on the response to the request.

18. The method of claim 17, wherein during the negotiations for the final parameters, the method further comprises:
    identifying a level of anonymity desired by the counterparty;
    selecting a portion of the first information in accordance with the level of anonymity; and
    revealing the portion of the first information to the trader.

19. The method of claim 13, wherein:
    the first information comprises a name of the counterparty; and
    the revealing comprises revealing the name of the counterparty to the trader.

20. The method of claim 13, wherein:
    the first information comprises at least one of an organization associated with the counterparty, a type of the organization associated with the counterparty, a role associated with the counterparty in the transaction, the counterparty's ownership stake in the security, a location associated with the counterparty, social networking information associated with the counterparty, or a trading history of the counterparty; and
    the revealing comprises revealing the first information without revealing a name of the counterparty.

21. A computer-implemented method, comprising:
    receiving, from a trader, information identifying initial parameters of a transaction to lend or borrow a security;
    generating an electronic instruction to provide the initial parameters to a counterparty;
    using at least one processor, initiating communications between the trader and the counterparty to negotiate final parameters of the transaction, the trader and the counterparty being anonymous;
    obtaining a condition for executing the transaction in accordance with the final parameters, the condition comprising at least one of a first request from the trader for first information identifying the counterparty or a second request from the counterparty for second information identifying the trader;
    revealing, using the at least one processor, at least one of (i) the first information to the trader in response to the first request or (ii) the second information to the counterparty in response to the second request; and
    executing, using the at least one processor, the transaction between the trader and the counterparty in accordance with the negotiated final parameters.

22. The method of claim 21, wherein:
    the obtaining comprises receiving the first request from the trader; and
    the method further comprises:
        generating an electronic instruction to transmit the first request to the counterparty;
        receiving a response to the first request from the counterparty; and
        revealing the first information to the trader, based on the response to the first request.

23. The method of claim 21, wherein:
    the obtaining comprises receiving the first request from the trader; and
    the method further comprises:
        identifying a level of anonymity desired by the counterparty;
        selecting a portion of the first information in accordance with the level of anonymity; and
        revealing the portion of the first information to the trader.

24. The method of claim 21, wherein:
    the obtaining comprises receiving the second request from the counterparty; and
    the method further comprises:
        generating an electronic instruction to transmit the second request to the trader;
        receiving a response to the second request from the trader; and
        revealing the second information to the counterparty, based on the response to the second request.

25. The method of claim 21, wherein:
    the obtaining comprises receiving the second request from the counterparty; and
    the method further comprises:
        identifying a level of anonymity desired by the counterparty;
        selecting a portion of the first information in accordance with the level of anonymity; and
        revealing the portion of the first information to the trader.

* * * * *